US010306031B2

(12) United States Patent
Tseng et al.

(10) Patent No.: US 10,306,031 B2
(45) Date of Patent: May 28, 2019

(54) OPTICAL IMAGE CAPTURING ASSEMBLY, IMAGING APPARATUS AND ELECTRONIC DEVICE

(71) Applicant: LARGAN PRECISION CO., LTD., Taichung (TW)

(72) Inventors: Yu-Tai Tseng, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 3 days.

(21) Appl. No.: 15/596,131

(22) Filed: May 16, 2017

(65) Prior Publication Data

US 2018/0267271 A1 Sep. 20, 2018

(30) Foreign Application Priority Data

Mar. 15, 2017 (TW) ............................ 106108595 A

(51) Int. Cl.

| | |
|---|---|
| ***G02B 13/18*** | (2006.01) |
| ***G02B 3/02*** | (2006.01) |
| ***H04M 1/02*** | (2006.01) |
| ***H04N 5/225*** | (2006.01) |
| ***G02B 7/08*** | (2006.01) |
| ***G02B 13/00*** | (2006.01) |
| ***G02B 27/64*** | (2006.01) |
| *G02B 27/01* | (2006.01) |

(52) U.S. Cl.

CPC ............ *H04M 1/0264* (2013.01); *G02B 7/08* (2013.01); *G02B 13/004* (2013.01); *G02B 13/0045* (2013.01); *G02B 13/0065* (2013.01); *G02B 27/646* (2013.01); *H04N 5/2254* (2013.01); *G02B 2027/0138* (2013.01)

(58) Field of Classification Search

CPC ........ G02B 9/34; G02B 13/18; G02B 13/004; H04M 10/264

See application file for complete search history.

(56) References Cited

U.S. PATENT DOCUMENTS

| | | | |
|---|---|---|---|
| 2,819,652 | A | 1/1958 | Baur et al. |
| 4,521,084 | A | 6/1985 | Kurihara |
| 4,702,569 | A | 10/1987 | Mercado |
| 5,325,235 | A | 6/1994 | Takashima et al. |
| 5,936,783 | A | 8/1999 | Nakai et al. |

(Continued)

FOREIGN PATENT DOCUMENTS

| | | | |
|---|---|---|---|
| JP | S6049310 | A | 3/1985 |
| JP | 2004-325713 | A | 11/2004 |

(Continued)

*Primary Examiner* — Alicia M Harrington

(74) *Attorney, Agent, or Firm* — McClure, Qualey & Rodack, LLP

(57) ABSTRACT

An optical image capturing assembly includes four lens elements, in order from an object side to an image side, the four lens elements are a first lens element, a second lens element, a third lens element and a fourth lens element. The first lens element with positive refractive power has an object-side surface being convex in a paraxial region thereof. The second lens element has negative refractive power. The third lens element has positive refractive power. The fourth lens element with negative refractive power has an object-side surface being concave in a paraxial region thereof.

31 Claims, 45 Drawing Sheets

(56) References Cited

U.S. PATENT DOCUMENTS

| | | | | |
|---|---|---|---|---|
| 5,966,251 | A | 10/1999 | Nagahara | |
| 6,288,820 | B1 | 9/2001 | Noda | |
| 6,894,848 | B2 | 5/2005 | Yamamoto | |
| 7,492,532 | B2 | 2/2009 | Shin | |
| 8,879,172 | B2 | 11/2014 | Kubota et al. | |
| 8,982,483 | B2 | 3/2015 | Chou et al. | |
| 9,383,556 | B2 | 7/2016 | Hsueh et al. | |
| 2008/0043346 | A1* | 2/2008 | Sano | G02B 9/34 359/715 |
| 2012/0194926 | A1 | 8/2012 | Kubota et al. | |
| 2013/0010181 | A1 | 1/2013 | Baba | |
| 2016/0044250 | A1 | 2/2016 | Shabtay et al. | |
| 2016/0147046 | A1 | 5/2016 | Hsieh et al. | |
| 2016/0291288 | A1* | 10/2016 | Huang | G02B 13/004 |
| 2016/0352984 | A1 | 12/2016 | Huang | |

FOREIGN PATENT DOCUMENTS

| | | | |
|---|---|---|---|
| JP | 2005-265950 | A | 9/2005 |
| JP | 2010-008660 | A | 1/2010 |
| TW | I564612 | B | 1/2017 |

* cited by examiner

20

30

40

OPTICAL IMAGE CAPTURING ASSEMBLY, IMAGING APPARATUS AND ELECTRONIC DEVICE

RELATED APPLICATIONS

This application claims priority to Taiwan Application Serial Number 106108595, filed Mar. 15, 2017, which is herein incorporated by reference.

BACKGROUND

Technical Field

The present disclosure relates to an optical image capturing assembly and an imaging apparatus. More particularly, the present disclosure relates to an optical image capturing assembly and an imaging apparatus, each of which is featured with a telephoto property and a compact size and is applicable to electronic devices.

Description of Related Art

With advancements of technologies, electronic products featured with multi-functional photography become trend in developments. The demand for image quality is increasing, and the application range is broadening. For example, electronic products are expected to be applied to long shot and close shot. Therefore, it is difficult to simultaneously satisfy the above demands with a single photographing module. Accordingly, electronic devices, such as smartphones, equipped with multiple photographing modules, such as two lens assemblies or multiple lens assemblies, become trend in developments. For example, a wide-angle lens assembly and a telephoto lens assembly with small field of view can be employed to a same electronic device, and a medium-angle lens assembly can be further employed to the same electronic device, so that the operation can be more fluent. Alternatively, several lens assemblies with similar field of views can be employed to a same electronic device. For maintaining high image quality, a larger image sensor is required by the telephoto lens assembly, and a reflecting element can be applied to reduce the height of photographing module including the telephoto lens assembly. Considering trends of light, thin and portable devices nowadays, it is a huge challenge to maintain a high image quality and reduce the outer diameter of the photographing module at the same time.

SUMMARY

According to one aspect of the present disclosure, an optical image capturing assembly includes four lens elements, in order from an object side to an image side, the four lens elements are a first lens element, a second lens element, a third lens element and a fourth lens element. The first lens element with positive refractive power has an object-side surface being convex in a paraxial region thereof. The second lens element has negative refractive power. The third lens element has positive refractive power. The fourth lens element with negative refractive power has an object-side surface being concave in a paraxial region thereof and an image-side surface being convex in a paraxial region thereof. When an Abbe number of the second lens element is V2, an Abbe number of the third lens element is V3, an axial distance between the second lens element and the third lens element is T23, an axial distance between the third lens element and the fourth lens element is T34, a central thickness of the third lens element is CT3, a focal length of the first lens element is f1, and a focal length of the third lens element is f3, the following conditions are satisfied:

$$10<V2<40;$$

$$10<V3<30;$$

$$0.10<(T23+T34)/CT3<1.30; \text{ and}$$

$$0.40<f1/f3.$$

According to another aspect of the present disclosure, an imaging apparatus includes the optical image capturing assembly according to the aforementioned aspect and an image sensor, wherein the image sensor is disposed on an image surface of the optical image capturing assembly.

According to further another aspect of the present disclosure, an electronic device includes the imaging apparatus according to the aforementioned aspect.

According to yet another aspect of the present disclosure, an optical image capturing assembly includes four lens elements, in order from an object side to an image side, the four lens elements are a first lens element, a second lens element, a third lens element and a fourth lens element. The first lens element with positive refractive power has an object-side surface being convex in a paraxial region thereof. The second lens element has negative refractive power. The third lens element has positive refractive power. The fourth lens element with negative refractive power has an object-side surface being concave in a paraxial region thereof. When an Abbe number of the third lens element is V3, an axial distance between the second lens element and the third lens element is T23, an axial distance between the third lens element and the fourth lens element is T34, a central thickness of the third lens element is CT3, a focal length of the first lens element is f1, and a focal length of the second lens element is f2, the following conditions are satisfied:

$$10<V3<30;$$

$$0.72<(T23+T34)/CT3<1.30; \text{ and}$$

$$0.80<f1/|f2|.$$

According to still another aspect of the present disclosure, an optical image capturing assembly includes four lens elements, in order from an object side to an image side, the four lens elements are a first lens element, a second lens element, a third lens element and a fourth lens element. The first lens element with positive refractive power has an object-side surface being convex in a paraxial region thereof. The second lens element has negative refractive power. The third lens element has positive refractive power. The fourth lens element with negative refractive power has an object-side surface being concave in a paraxial region thereof and an image-side surface being convex in a paraxial region thereof. When an Abbe number of the third lens element is V3, a central thickness of the first lens element is CT1, a central thickness of the second lens element is CT2, a central thickness of the third lens element is CT3, an axial distance between the second lens element and the third lens element is T23, an axial distance between the third lens element and the fourth lens element is T34, a focal length of the first lens element is f1, and a focal length of the third lens element is f3, the following conditions are satisfied:

$10<V3<32$;

$0.60<CT1/(CT2+T23+CT3)<5.0$;

$0.60<CT3/T34<10$; and $0.40<f1/f3$.

BRIEF DESCRIPTION OF THE DRAWINGS

The present disclosure can be more fully understood by reading the following detailed description of the embodiment, with reference made to the accompanying drawings as follows:

FIG. 250 is a block diagram of the electronic device in FIG. 25A;

DETAILED DESCRIPTION

Figure 1:
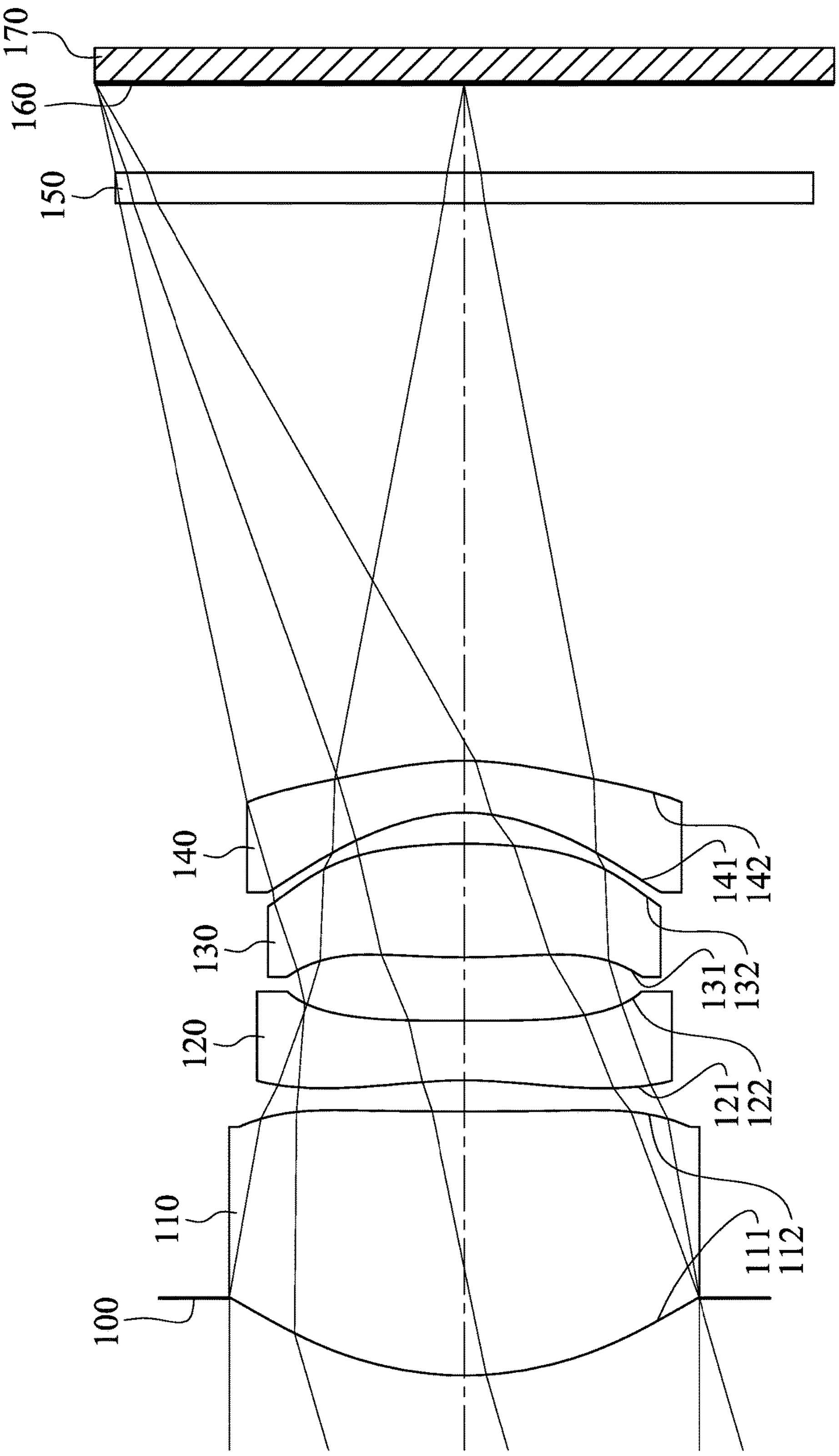
FIG. 1 is a schematic view of an imaging apparatus according to the 1st embodiment of the present disclosure.

An optical image capturing assembly includes four lens elements, in order from an object side to an image side, the four lens elements are a first lens element, a second lens element, a third lens element and a fourth lens element.

The first lens element with positive refractive power has an object-side surface being convex in a paraxial region thereof. Therefore, the light converging ability at the object side of the optical image capturing assembly can be provided, which is favorable for shortening the total track length of the optical image capturing assembly so as to obtain a compact size.

The second lens element has negative refractive power. Therefore, aberrations generated by the first lens element can be balanced, and chromatic aberration of the optical image capturing assembly can be corrected. Furthermore, an object-side surface of the second lens element can include at least one inflection point, which is favorable for correcting aberrations in the off-axial field. The inflection point is a point on a curve of a lens surface (herein, the lens surface is the object-side surface of the second lens element) ranging from an optical axis to a periphery of the lens surface where the center of curvature of the curve changes from the object side to the image side (or from the image side to the object side).

The third lens element has positive refractive power. Therefore, the distribution of the positive refractive power of the optical image capturing assembly can be balanced, and the photosensitivity and spherical aberration thereof can be reduced.

The fourth lens element with negative refractive power has an object-side surface being concave in a paraxial region thereof. Therefore, the back focal length can be extended, which is favorable for reducing the outer diameter of the optical image capturing assembly and is favorable for distributing the effect of correcting aberrations in the off-axial field to each lens element. Moreover, the changing degree of the surface shape of the fourth lens element can be reduced, so that the manufacturing difficulty thereof can be reduced, the yield rate can be increased and the outer diameter of the fourth lens element can be further reduced. Preferably, an image-side surface of the fourth lens element can be convex in a paraxial region thereof, so that the aforementioned effects can be strengthened.

There can be an air space between the first lens element and the second lens element. That is, the first lens element is not cemented with the second lens element. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the optical image capturing assembly. Moreover, the first lens element and the second lens element are more sensitive than other lens elements. Therefore, according to the optical image capturing assembly of the present disclosure, an air space between the first lens element and the second lens element avoids the problem generated by the cemented lens elements.

When an Abbe number of the second lens element is V2, the following condition can be satisfied: $10<V2<40$. Therefore, chromatic aberration generated by the first lens element can be reduced.

When an Abbe number of the third lens element is V3, the following condition is satisfied: $10<V3<32$. Therefore, chromatic aberration of the optical image capturing assembly can be corrected, and the optical image capturing assembly can be featured with small field of view and telephoto property. Preferably, the following condition can be satisfied: $10<V3<30$.

When an axial distance between the second lens element and the third lens element is T23, an axial distance between the third lens element and the fourth lens element is T34, and a central thickness of the third lens element is CT3, the following condition can be satisfied: $0.10<(T23+T34)/CT3<1.30$. Therefore, astigmatism can be reduced, so that the sharpness of the image can be enhanced. Preferably, the following condition can be satisfied: $0.40<(T23+T34)/CT3<1.30$. Therefore, the incident angle and the exit angle of the off-axial lights can be smaller, which is favorable for reducing the outer diameter of the optical image capturing assembly. More preferably, the following condition can be satisfied: $0.72<(T23+T34)/CT3<1.30$.

When a focal length of the first lens element is f1, and a focal length of the third lens element is f3, the following condition can be satisfied: $0.40<f1/f3$. Therefore, the positive refractive power of the optical image capturing assembly can be dispersed, so that spherical aberration can be reduced. Preferably, the following condition can be satisfied: $0.60<f1/f3<1.20$. Therefore, the refractive power of the first lens element is enough to provide the light converging ability for the optical image capturing assembly. Moreover, the refractive power of the optical image capturing assembly can be further dispersed, which can reduce the affection of the manufacturing tolerance.

When the focal length of the first lens element is f1, and a focal length of the second lens element is f2, the following condition can be satisfied: $0.80<f1/|f2|$. Therefore, aberrations generated by the first lens element, such as chromatic aberration, can be corrected, so that the color shift can be reduced.

When a central thickness of the first lens element is CT1, a central thickness of the second lens element is CT2, the central thickness of the third lens element is CT3, and the axial distance between the second lens element and the third lens element is T23, the following condition can be satisfied: $0.60<CT1/(CT2+T23+CT3)<5.0$. Therefore, the thickness of the first lens element is proper. Moreover, thicknesses of the second lens element and the third lens element and distance therebetween can be properly adjusted for obtain a proper distribution of the refractive power of the first lens element, the second lens element and the third lens element, which is favorable for correcting spherical aberration and the field curvature generated by the first lens element, so that the image is not distorted. Preferably, the following condition can be satisfied: $0.75<CT1/(CT2+T23+CT3)<4.0$.

When the central thickness of the third lens element is CT3, and the axial distance between the third lens element and the fourth lens element is T34, the following condition can be satisfied: $0.60<CT3/T34<10$. Therefore, the exit angle of lights can be favorably adjusted for balancing the increase of the area of an image surface and the decrease of the outer diameter of the optical image capturing assembly. Preferably, the following condition can be satisfied: $0.90<CT3/T34<7.0$. More preferably, the following condition can be satisfied: $0.90<CT3/T34<2.9$. More preferably, the following condition can be satisfied: $0.90<CT3/T34<2.5$.

When the Abbe number of the second lens element is V2, the Abbe number of the third lens element is V3, and an Abbe number of the fourth lens element is V4, the following condition can be satisfied: $30<V2+V3+V4<100$. Therefore, chromatic aberration of the optical image capturing assembly can be reduced by properly adjusting the materials, which is favorable for reducing other aberrations and can featured the optical image capturing assembly with small field of view and telephoto property.

When an axial distance between the object-side surface of the first lens element and the image-side surface of the fourth lens element is TD, and a sum of the axial distances between every two lens elements of the first lens element, the second lens element, the third lens element and the fourth lens element adjacent to each other is ΣAT, the following condition can be satisfied: $3.5 \leq TD/\Sigma AT$. Specifically, when an axial distance between the first lens element and the second lens element is T12, the axial distance between the second lens element and the third lens element is T23, and the axial distance between the third lens element and the fourth lens element is T34, the following condition can be satisfied: $\Sigma AT = T12 + T23 + T34$. Therefore, the distances between every two lens elements and thickness of each of the lens elements can be properly adjusted, so that the optical image capturing assembly can be more compact and can be featured with small field of view and telephoto property.

When an axial distance between the image-side surface of the fourth lens element and the image surface is BL, and an axial distance between the object-side surface of the first lens element and the image surface is TL, the following condition can be satisfied: $0.35 < BL/TL < 0.70$. Therefore, the ratio of the back focal length and the total track length can be properly adjusted for reducing the volume of the optical image capturing assembly.

When a curvature radius of the object-side surface of the second lens element is R3, and a curvature radius of an image-side surface of the second lens element is R4, the following condition can be satisfied: $-1.0 < R3/|R4| < 0$. Therefore, the surface shapes of the second lens element are proper for correcting aberrations generated by the first lens element, and can be coordinated with other lens elements for reducing aberrations in the off-axial field.

When the curvature radius of the object-side surface of the second lens element is R3, and a focal length of the optical image capturing assembly is f, the following condition can be satisfied: $-0.47 < R3/f < 0$. Therefore, the negative refractive power of the second lens element is sufficient for correcting aberrations generated by the first lens element, and the focal length of the optical image capturing assembly can be elongated to reduce the outer diameter thereof.

When a curvature radius of an image-side surface of the third lens element is R6, and a curvature radius of the object-side surface of the fourth lens element is R7, the following condition can be satisfied: $3.0 < |R6/R7|$. Therefore, the third lens element and the fourth lens element can be coordinated with each other for reducing the astigmatism.

When a curvature radius of the image-side surface of the fourth lens element is R8, and the focal length of the optical image capturing assembly is f, the following condition can be satisfied: $|R8|/f \leq 0.42$. Therefore, the surface shape of the fourth lens element and the focal length of the optical image capturing assembly can be adjusted for further extending the back focal length to increase the area of the image surface.

When an entrance pupil diameter of the optical image capturing assembly is EPD, and a maximum image height of the optical image capturing assembly is ImgH, the following condition can be satisfied: $0.75 < EPD/ImgH$. Therefore, lights entering into the optical image capturing assembly can be increased by enlarging the aperture, and the image height can be restricted. Accordingly, an excessive image height which is unable to reduce the volume of the optical image capturing assembly can be prevented.

When the entrance pupil diameter of the optical image capturing assembly is EPD, and a vertical distance between a maximum effective diameter on the image-side surface of the fourth lens element and the optical axis is Y42, the following condition can be satisfied: $1.50 \leq EPD/Y42$. Therefore, the aperture can be further enlarged, and the outer diameter of the optical image capturing assembly can be reduced.

The optical image capturing assembly can further include an aperture stop. The aperture stop can be disposed between an imaged object and the first lens element. Therefore, the field of view can be reduced for satisfying the requirement of telephoto property. When an axial distance between the aperture stop and the image surface is SL, and the axial distance between the object-side surface of the first lens element and the image surface is TL, the following condition can be satisfied: $0.90 < SL/TL < 1.1$. Therefore, it is favorable for balancing the decrease of the field of view and the reduction of the volume of the optical image capturing assembly.

The optical image capturing assembly can further include at least one reflecting element. The reflecting element can be, but is not limited to, a prism or a mirror. Therefore, the spatial arrangement can be more flexible. Specifically, the at least one reflecting element can be disposed at an object side of the first lens element and has at least one reflecting surface. Therefore, it is favorable for reducing the height of the optical image capturing assembly. The number of the reflecting elements can be equal to or greater than two, which can be adjusted according to practical demands. The reflecting surface can also be arranged according to spatial arrangement. Moreover, the length, the width and the height of the prism can be different, and the length and the width of the mirror can be different, so that the volume occupied by the reflecting element can be reduced. Furthermore, the material of the prism can be determined according to practical demands. For example, the material of the prism can be a glass material or a plastic material.

When the reflecting element is the prism, the axial distance between the object-side surface of the first lens element and the image-side surface of the fourth lens element is TD, and a sum of path lengths on the optical axis of the prism is TP, the following condition can be satisfied: $0.20 < TD/TP < 1.30$. Therefore, it is favorable for maintaining the volume of the optical image capturing assembly.

When a vertical distance between a maximum effective diameter on the object-side surface of the first lens element and the optical axis is Y11, and the vertical distance between the maximum effective diameter on the image-side surface of the fourth lens element and the optical axis is Y42, the following condition can be satisfied: $0.8 < Y11/Y42 < 1.2$. Therefore, it is favorable for adjusting the outer diameter of the optical image capturing assembly to maintain a proper ratio, so that the volume of the optical image capturing can be reduced.

When an f-number of the optical image capturing assembly is Fno, the following condition can be satisfied: $1.60 < Fno < 3.20$. Therefore, it is favorable for maintaining the optical image capturing assembly with a sufficient and proper brightness on the image surface.

When half of a maximum field of view of the optical image capturing assembly is HFOV, the following condition can be satisfied: 10 degrees $< HFOV <$ 20 degrees. Therefore, it is favorable for featuring the optical image capturing assembly with small field of view and telephoto property.

When the axial distance between the object-side surface of the first lens element and the image-side surface of the fourth lens element is TD, the following condition can be satisfied: 2.2 mm<TD<5.2 mm. Therefore, it is favorable for maintaining the volume of the optical image capturing assembly.

Each of the aforementioned features of the optical image capturing assembly can be utilized in numerous combinations, so as to achieve the corresponding effects.

According to the optical image capturing assembly of the present disclosure, the axial distances (such as BL, SL and TL) are measured along the optical axis even when the optical axis is folded.

According to the optical image capturing assembly of the present disclosure, the lens elements thereof can be made of a plastic material or a glass material. When the lens elements are made of a plastic material, the manufacturing cost can be effectively reduced. When the lens elements are made of a glass material, the arrangement of the refractive power of the optical image capturing assembly may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the optical image capturing assembly can also be reduced.

According to the optical image capturing assembly of the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the optical image capturing assembly of the present disclosure, the refractive power of a lens element being positive or negative or the focal length of the lens element may refer to the refractive power or the focal length in the paraxial region of the lens element.

According to the optical image capturing assembly of the present disclosure, the optical image capturing assembly can include at least one stop, such as an aperture stop, a glare stop or a field stop. The glare stop or the field stop is for eliminating the stray light and thereby improving the image resolution thereof.

According to the optical image capturing assembly of the present disclosure, the image surface, depending on the corresponding image sensor, can be a planar surface or a curved surface with any curvature, particularly a curved surface being concave toward the object side.

According to the optical image capturing assembly of the present disclosure, at least one image correcting element (such as a field flattener) can be selectively disposed between a lens element closet to the image surface and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the optical image capturing assembly of the present disclosure, an aperture stop can be configured as a front stop or a middle stop. A front stop disposed between an imaged object and the first lens element can provide a longer distance between an exit pupil of the optical image capturing assembly and the image surface to enable a telecentric effect, and thereby can improve the image-sensing efficiency of an image sensor. A middle stop disposed between the first lens element and the image surface is favorable for enlarging the field of view of the optical image capturing assembly and thereby provides a wider field of view for the same.

According to the optical image capturing assembly of the present disclosure, the optical image capturing assembly can be applied to 3D (three-dimensional) image capturing applications, in products such as digital cameras, mobile devices, digital tablets, smart TVs, network monitoring devices, motion sensing input devices, wearable devices and other electronic imaging products.

According to the present disclosure, an imaging apparatus is provided. The imaging apparatus includes the aforementioned optical image capturing assembly according to the present disclosure and an image sensor, wherein the image sensor is disposed on or near the image surface of the aforementioned optical image capturing assembly. With the proper thicknesses of the lens elements, the distances between every two lens elements, and the arrangement of refractive power and materials, a telephoto structure with four lens elements which has a compact size by reducing the outer diameter and has high image quality can be obtained. The imaging apparatus can further adopt a reflecting element for increasing the flexibility of the spatial arrangement. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following 1st-14th specific embodiments are provided for further explanation.

1st Embodiment

Figure 2:
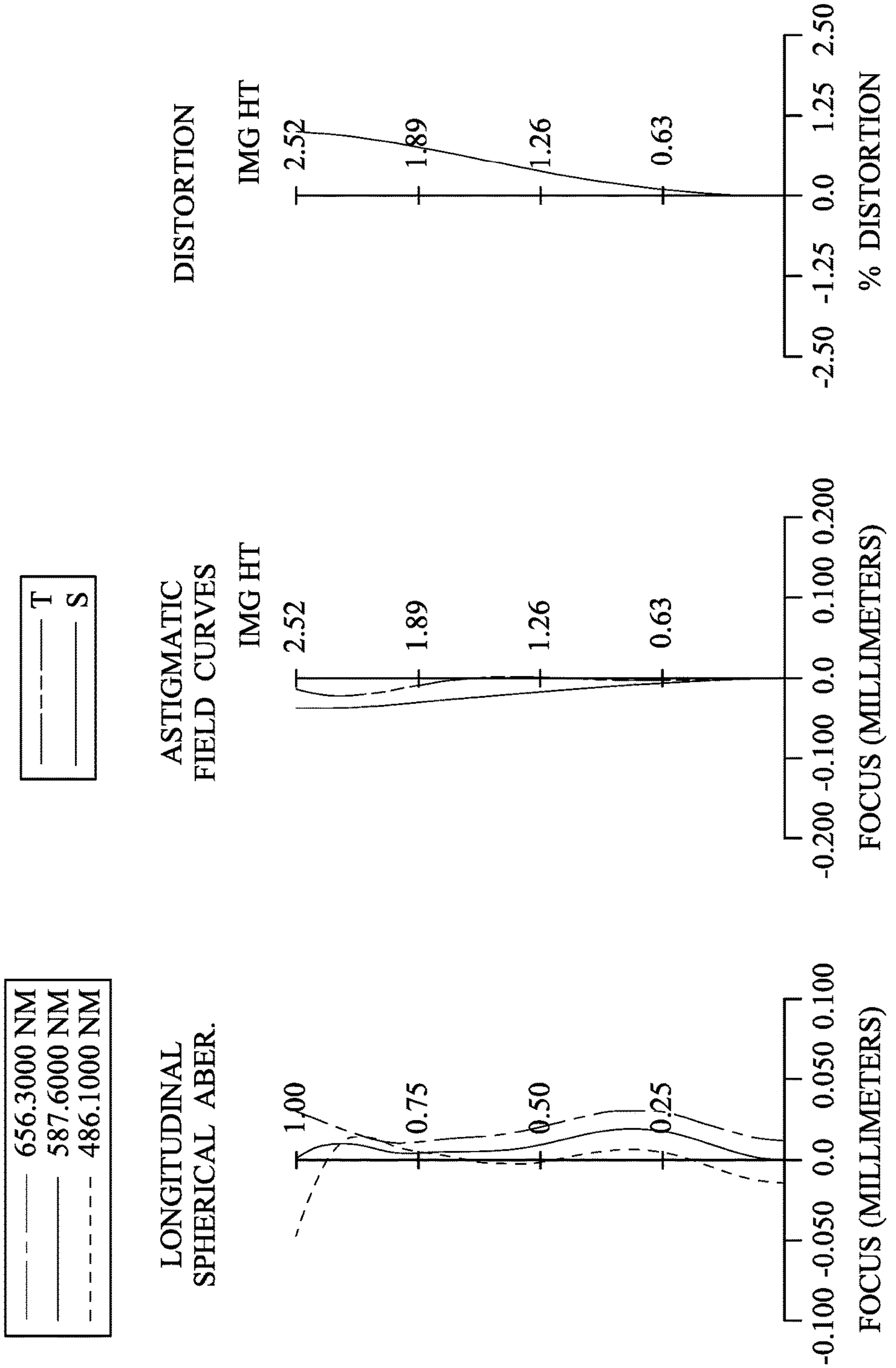
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an optical image capturing assembly (its reference numeral is omitted) and an image sensor 170. The optical image capturing assembly includes, in order from an object side to an image side, an aperture stop 100, a first lens element 110, a second lens element 120, a third lens element 130, a fourth lens element 140, an IR-cut filter 150 and an image surface 160. The image sensor 170 is disposed on the image surface 160 of the optical image capturing assembly. The optical image capturing assembly includes four lens elements, (110, 120, 130 and 140) without additional one or more lens elements inserted between the first lens element 110 and the fourth lens element 140, and there is an air space between the first lens element 110 and the second lens element 120.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes at least one inflection point.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The IR-cut filter 150 is made of a glass material and located between the fourth lens element 140 and the image surface 160, and will not affect the focal length of the optical image capturing assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image capturing assembly according to the 1st embodiment, when a focal length of the optical image capturing assembly is f, an f-number of the optical image capturing assembly is Fno, and half of a maximum field of view of the optical image capturing assembly is HFOV, these parameters have the following values: f=8.61 mm; Fno=2.69; and HFOV=16.1 degrees.

In the optical image capturing assembly according to the 1st embodiment, when an Abbe number of the second lens element 120 is V2, an Abbe number of the third lens element 130 is V3, and an Abbe number of the fourth lens element 140 is V4, the following conditions are satisfied: V2=20.4; V3=20.4; and V2+V3+V4=63.3.

Figure 21:
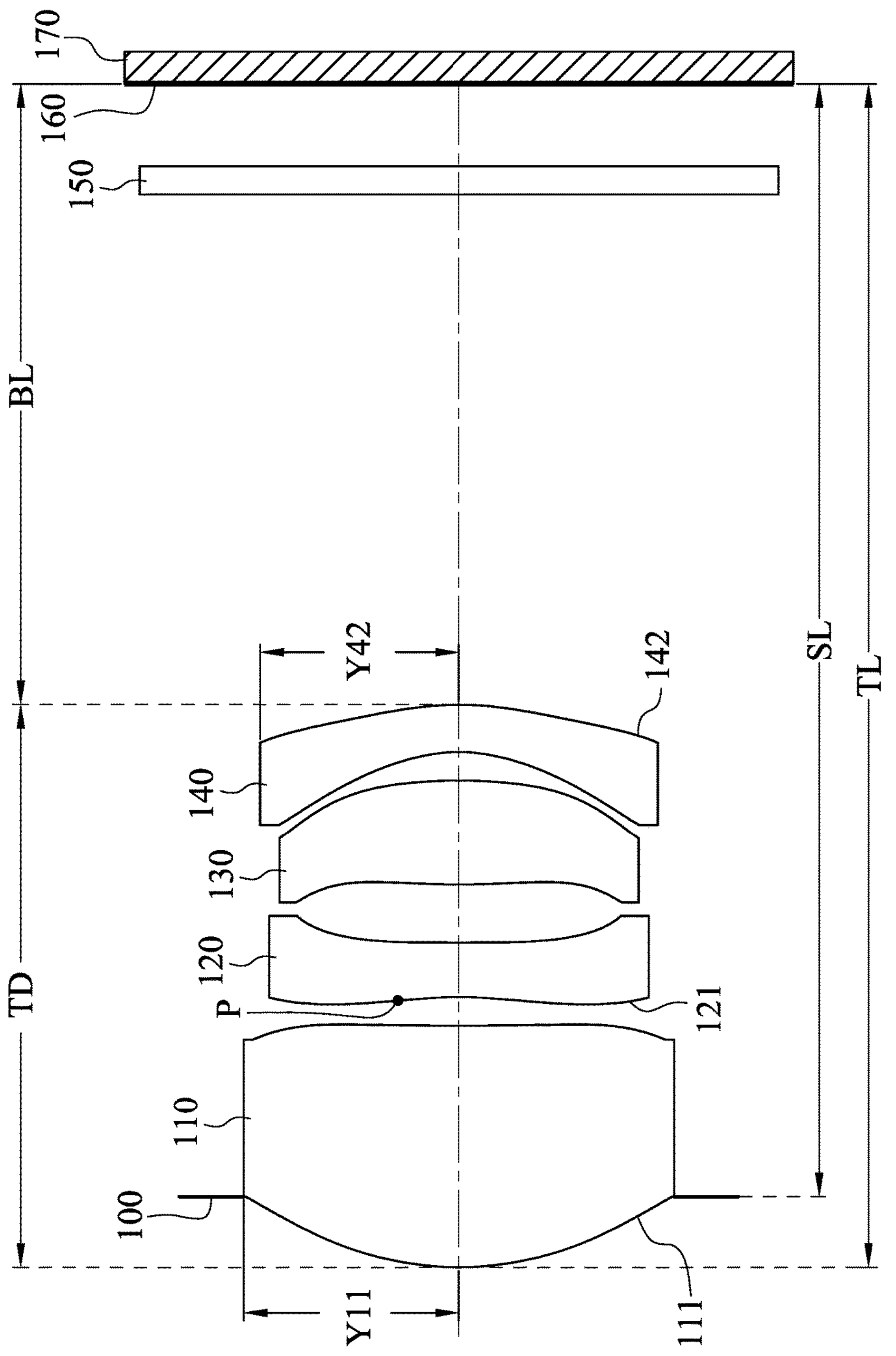
FIG. 21 is a schematic view showing an inflection point on an object-side surface of a second lens element and parameters of BL, SL, TD, TL, Y11 and Y42 of the imaging apparatus according to the 1st embodiment in FIG. 1.

FIG. 21 is a schematic view showing an inflection point P on the object-side surface 121 of the second lens element 120 and parameters of BL, SL, TD, TL, Y11 and Y42 of the imaging apparatus according to the 1st embodiment in FIG. 1. In the optical image capturing assembly according to the 1st embodiment, when an axial distance between the image-side surface 142 of the fourth lens element 140 and the image surface 160 is BL, and an axial distance between the object-side surface 111 of the first lens element 110 and the image surface 160 is TL, the following condition is satisfied: BL/TL=0.52.

In the optical image capturing assembly according to the 1st embodiment, when a central thickness of the first lens element 110 is CT1, a central thickness of the second lens element 120 is CT2, a central thickness of the third lens element 130 is CT3, an axial distance between the second lens element 120 and the third lens element 130 is T23, and an axial distance between the third lens element 130 and the fourth lens element 140 is 134, the following conditions are satisfied: CT1/(CT2+123+CT3)=1.12; and CT3/T34=3.66.

Referring back to FIG. 21, in the optical image capturing assembly according to the 1st embodiment, when an axial distance between the aperture stop 100 and the image surface 160 is SL, and the axial distance between the object-side surface 111 of the first lens element 110 and the image surface 160 is TL, the following condition is satisfied: SL/TL=0.94.

In the optical image capturing assembly according to the 1st embodiment, when the axial distance between the second lens element 120 and the third lens element 130 is T23, the axial distance between the third lens element 130 and the fourth lens element 140 is T34, and the central thickness of the third lens element 130 is CT3, the following condition is satisfied: (T23+T34)/CT3=0.83.

In the optical image capturing assembly according to the 1st embodiment, when an axial distance between the first lens element 110 and the second lens element 120 is T12, the axial distance between the second lens element 120 and the third lens element 130 is T23, and the axial distance between the third lens element 130 and the fourth lens element 140 is T34, a sum of the axial distances between every two lens elements of the first lens element 110, the second lens element 120, the third lens element 130 and the fourth lens element 140 adjacent to each other is ΣAT (in the 1st embodiment, ΣAT=T12+T23+134=0.212 mm+0.432 mm+0.212 mm=0.856 mm). Referring back to FIG. 21, when an axial distance between the object-side surface 111 of the first lens element 110 and the image-side surface 142 of the fourth lens element 140 is TD, the following conditions are satisfied: TD=4.19 mm; and TD/ΣAT=4.89.

In the optical image capturing assembly according to the 1st embodiment, when a curvature radius of the object-side surface 121 of the second lens element 120 is R3, a curvature radius of the image-side surface 122 of the second lens element 120 is R4, a curvature radius of the image-side surface 132 of the third lens element 130 is R6, a curvature radius of the object-side surface 141 of the fourth lens element 140 is R7, a curvature radius of the image-side surface 142 of the fourth lens element 140 is R8, and the focal length of the optical image capturing assembly is f, the following conditions are satisfied: R3/|R4|=−0.02; R3/f=−0.36; |R6/R7|=3.45; and |R8|/f=0.27.

In the optical image capturing assembly according to the 1st embodiment, when a focal length of the first lens element 110 is f1, a focal length of the second lens element 120 is f2, and a focal length of the third lens element 130 is f3, the following conditions are satisfied: f1/|f2|=0.96; and f1/f3=1.11.

In the optical image capturing assembly according to the 1st embodiment, an entrance pupil diameter of the optical image capturing assembly is EPD, and a maximum image height of the optical image capturing assembly (half of a diagonal length of an effective photosensitive area of the image sensor 170) is ImgH. Referring back to FIG. 21, when a vertical distance between a maximum effective diameter on the object-side surface 111 of the first lens element 110 and an optical axis is Y11, and a vertical distance between a maximum effective diameter on the image-side surface 142 of the fourth lens element 140 and the optical axis is Y42, the following conditions are satisfied: EPD/ImgH=1.27, EPD/Y42=2.16, and Y11/Y42=1.08.

Referring back to FIG. 21, in the optical image capturing assembly according to the 1st embodiment, the object-side surface 121 of the second lens element 120 includes at least one inflection point P.

The detailed optical data of the 1st embodiment are shown in TABLE 1 and the aspheric surface data are shown in TABLE 2 below.

TABLE 1

| 1st Embodiment<br>f = 8.61 mm, Fno = 2.69, HFOV = 16.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.525 | | | | |
| 2 | Lens 1 | 2.398 | ASP | 1.800 | Plastic | 1.545 | 56.1 | 4.48 |
| 3 | | 100.000 | ASP | 0.212 | | | | |
| 4 | Lens 2 | −3.126 | ASP | 0.405 | Plastic | 1.660 | 20.4 | −4.64 |
| 5 | | 163.427 | ASP | 0.432 | | | | |
| 6 | Lens 3 | 6.142 | ASP | 0.776 | Plastic | 1.660 | 20.4 | 4.03 |
| 7 | | −4.463 | ASP | 0.212 | | | | |
| 8 | Lens 4 | −1.292 | ASP | 0.352 | Plastic | 1.642 | 22.5 | −5.31 |
| 9 | | −2.304 | ASP | 3.800 | | | | |
| 10 | IR-cut filter | Plano | | 0.210 | Glass | 1.517 | 64.2 | — |
| 11 | | Plano | | 0.611 | | | | |
| 12 | Image | Plano | | — | | | | |

Reference wavelength is 587.6 nm (d-line).
The effective radius of the surface 9 is 1.480 mm.

TABLE 2

| Aspheric Coefficients | | | | |
|---|---|---|---|---|
| Surface # | 2 | 3 | 4 | 5 |
| k = | −3.9766E−01 | −9.0000E+01 | −1.9970E−01 | 9.0000E+01 |
| A4 = | −4.9458E−04 | 3.3713E−02 | 1.9467E−01 | 1.1646E−01 |
| A6 = | 1.3993E−03 | −2.9513E−02 | −1.5772E−01 | −8.2102E−02 |
| A8 = | −2.4923E−03 | −1.0872E−02 | 1.0809E−01 | 2.9476E−02 |
| A10 = | 9.2391E−04 | 1.2140E−02 | −4.7836E−02 | 4.3476E−02 |
| A12 = | −2.1182E−04 | −3.5758E−03 | 1.2697E−02 | −4.0679E−02 |
| A14 = | | 3.6449E−04 | −1.5337E−03 | 1.2412E−02 |
| Surface # | 6 | 7 | 8 | 9 |
| k = | −1.6777E+01 | 6.0454E+00 | −5.0417E−01 | 5.7788E−01 |
| A4 = | −7.8649E−02 | −7.6269E−02 | 9.8790E−02 | 1.0138E−01 |
| A6 = | 1.6131E−03 | 3.0657E−02 | 4.0071E−02 | 9.0112E−03 |
| A8 = | −7.3479E−02 | −7.1273E−02 | −1.1416E−01 | −4.3024E−02 |
| A10 = | 8.5714E−02 | 7.1082E−02 | 1.0854E−01 | 3.1810E−02 |
| A12 = | −5.4518E−02 | −3.2926E−02 | −5.8190E−02 | −1.4439E−02 |
| A14 = | 1.5557E−02 | 6.7068E−03 | 1.8614E−02 | 4.0367E−03 |
| A16 = | | | −2.5615E−03 | −4.9392E−04 |

In TABLE 1, the curvature radius, the thickness and the focal length are shown in millimeters (mm). Surface numbers 0-12 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
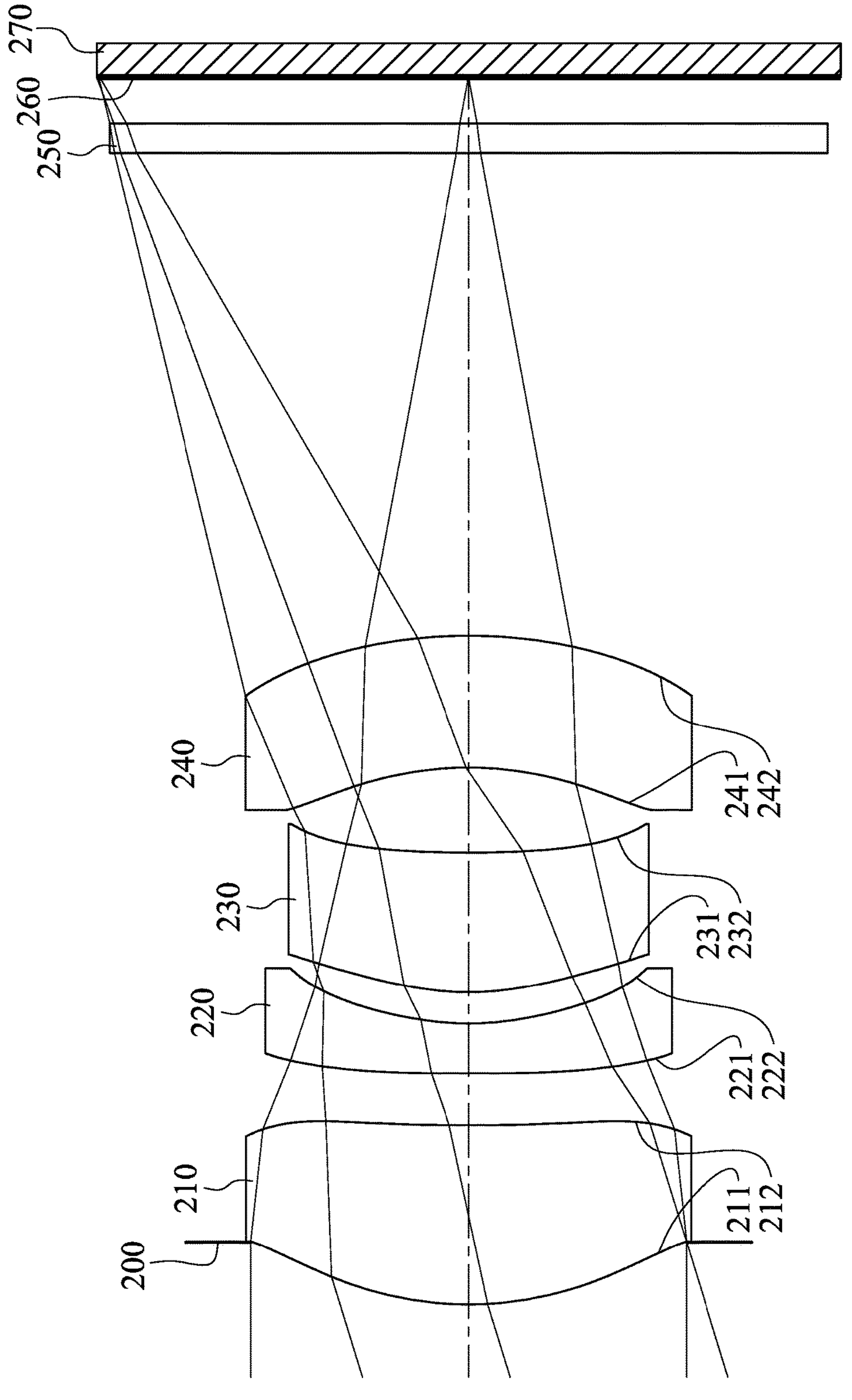
FIG. 3 is a schematic view of an imaging apparatus according to the 2nd embodiment of the present disclosure.
Figure 4:
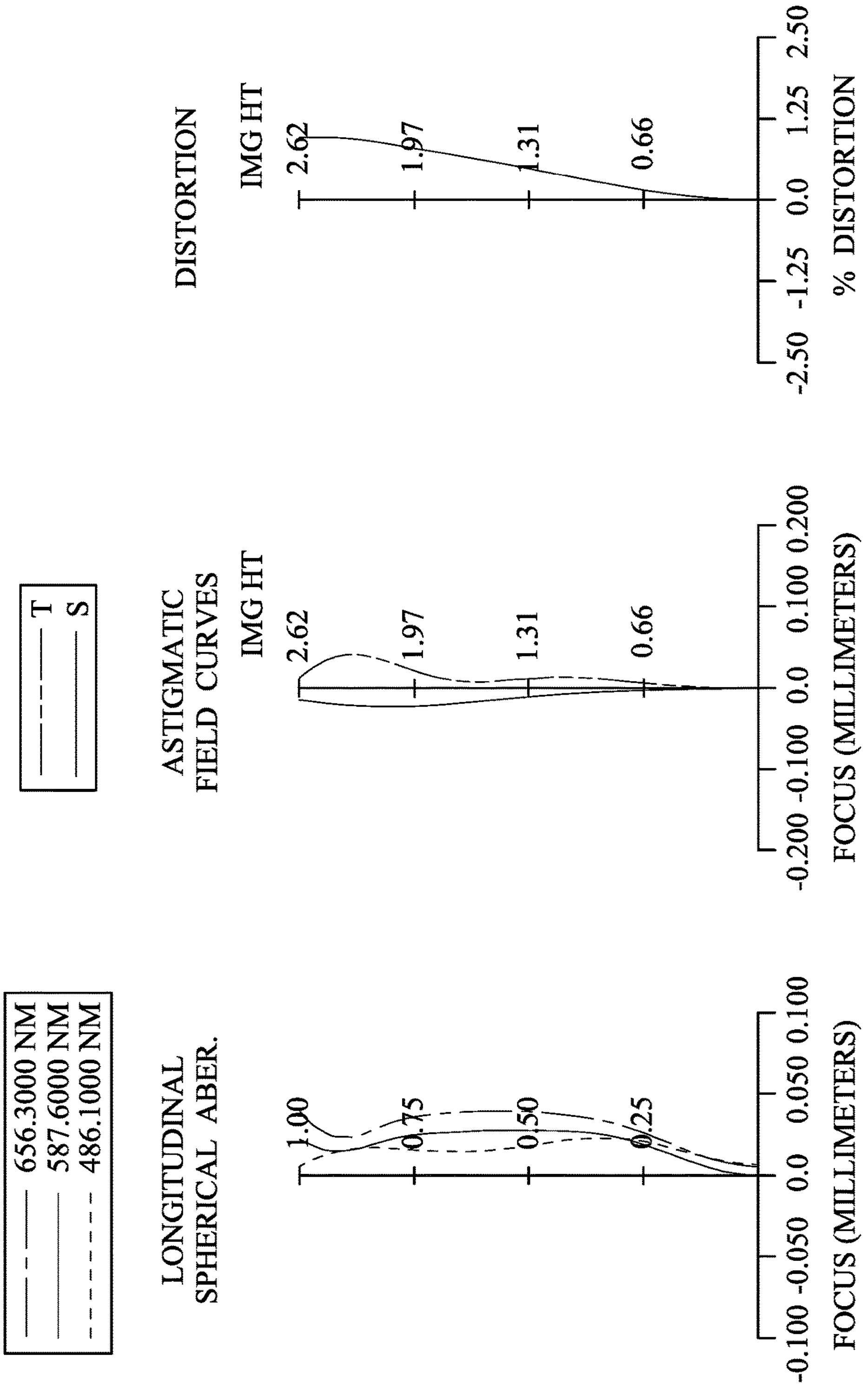
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an optical image capturing assembly (its reference numeral is omitted) and an image sensor 270. The optical image capturing assembly includes, in order from an object side to an image side, an aperture stop 200, a first lens element 210, a second lens element 220, a third lens element 230, a fourth lens element 240, an IR-cut filter 250 and an image surface 260. The image sensor 270 is disposed on the image surface 260 of the optical image capturing assembly. The optical image capturing assembly includes four lens elements (210, 220, 230 and 240) without additional one or more lens elements inserted between the first lens element 210 and the fourth lens element 240, and there is an air space between the first lens element 210 and the second lens element 220.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The IR-cut filter 250 is made of a glass material and located between the fourth lens element 240 and the image surface 260, and will not affect the focal length of the optical image capturing assembly.

The detailed optical data of the 2nd embodiment are shown in TABLE 3 and the aspheric surface data are shown in TABLE 4 below.

TABLE 3

2nd Embodiment
f = 8.41 mm, Fno = 2.74, HFOV = 17.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.441 | | | | |
| 2 | Lens 1 | 2.424 | ASP | 1.265 | Plastic | 1.545 | 56.0 | 4.84 |
| 3 | | 24.690 | ASP | 0.365 | | | | |
| 4 | Lens 2 | 200.000 | ASP | 0.350 | Plastic | 1.671 | 19.3 | −3.11 |
| 5 | | 2.061 | ASP | 0.221 | | | | |
| 6 | Lens 3 | 2.020 | ASP | 0.983 | Plastic | 1.650 | 21.5 | 3.89 |
| 7 | | 8.106 | ASP | 0.600 | | | | |
| 8 | Lens 4 | −2.407 | ASP | 0.931 | Plastic | 1.614 | 26.0 | −18.16 |
| 9 | | −3.522 | ASP | 3.400 | | | | |
| 10 | IR-cut filter | Plano | | 0.210 | Glass | 1.517 | 64.2 | — |
| 11 | | Plano | | 0.326 | | | | |
| 12 | Image | Plano | | — | | | | |

Reference wavelength is 587.6 nm (d-line).
The effective radius of the surface 9 is 1.570 mm.

TABLE 4

Aspheric Coefficients

| Surface # | 2 | 3 | 4 | 5 |
|---|---|---|---|---|
| k = | −3.7659E−01 | 4.5530E+01 | −9.0000E+01 | −5.6892E+00 |
| A4 = | −9.3697E−04 | 3.9270E−02 | 7.9648E−02 | 7.4676E−03 |
| A6 = | 8.4716E−04 | −3.3258E−02 | −6.5110E−02 | −3.7618E−03 |
| A8 = | −3.6074E−03 | −9.9979E−04 | 3.7244E−02 | 3.6513E−03 |
| A10 = | 1.1683E−03 | 3.0156E−03 | −1.1822E−02 | 1.6870E−02 |
| A12 = | −3.1832E−04 | −4.9592E−04 | 1.7791E−03 | −5.6791E−03 |

| Surface # | 6 | 7 | 8 | 9 |
|---|---|---|---|---|
| k = | −4.5302E−01 | 2.0334E+01 | 3.6062E−01 | 1.1439E+00 |
| A4 = | −9.7991E−02 | 1.9059E−02 | 1.6653E−02 | 3.8496E−03 |
| A6 = | 4.1300E−02 | 1.3411E−02 | −7.0089E−03 | −3.3796E−03 |
| A8 = | −2.8623E−02 | −2.8368E−02 | 3.1175E−02 | −3.1104E−03 |
| A10 = | 1.3362E−02 | 3.5898E−02 | −4.9174E−02 | 6.9763E−03 |
| A12 = | 4.6440E−03 | −1.4971E−02 | 4.3041E−02 | −5.4655E−03 |
| A14 = | −3.7447E−03 | 1.9960E−03 | −1.8099E−02 | 1.8702E−03 |
| A16 = | | | 3.2108E−03 | −2.4113E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 8.41 | TD (mm) | 4.72 |
| Fno | 2.74 | TD/ΣAT | 3.98 |
| HFOV (deg.) | 17.1 | R3/\|R4\| | 97.05 |
| V2 | 19.3 | R3/f | 23.79 |
| V3 | 21.5 | \|R6/R7\| | 3.37 |
| V2 + V3 + V4 | 66.7 | \|R8\|/f | 0.42 |
| BL/TL | 0.45 | f1/\|f2\| | 1.56 |
| CT1/(CT2 + T23 + CT3) | 0.81 | f1/f3 | 1.24 |
| CT3/T34 | 1.64 | EPD/ImgH | 1.17 |
| SL/TL | 0.95 | EPD/Y42 | 1.95 |
| (T23 + T34)/CT3 | 0.84 | Y11/Y42 | 0.98 |

3rd Embodiment

Figure 5:
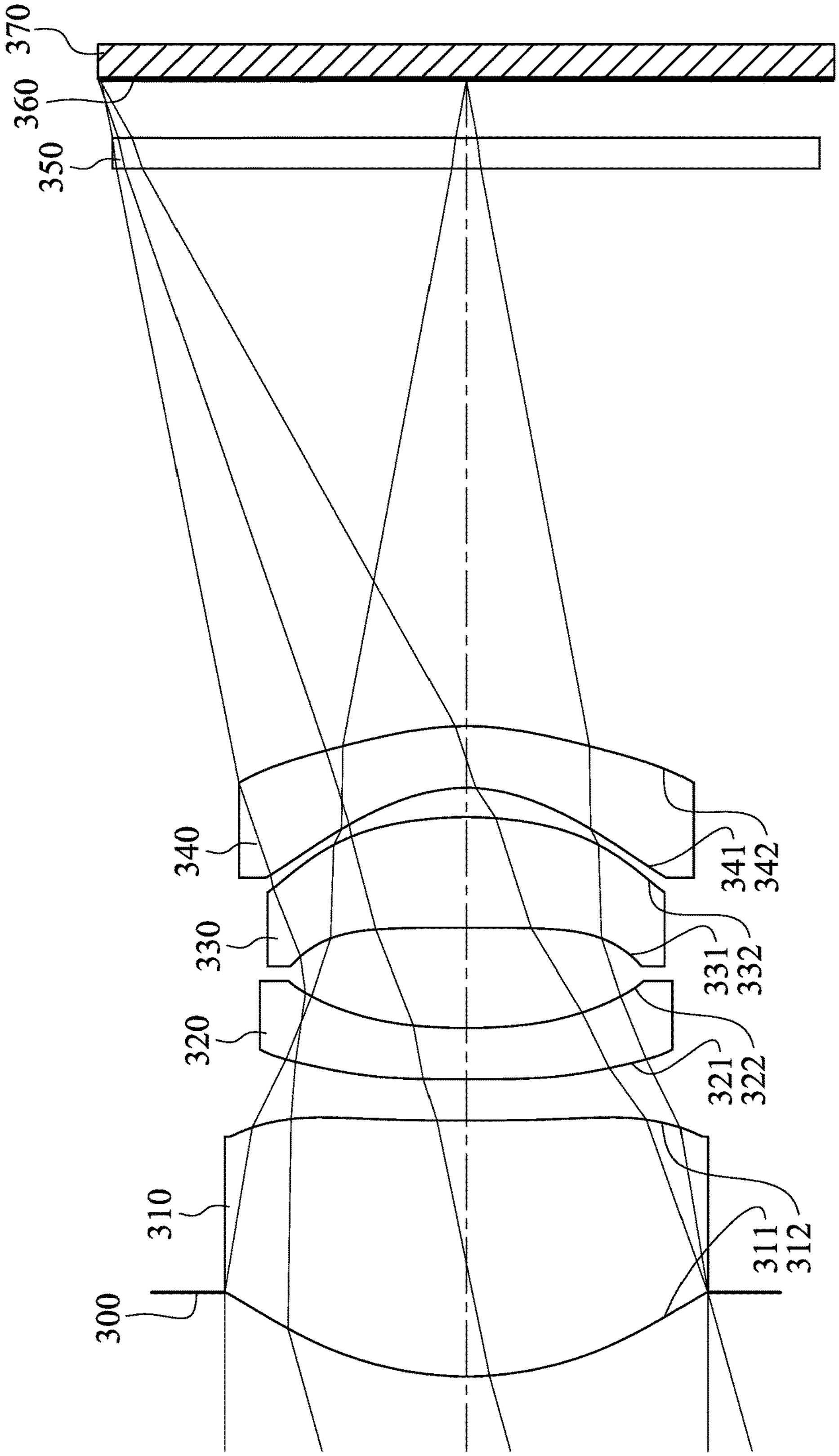
FIG. 5 is a schematic view of an imaging apparatus according to the 3rd embodiment of the present disclosure.
Figure 6:
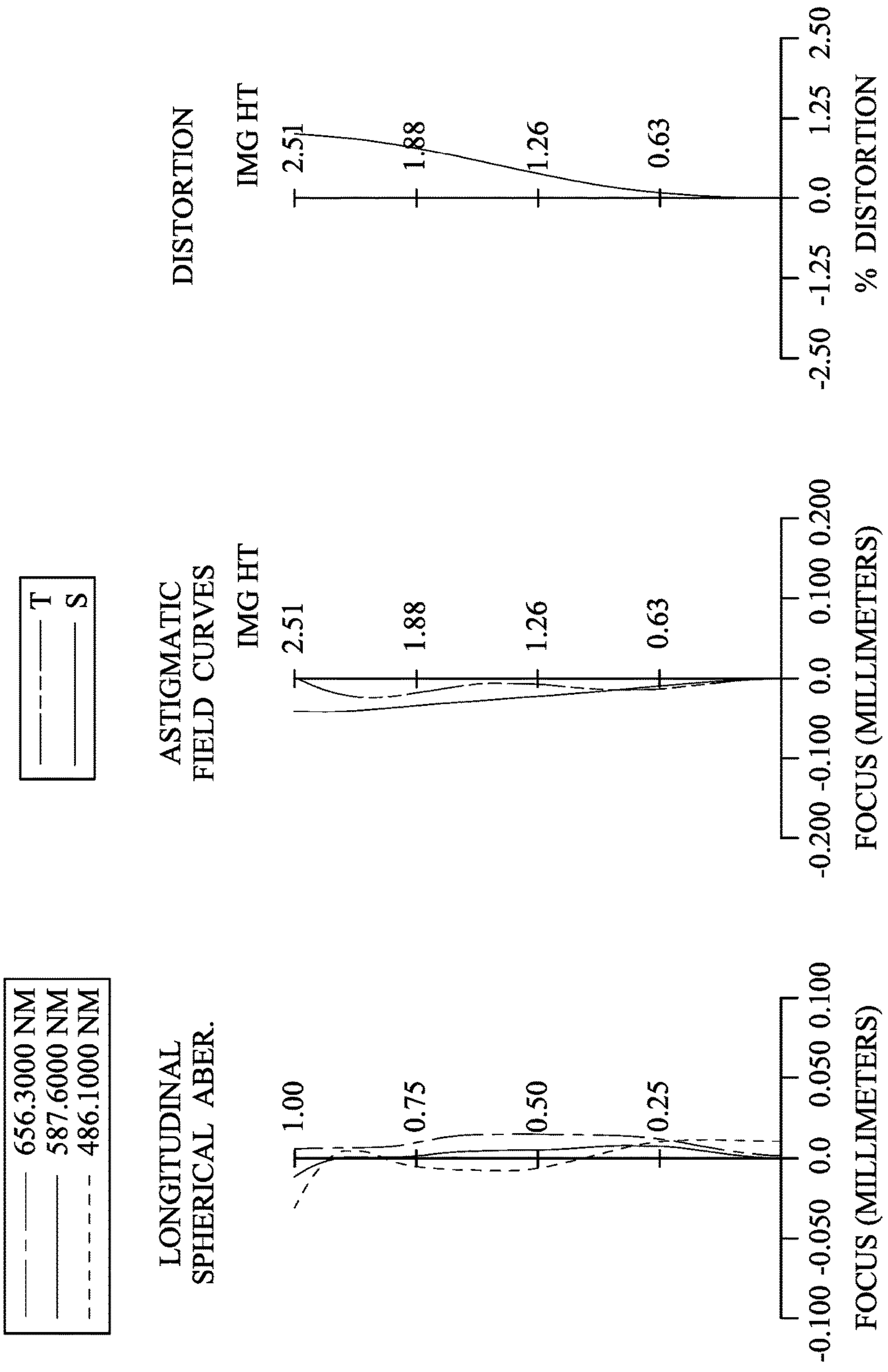
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an optical image capturing assembly (its reference numeral is omitted) and an image sensor 370. The optical image capturing assembly includes, in order from an object side to an image side, an aperture stop 300, a first lens element 310, a second lens element 320, a third lens element 330, a fourth lens element 340, an IR-cut filter 350 and an image surface 360. The image sensor 370 is disposed on the image surface 360 of the optical image capturing assembly. The optical image capturing assembly includes four lens elements (310, 320, 330 and 340) without additional one or more lens elements inserted between the first lens element 310 and the fourth lens element 340, and there is an air space between the first lens element 310 and the second lens element 320.

The first lens element 310 with positive refractive power has an object-side surface 311 being convex in a paraxial region thereof and an image-side surface 312 being concave in a paraxial region thereof. The first lens element 310 is made of a glass material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The IR-cut filter 350 is made of a glass material and located between the fourth lens element 340 and the image surface 360, and will not affect the focal length of the optical image capturing assembly.

The detailed optical data of the 3rd embodiment are shown in TABLE 5 and the aspheric surface data are shown in TABLE 6 below.

TABLE 5

3rd Embodiment
f = 8.93 mm, Fno = 2.71, HFOV = 15.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.573 | | | | |
| 2 | Lens 1 | 2.333 | ASP | 1.746 | Glass | 1.497 | 81.3 | 4.88 |
| 3 | | 45.014 | ASP | 0.282 | | | | |
| 4 | Lens 2 | 200.000 | ASP | 0.350 | Plastic | 1.642 | 22.5 | −6.96 |
| 5 | | 4.364 | ASP | 0.682 | | | | |
| 6 | Lens 3 | −228.153 | ASP | 0.756 | Plastic | 1.639 | 23.5 | 4.47 |
| 7 | | −2.821 | ASP | 0.200 | | | | |
| 8 | Lens 4 | −1.117 | ASP | 0.422 | Plastic | 1.614 | 26.0 | −4.86 |
| 9 | | −2.043 | ASP | 3.800 | | | | |
| 10 | IR-cut filter | Plano | | 0.210 | Glass | 1.617 | 64.2 | — |
| 11 | | Plano | | 0.403 | | | | |
| 12 | Image | Plano | | — | | | | |

Reference wavelength is 587.6 nm (d-line).
The effective radius of the surface 9 is 1.550 mm.

TABLE 6

Aspheric Coefficients

| Surface # | 2 | 3 | 4 | 5 |
|---|---|---|---|---|
| k = | −4.0757E−01 | 9.0000E+01 | −9.0000E+01 | 1.0006E+01 |
| A4 = | −7.3272E−04 | 4.9484E−02 | 1.7161E−01 | 1.1922E−01 |
| A6 = | 2.0606E−03 | −3.9739E−02 | −1.5337E−01 | −1.0576E−01 |
| A8 = | −2.8140E−03 | −8.9969E−03 | 9.3862E−02 | 2.6762E−02 |
| A10 = | 9.9100E−04 | 1.2248E−02 | −4.6353E−02 | 3.7538E−02 |
| A12 = | −2.0853E−04 | −3.6259E−03 | 1.4850E−02 | −3.9876E−02 |
| A14 = | | 3.7141E−04 | −1.7696E−03 | 1.1995E−02 |

| Surface # | 6 | 7 | 8 | 9 |
|---|---|---|---|---|
| k = | −9.0000E+01 | 2.1907E+00 | −5.1087E−01 | 2.2842E−01 |
| A4 = | −6.4318E−02 | −5.0907E−02 | 1.3009E−01 | 9.8594E−02 |
| A6 = | −1.3826E−02 | 2.8708E−02 | 4.1305E−02 | 1.0112E−02 |
| A8 = | −6.3272E−02 | −6.6370E−02 | −1.0991E−01 | −4.2466E−02 |
| A10 = | 7.6501E−02 | 6.9334E−02 | 1.1031E−01 | 3.2384E−02 |
| A12 = | −5.3732E−02 | −3.3311E−02 | −5.8855E−02 | −1.4593E−02 |
| A14 = | 1.4729E−02 | 7.0141E−03 | 1.8010E−02 | 3.8247E−03 |
| A16 = | | | −2.2589E−03 | −4.2467E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 8.93 | TD (mm) | 4.44 |
| Fno | 2.71 | TD/ΣAT | 3.81 |
| HFOV (deg.) | 15.6 | R3/\|R4\| | 45.83 |
| V2 | 22.5 | R3/f | 22.41 |
| V3 | 23.5 | \|R6/R7\| | 2.53 |
| V2 + V3 + V4 | 71.9 | \|R8\|/f | 0.23 |
| BL/TL | 0.50 | f1/\|f2\| | 0.70 |
| CT1/(CT2 + T23 + CT3) | 0.98 | f1/f3 | 1.09 |
| CT3/T34 | 3.78 | EPD/ImgH | 1.31 |
| SL/TL | 0.94 | EPD/Y42 | 2.12 |
| (T23 + T34)/CT3 | 1.17 | Y11/Y42 | 1.06 |

4th Embodiment

Figure 7:
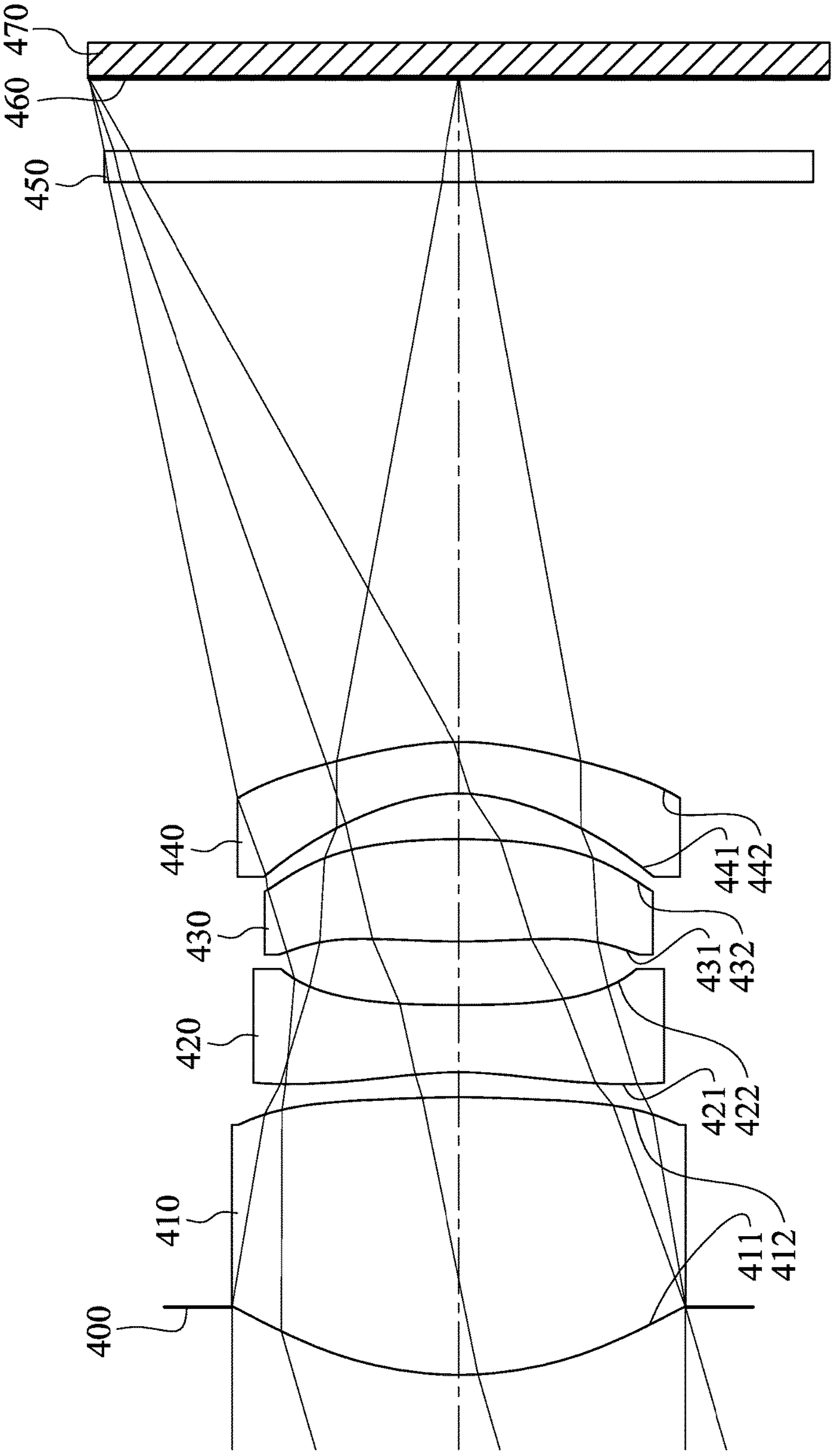
FIG. 7 is a schematic view of an imaging apparatus according to the 4th embodiment of the present disclosure.
Figure 8:
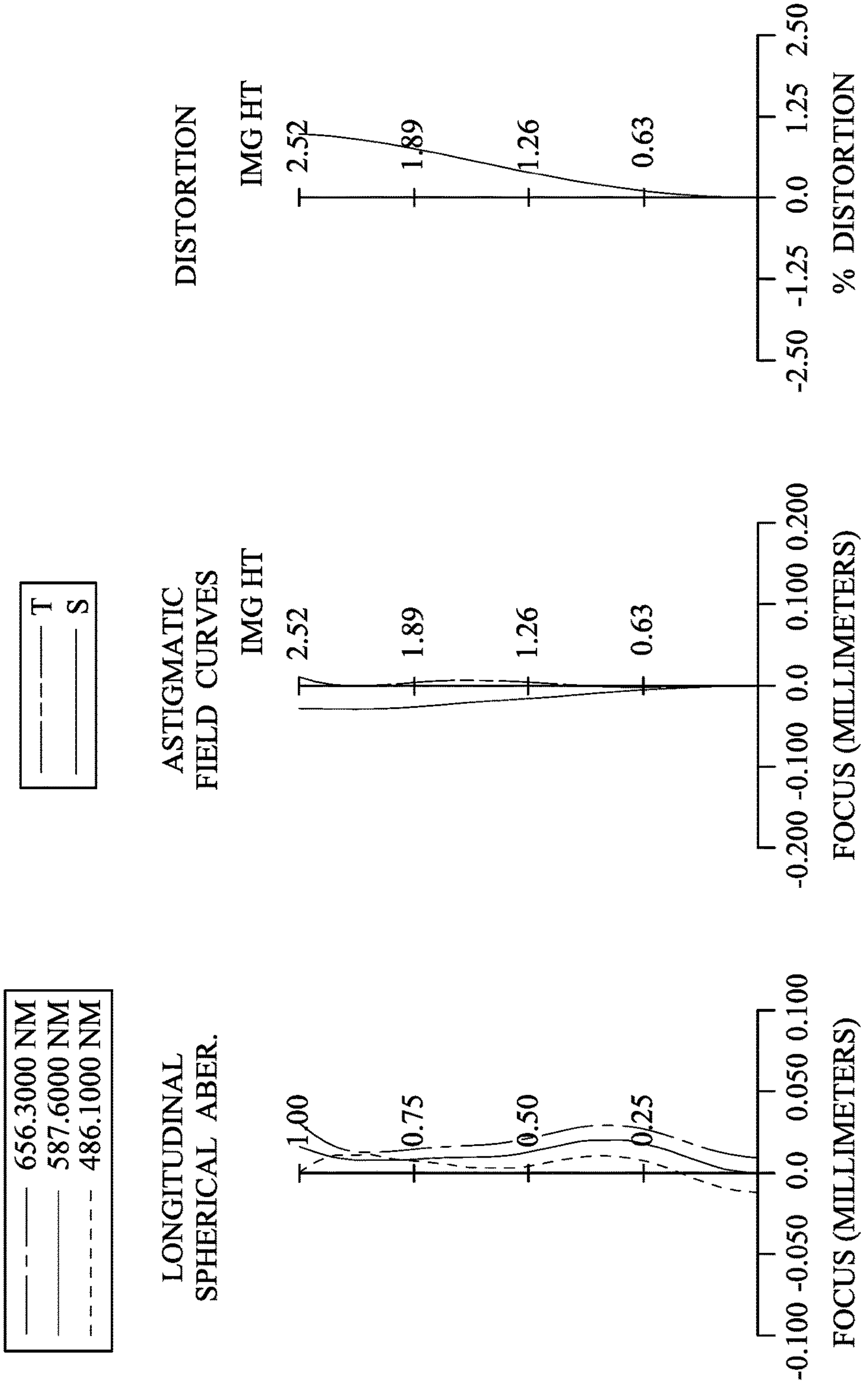
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an optical image capturing assembly (its reference numeral is omitted) and an image sensor 470. The optical image capturing assembly includes, in order from an object side to an image side, an aperture stop 400, a first lens element 410, a second lens element 420, a third lens element 430, a fourth lens element 440, an IR-cut filter 450 and an image surface 460. The image sensor 470 is disposed on the image surface 460 of the optical image capturing assembly. The optical image capturing assembly includes four lens elements (410, 420, 430 and 440) without additional one or more lens elements inserted between the first lens element 410 and the fourth lens element 440, and there is an air space between the first lens element 410 and the second lens element 420.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes at least one inflection point.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The IR-cut filter 450 is made of a glass material and located between the fourth lens element 440 and the image surface 460, and will not affect the focal length of the optical image capturing assembly.

The detailed optical data of the 4th embodiment are shown in TABLE 7 and the aspheric surface data are shown in TABLE 8 below.

TABLE 7

| 4th Embodiment f = 8.61 mm, Fno = 2.80, HFOV = 16.1 deg. | | | | | | | | | |
|---|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.460 | | | | |
| 2 | Lens 1 | 2.494 | ASP | 1.885 | Plastic | 1.545 | 56.1 | 3.72 |
| 3 | | −7.963 | ASP | 0.169 | | | | |
| 4 | Lens 2 | −2.659 | ASP | 0.456 | Plastic | 1.639 | 23.3 | −3.43 |
| 5 | | 13.385 | ASP | 0.431 | | | | |
| 6 | Lens 3 | 6.681 | ASP | 0.697 | Plastic | 1.660 | 20.4 | 4.31 |
| 7 | | −4.756 | ASP | 0.308 | | | | |
| 8 | Lens 4 | −1.293 | ASP | 0.350 | Plastic | 1.639 | 23.3 | −6.05 |
| 9 | | −2.149 | ASP | 3.800 | | | | |
| 10 | IR-cut filter | Plano | | 0.210 | Glass | 1.517 | 64.2 | — |
| 11 | | Plano | | 0.497 | | | | |
| 12 | Image | Plano | | — | | | | |

Reference wavelength is 587.6 nm (d-line).
The effective radius of the surface 9 is 1.500 mm.

TABLE 8

| Aspheric Coefficients | | | | |
|---|---|---|---|---|
| Surface # | 2 | 3 | 4 | 5 |
| k = | −4.5113E−01 | 2.0756E+01 | −1.4038E+00 | 5.0789E+01 |
| A4 = | −1.2183E−03 | 5.1386E−02 | 2.0171E−01 | 1.1522E−01 |
| A6 = | 1.1065E−03 | −3.0194E−02 | −1.6093E−01 | −7.4500E−02 |
| A8 = | −2.2740E−03 | −1.0252E−02 | 1.0335E−01 | 2.3077E−02 |
| A10 = | 8.2120E−04 | 1.2513E−02 | −4.7501E−02 | 4.2117E−02 |
| A12 = | −19566E−04 | −3.8735E−03 | 1.3429E−02 | −4.0054E−02 |
| A14 = | | 4.4328E−04 | −1.6850E−03 | 1.2420E−02 |

TABLE 8-continued

| Aspheric Coefficients | | | | |
|---|---|---|---|---|
| Surface # | 6 | 7 | 8 | 9 |
| k = | −1.8847E+01 | 6.4340E−01 | −5.4878E−01 | 3.3879E−01 |
| A4 = | −7.5087E−02 | −6.2366E−02 | 9.9950E−02 | 8.8575E−02 |
| A6 = | 1.3150E−02 | 3.3514E−02 | 3.6706E−02 | 6.5043E−03 |
| A8 = | −7.4078E−02 | −7.3127E−02 | −1.1377E−01 | −4.0560E−02 |
| A10 = | 8.7141E−02 | 6.7889E−02 | 1.0760E−01 | 3.2489E−02 |
| A12 = | −5.3872E−02 | −3.3180E−02 | −5.9319E−02 | −1.4809E−02 |
| A14 = | 1.5338E−02 | 7.2817E−03 | 1.8158E−02 | 3.8365E−03 |
| A16 = | | | −2.1764E−03 | −4.2462E−04 |

in the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 8.61 | TD (mm) | 4.30 |
| Fno | 2.80 | TD/ΣAT | 4.73 |
| HFOV (deg.) | 16.1 | R3/\|R4\| | −0.20 |
| V2 | 23.3 | R3/f | −0.31 |
| V3 | 20.4 | \|R6/R7\| | 3.68 |
| V2 + V3 + V4 | 67.0 | \|R8\|/f | 0.25 |
| BL/TL | 0.51 | f1/\|f2\| | 1.08 |
| CT1/(CT2 + T23 + CT3) | 1.19 | f1/f3 | 0.86 |
| CT3/T34 | 2.26 | EPD/ImgH | 1.22 |
| SL/TL | 0.95 | EPD/Y42 | 2.05 |
| (T23 + T34)/CT3 | 1.06 | Y11/Y42 | 1.03 |

5th Embodiment

Figure 9:
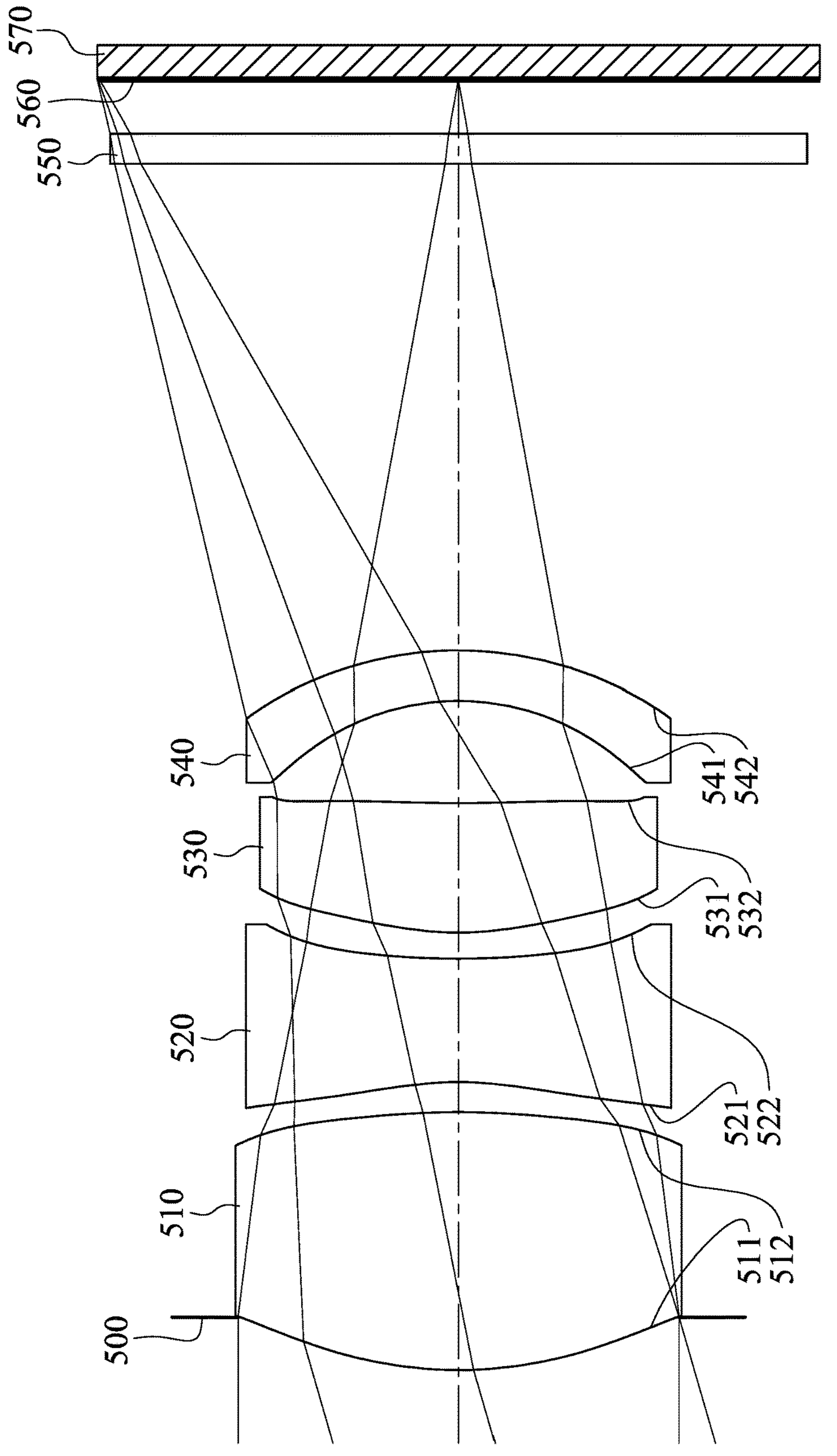
FIG. 9 is a schematic view of an imaging apparatus according to the 5th embodiment of the present disclosure.
Figure 10:
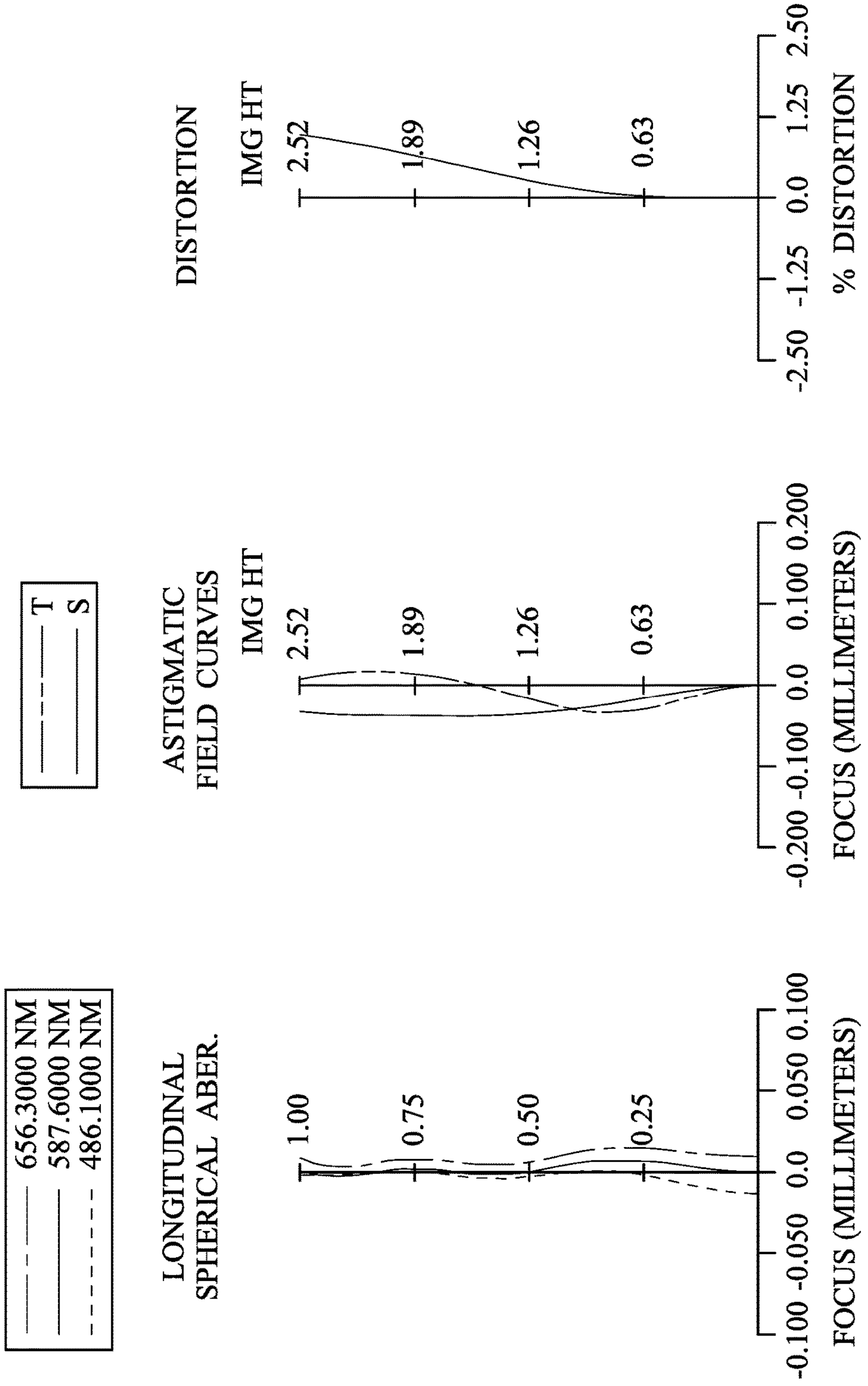
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an optical image capturing assembly (its reference numeral is omitted) and an image sensor 570. The optical image capturing assembly includes, in order from an object side to an image side, an aperture stop 500, a first lens element 510, a second lens element 520, a third lens element 530, a fourth lens element 540, an IR-cut filter 550 and an image surface 560. The image sensor 570 is disposed on the image surface 560 of the optical image capturing assembly. The optical image capturing assembly includes four lens elements (510, 520, 530 and 540) without additional one or more lens elements inserted between the first lens element 510 and the fourth lens element 540, and there is an air space between the first lens element 510 and the second lens element 520.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes at least one inflection point.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The IR-cut filter 550 is made of a glass material and located between the fourth lens element 540 and the image surface 560, and will not affect the focal length of the optical image capturing assembly.

The detailed optical data of the 5th embodiment are shown in TABLE 9 and the aspheric surface data are shown in TABLE 10 below.

TABLE 9

| 5th Embodiment<br>f = 8.61 mm, Fno = 2.80, HFOV = 16.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.370 | | | | |
| 2 | Lens 1 | 2.900 | ASP | 1.799 | Plastic | 1.545 | 56.1 | 3.71 |
| 3 | | −5.205 | ASP | 0.209 | | | | |
| 4 | Lens 2 | −2.420 | ASP | 0.862 | Plastic | 1.639 | 23.3 | −2.51 |
| 5 | | 5.411 | ASP | 0.183 | | | | |
| 6 | Lens 3 | 2.214 | ASP | 0.905 | Plastic | 1.660 | 20.4 | 4.01 |
| 7 | | 11.363 | ASP | 0.713 | | | | |
| 8 | Lens 4 | −1.731 | ASP | 0.350 | Plastic | 1.639 | 23.3 | −10.56 |
| 9 | | −2.512 | ASP | 3.400 | | | | |
| 10 | IR-cut filter | Plano | | 0.210 | Glass | 1.517 | 64.2 | — |

TABLE 9-continued

| 5th Embodiment f = 8.61 mm, Fno = 2.80, HFOV = 16.1 deg. | | | | | | | |
|---|---|---|---|---|---|---|---|
| Surface # | | Curvature Radius | Thickness | Material | Index | Abbe # | Focal Length |
| 11 | | Plano | 0.372 | | | | |
| 12 | Image | Plano | — | | | | |

Reference wavelength is 587.6 nm (d-line).
The effective radius of the surface 9 is 1.480 mm.

TABLE 10

| Aspheric Coefficients | | | | |
|---|---|---|---|---|
| Surface # | 2 | 3 | 4 | 5 |
| k = | −5.5952E−01 | 3.8224E+00 | −6.8157E−01 | −6.3713E+01 |
| A4 = | −3.3565E−03 | 4.6879E−02 | 1.4409E−01 | 1.9870E−02 |
| A6 = | 1.3108E−03 | −1.9780E−02 | −7.6330E−02 | 1.5957E−02 |
| A8 = | −2.5952E−03 | −12077E−03 | 3.3311E−02 | −1.1078E−02 |
| A10 = | 9.0776E−04 | 1.0660E−03 | −1.0959E−02 | 1.1871E−02 |
| A12 = | −1.7756E−04 | −5.4434E−05 | 1.6609E−03 | −3.8051E−03 |
| Surface # | 6 | 7 | 8 | 9 |
| k = | −1.1106E+00 | 6.8498E+01 | 1.3712E−01 | 1.2042E+00 |
| A4 = | −1.1394E−01 | −4.2626E−02 | 1.2659E−02 | 1.7405E−02 |
| A6 = | 5.9022E−02 | 2.4275E−03 | −2.6256E−02 | −2.7393E−03 |
| A8 = | −2.1686E−02 | −1.5243E−02 | 4.6460E−02 | 4.8702E−04 |
| A10 = | 6.5646E−03 | 2.8957E−02 | −5.3207E−02 | 5.8938E−03 |
| A12 = | 2.5852E−03 | −1.9093E−02 | 4.1950E−02 | −5.6208E−03 |
| A14 = | −1.3078E−03 | 5.2714E−03 | −1.8801E−02 | 2.2239E−03 |
| A16 = | | | 3.8395E−03 | −3.1716E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 8.61 | TD (mm) | 5.02 |
| Fno | 2.80 | TD/ΣAT | 4.54 |
| HFOV (deg.) | 16.1 | R3/\|R4\| | −0.45 |
| V2 | 23.3 | R3/f | −0.28 |
| V3 | 20.4 | \|R6/R7\| | 6.56 |
| V2 + V3 + V4 | 67.0 | \|R8\|/f | 0.29 |
| BL/TL | 0.44 | f1/\|f2\| | 1.48 |
| CT1/(CT2 + T23 + CT3) | 0.92 | f1/f3 | 0.92 |
| CT3/T34 | 1.27 | EPD/ImgH | 1.22 |
| SL/TL | 0.96 | EPD/Y42 | 2.08 |
| (T23 + T34)/CT3 | 0.99 | Y11/Y42 | 1.04 |

6th Embodiment

Figure 11:
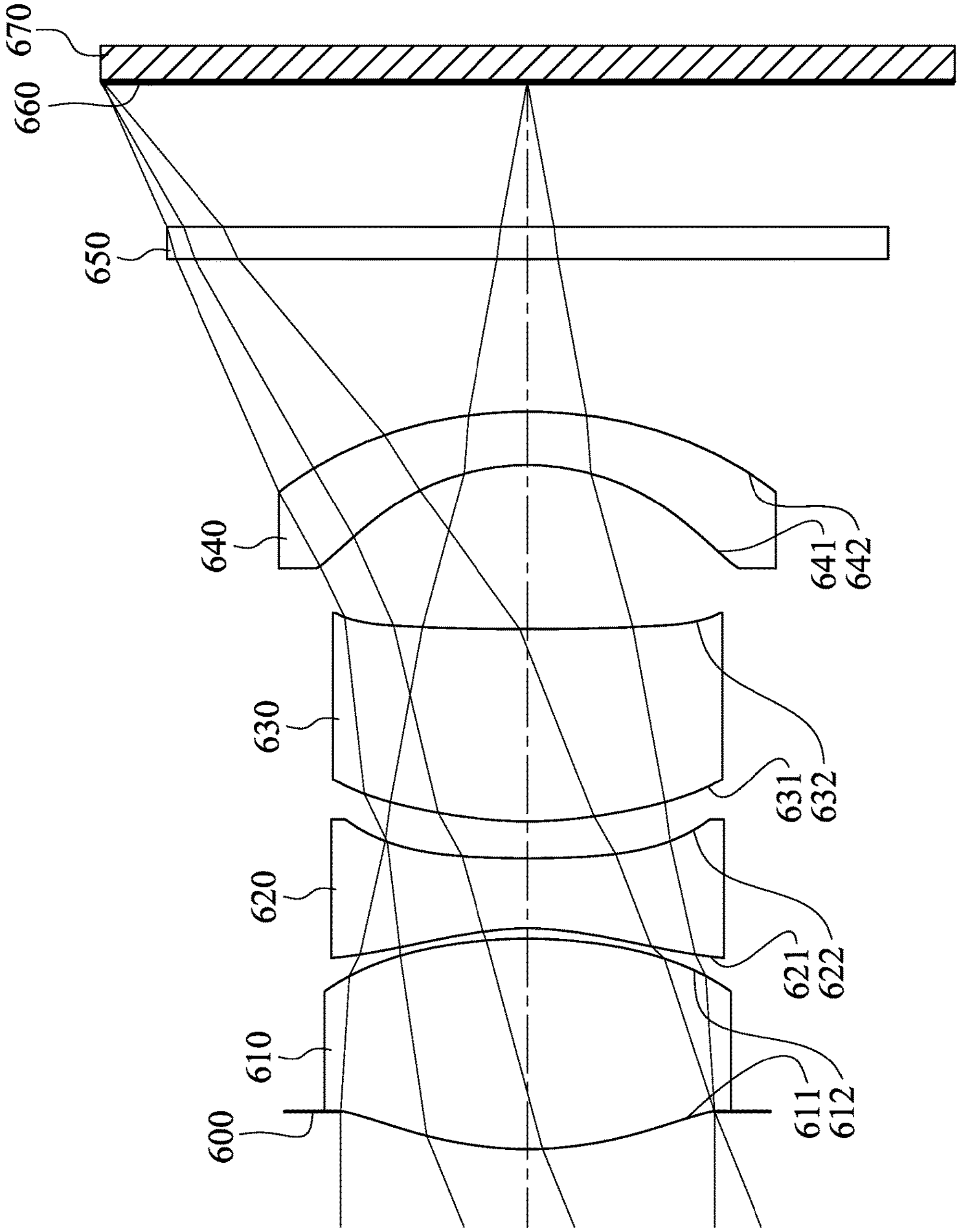
FIG. 11 is a schematic view of an imaging apparatus according to the 6th embodiment of the present disclosure.
Figure 12:
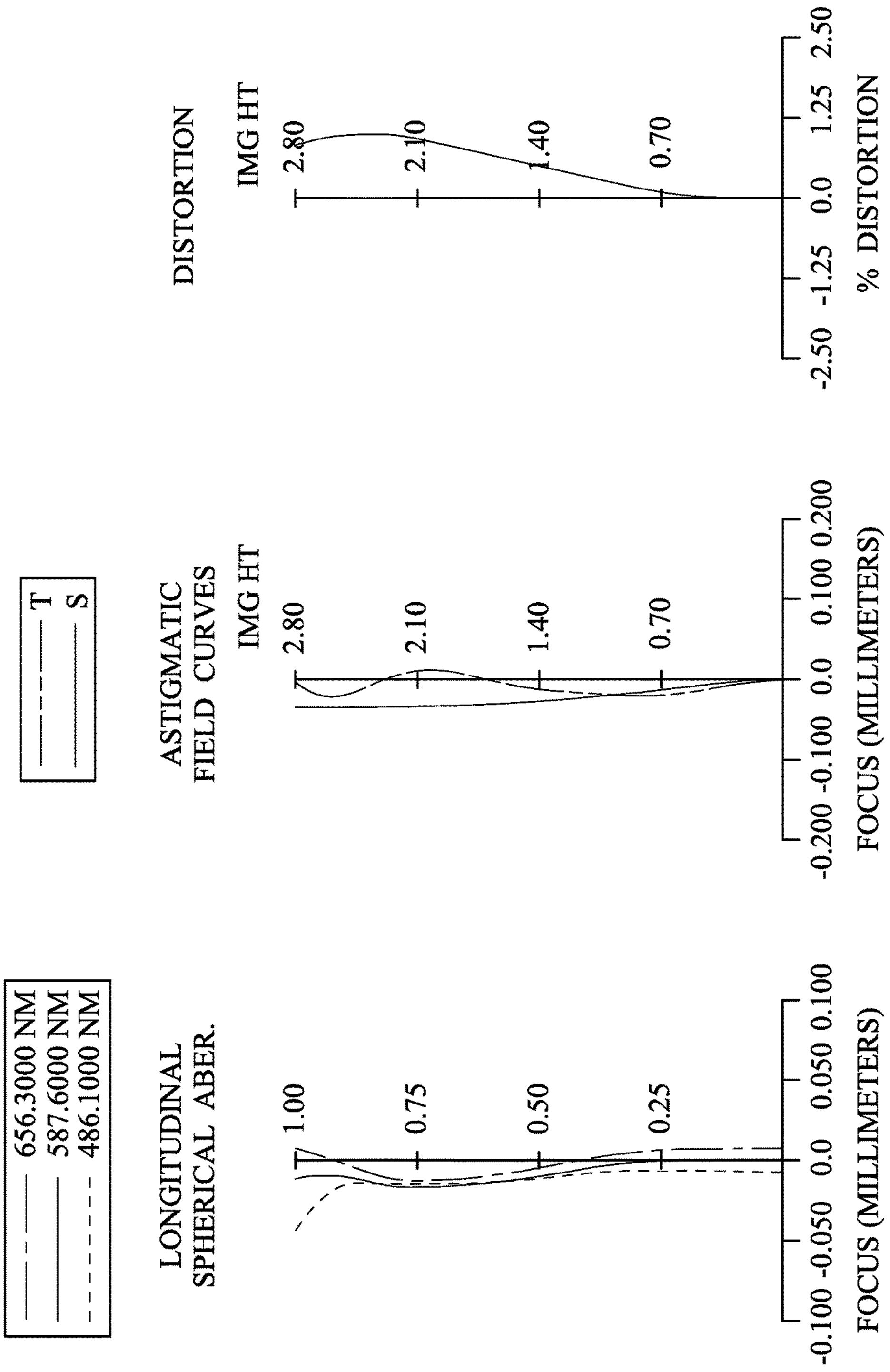
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an optical image capturing assembly (its reference numeral is omitted) and an image sensor 670. The optical image capturing assembly includes, in order from an object side to an image side, an aperture stop 600, a first lens element 610, a second lens element 620, a third lens element 630, a fourth lens element 640, an IR-cut filter 650 and an image surface 660. The image sensor 670 is disposed on the image surface 660 of the optical image capturing assembly. The optical image capturing assembly includes four lens elements (610, 620, 630 and 640) without additional one or more lens elements inserted between the first lens element 610 and the fourth lens element 640, and there is an air space between the first lens element 610 and the second lens element 620.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes at least one inflection point.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The IR-cut filter 650 is made of a glass material and located between the fourth lens element 640 and the image surface 660, and will not affect the focal length of the optical image capturing assembly.

The detailed optical data of the 6th embodiment are shown in TABLE 11 and the aspheric surface data are shown in TABLE 12 below.

TABLE 11

| 6th Embodiment f = 6.81 mm, Fno = 2.78, HFOV = 22.2 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.245 | | | | |
| 2 | Lens 1 | 2.471 | ASP | 1.383 | Plastic | 1.545 | 56.0 | 2.78 |
| 3 | | −3.129 | ASP | 0.067 | | | | |
| 4 | Lens 2 | −1.938 | ASP | 0.458 | Plastic | 1.584 | 28.2 | −2.53 |
| 5 | | 6.817 | ASP | 0.242 | | | | |
| 6 | Lens 3 | 2.624 | ASP | 1.263 | Plastic | 1.584 | 28.2 | 5.25 |
| 7 | | 14.968 | ASP | 1.079 | | | | |
| 8 | Lens 4 | −1.598 | ASP | 0.350 | Plastic | 1.511 | 56.8 | −6.92 |
| 9 | | −3.133 | ASP | 1.000 | | | | |
| 10 | IR-cut filter | Plano | | 0.210 | Glass | 1.517 | 64.2 | — |
| 11 | | Plano | | 0.950 | | | | |
| 12 | Image | Plano | | — | | | | |

Reference wavelength is 587.6 nm (d-line).
The effective radius of the surface 9 is 1.630 mm.

TABLE 12

| Aspheric Coefficients | | | | |
|---|---|---|---|---|
| Surface # | 2 | 3 | 4 | 5 |
| k = | −9.5440E−01 | 1.9502E+00 | −1.3014E+00 | −8.9801E+01 |
| A4 = | −5.4291E−03 | 2.7683E−02 | 1.5230E−01 | 5.9341E−02 |
| A6 = | −4.3583E−03 | −2.4580E−02 | −7.6709E−02 | 4.0884E−02 |
| A8 = | −5.9484E−03 | 1.6146E−03 | 2.9976E−02 | −2.2847E−02 |
| A10 = | 2.7408E−03 | 2.5221E−03 | −8.9084E−03 | 1.1509E−02 |
| A12 = | −1.5943E−03 | −6.6570E−04 | 1.7879E−03 | −3.3948E−03 |
| Surface # | 6 | 7 | 8 | 9 |
| k = | 3.7419E−01 | −4.8481E+01 | 1.6313E−01 | 1.4569E−01 |
| A4 = | −1.0367E−01 | −1.3767E−02 | 2.2310E−04 | −1.0464E−02 |
| A6 = | 8.1082E−02 | 2.2875E−02 | −2.5263E−02 | −2.2952E−03 |
| A8 = | −2.9173E−02 | −2.6320E−02 | 6.1054E−02 | −1.8506E−03 |
| A10 = | 4.4676E−03 | 3.3680E−02 | −5.7598E−02 | 7.7556E−03 |
| A12 = | 3.1370E−03 | −1.8795E−02 | 4.1080E−02 | −5.8062E−03 |
| A14 = | −1.3553E−03 | 5.1013E−03 | −1.7362E−02 | 1.7620E−03 |
| A16 = | | | 3.6188E−03 | −1.9620E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 6.81 | TD (mm) | 4.84 |
| Fno | 2.78 | TD/ΣAT | 3.49 |
| HFOV (deg.) | 22.2 | R3/\|R4\| | −0.28 |
| V2 | 28.2 | R3/f | −0.28 |
| V3 | 28.2 | \|R6/R7\| | 9.37 |
| V2 + V3 + V4 | 113.2 | \|R8\|/f | 0.46 |
| BL/TL | 0.31 | f1/\|f2\| | 1.10 |
| CT1/(CT2 + T23 + CT3) | 0.70 | f1/f3 | 0.53 |
| CT3/T34 | 1.17 | EPD/ImgH | 0.87 |
| SLTL | 0.97 | EPD/Y42 | 1.50 |
| (T23 + T34)/CT3 | 1.05 | Y11/Y42 | 0.75 |

7th Embodiment

Figure 13A:
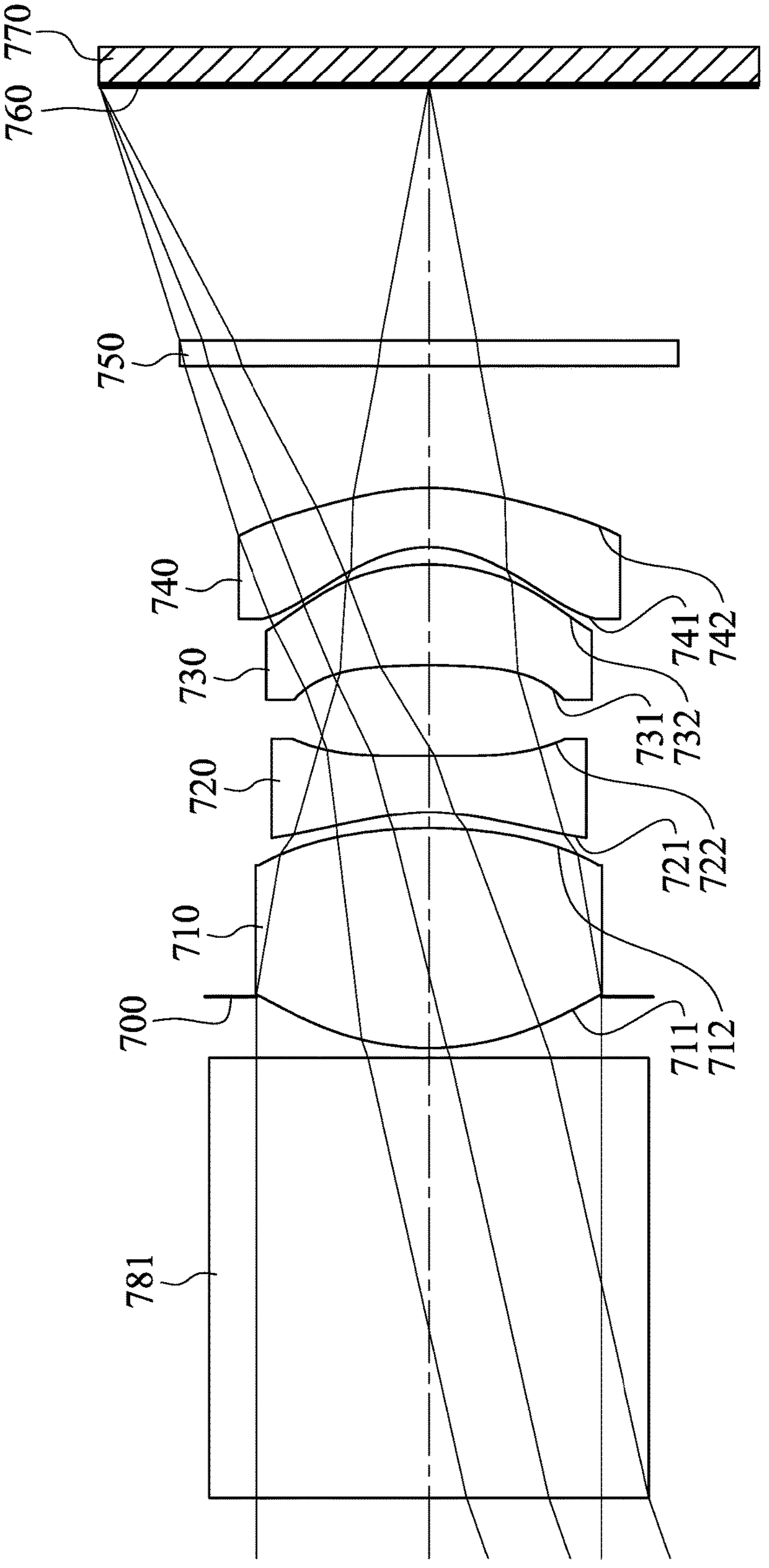
FIG. 13A is a schematic view of an imaging apparatus according to the 7th embodiment of the present disclosure.
Figure 14:
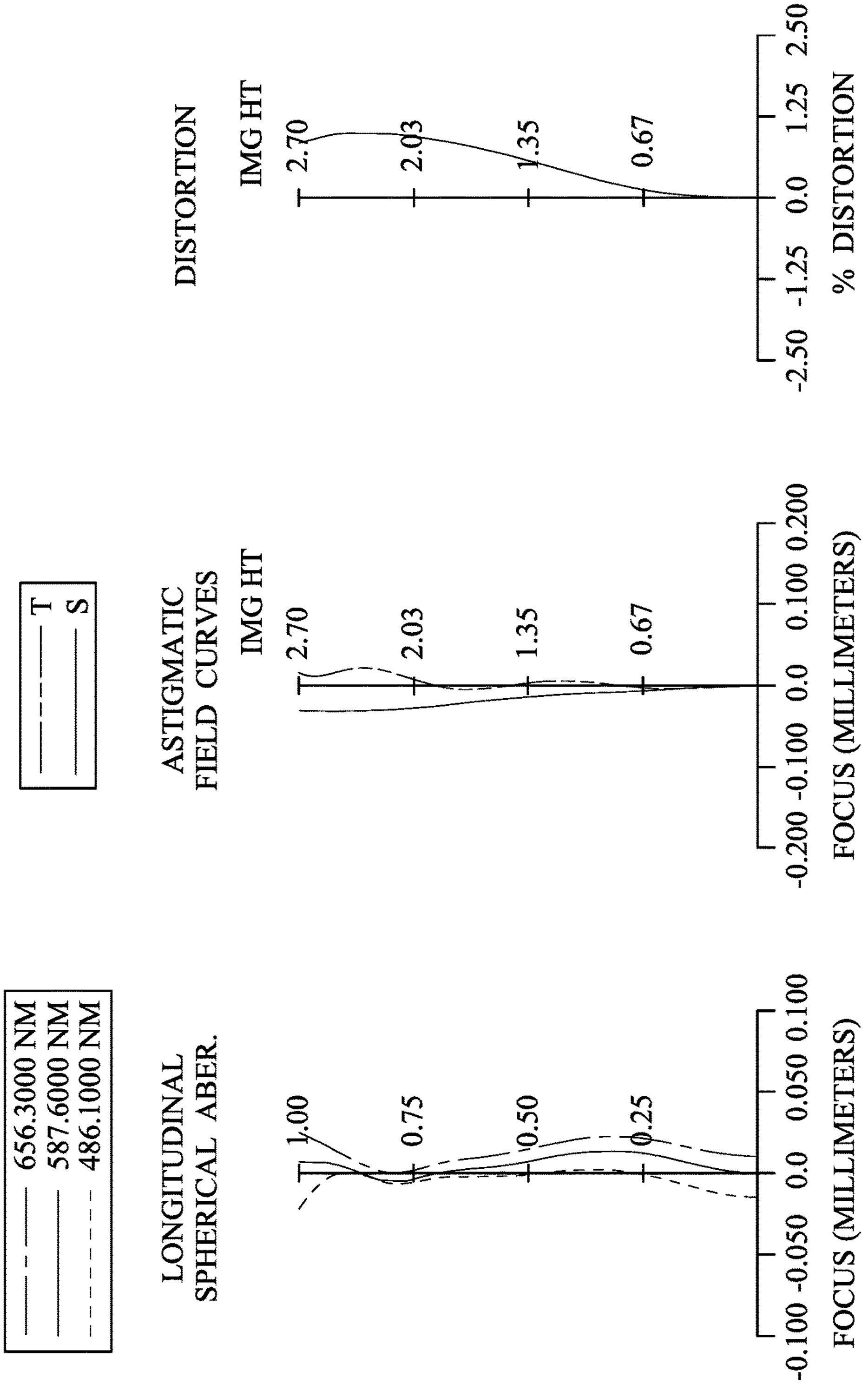
FIG. 14 shows spherical aberration curves, astigmatic field curves and a distortion curve of the imaging apparatus according to the 7th embodiment.

FIG. 13A is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13A, the imaging apparatus includes an optical image capturing assembly (its reference numeral is omitted) and an image sensor 770. The optical image capturing assembly includes, in order from an object side to an image side, a reflecting element 781, an aperture stop 700, a first lens element 710, a second lens element 720, a third lens element 730, a fourth lens element 740, an IR-cut filter 750 and an image surface 760. The image sensor 770 is disposed on the image surface 760 of the optical image capturing assembly. The optical image capturing assembly includes four lens elements (710, 720, 730 and 740) without additional one or more lens elements inserted between the first lens element 710 and the fourth lens element 740, and there is an air space between the first lens element 710 and the second lens element 720.

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric. Furthermore, the object-side surface 721 of the second lens element 720 includes' at least one inflection point.

The third lens element 730 with positive refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The IR-cut filter 750 is made of a glass material and located between the fourth lens element 740 and the image surface 760, and will not affect the focal length of the optical image capturing assembly.

The reflecting element 781 is a prism and is made of a glass material. The reflecting element 781 is located at an object-side of the first lens element 710. That is, the reflecting element 781 is located between an imaged object (not shown) and the first lens element 710 and is located on the light path of the optical image capturing assembly.

The detailed optical data of the 7th embodiment are shown in TABLE 13 and the aspheric surface data are shown in TABLE 14 below,

TABLE 13

| 7th Embodiment<br>f = 7.63 mm, Fno = 2.71, HFOV = 19.3 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Reflecting element (prism) | Plano | | 3.600 | Glass | 1.517 | 64.2 | — |
| 2 | | Plano | | 0.500 | | | | |
| 3 | Ape. Stop | Plano | | −0.419 | | | | |
| 4 | Lens 1 | 2.238 | ASP | 1.799 | Plastic | 1.545 | 56.0 | 2.87 |
| 5 | | −3.722 | ASP | 0.130 | | | | |
| 6 | Lens 2 | −1.857 | ASP | 0.464 | Plastic | 1.584 | 28.2 | −3.55 |
| 7 | | −19.321 | ASP | 0.741 | | | | |
| 8 | Lens 3 | −6.277 | ASP | 0.823 | Plastic | 1.614 | 26.0 | 3.80 |
| 9 | | −1.786 | ASP | 0.141 | | | | |
| 10 | Lens 4 | −0.972 | ASP | 0.485 | Plastic | 1.582 | 30.2 | −3.86 |
| 11 | | −2.027 | ASP | 1.000 | | | | |
| 12 | IR-cut filter | Plano | | 0.210 | Glass | 1.517 | 64.2 | — |
| 13 | | Plano | | 2.081 | | | | |
| 14 | Image | Plano | | — | | | | |

Reference wavelength is 587.6 nm (d-line).
The effective radius of the surface 1 is 1.800 mm.
The effective radius of the surface 11 is 1.560 mm.

TABLE 14

| Aspheric Coefficients | | | | |
|---|---|---|---|---|
| Surface # | 4 | 5 | 6 | 7 |
| k = | −4.6728E−01 | 4.1740E+00 | −1.4607E+00 | −1.7120E+01 |
| A4 = | −9.5886E−04 | 2.7697E−02 | 1.9909E−01 | 1.8355E−01 |
| A6 = | 1.8292E−03 | −1.7606E−02 | −1.6882E−01 | −9.7242E−02 |
| A8 = | −4.6778E−03 | −5.0907E−03 | 1.0540E−01 | 2.0412E−02 |
| A10 = | 2.5079E−03 | 1.0979E−02 | −4.7155E−02 | 3.9669E−02 |
| A12 = | −7.7716E−04 | −4.6423E−03 | 1.4407E−02 | −3.9811E−02 |
| A14 = | | 7.2472E−04 | −2.0556E−03 | 1.2002E−02 |
| Surface # | 8 | 9 | 10 | 11 |
| k = | −4.4624E+01 | 5.6214E−01 | −6.4173E−01 | 4.4882E−02 |
| A4 = | −7.9442E−02 | −2.8021E−02 | 1.4620E−01 | 9.9504E−02 |
| A6 = | −6.1898E−03 | 5.1645E−02 | 5.0804E−02 | 1.0346E−03 |
| A8 = | −6.6453E−02 | −5.5644E−02 | −1.0706E−01 | −4.0100E−02 |
| A10 = | 6.7891E−02 | 6.3185E−02 | 1.1735E−01 | 3.3687E−02 |
| A12 = | −5.3758E−02 | −3.1204E−02 | −6.1115E−02 | −1.5074E−02 |
| A14 = | 1.4700E−02 | 7.1824E−03 | 1.7421E−02 | 3.7289E−03 |
| A16 = | | | −2.2411E−03 | −3.8893E−04 |

Figure 13B:
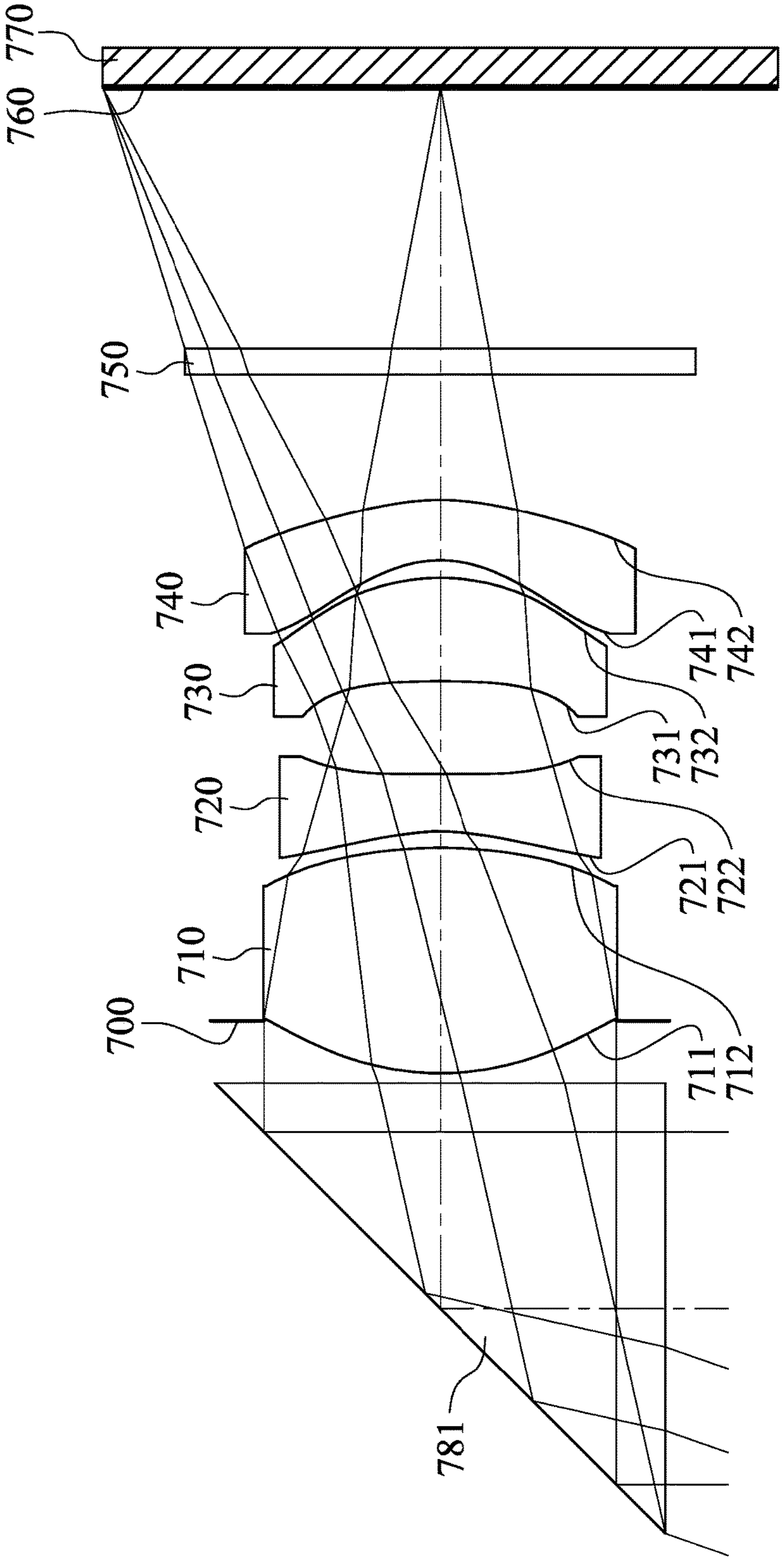
FIG. 13B is another schematic view of the imaging apparatus according to the 7th embodiment in FIG. 13A.

FIG. 13B is another schematic view of the imaging apparatus according to the 7th embodiment in FIG. 13A. In FIG. 13B, the optical axis is folded by the reflecting element 781. The detailed optical data of the reflecting element 781 are shown in TABLE 13. As shown in FIG. 13B, the directions of lights passing through the optical image capturing assembly can be changed by the reflecting element 781. Accordingly, it is favorable to apply the optical image capturing assembly to different imaging apparatus and electronic devices. Moreover, the reflecting element 781 can be adjusted according to practical demands, so that the spatial arrangement is more flexible.

Figure 22:
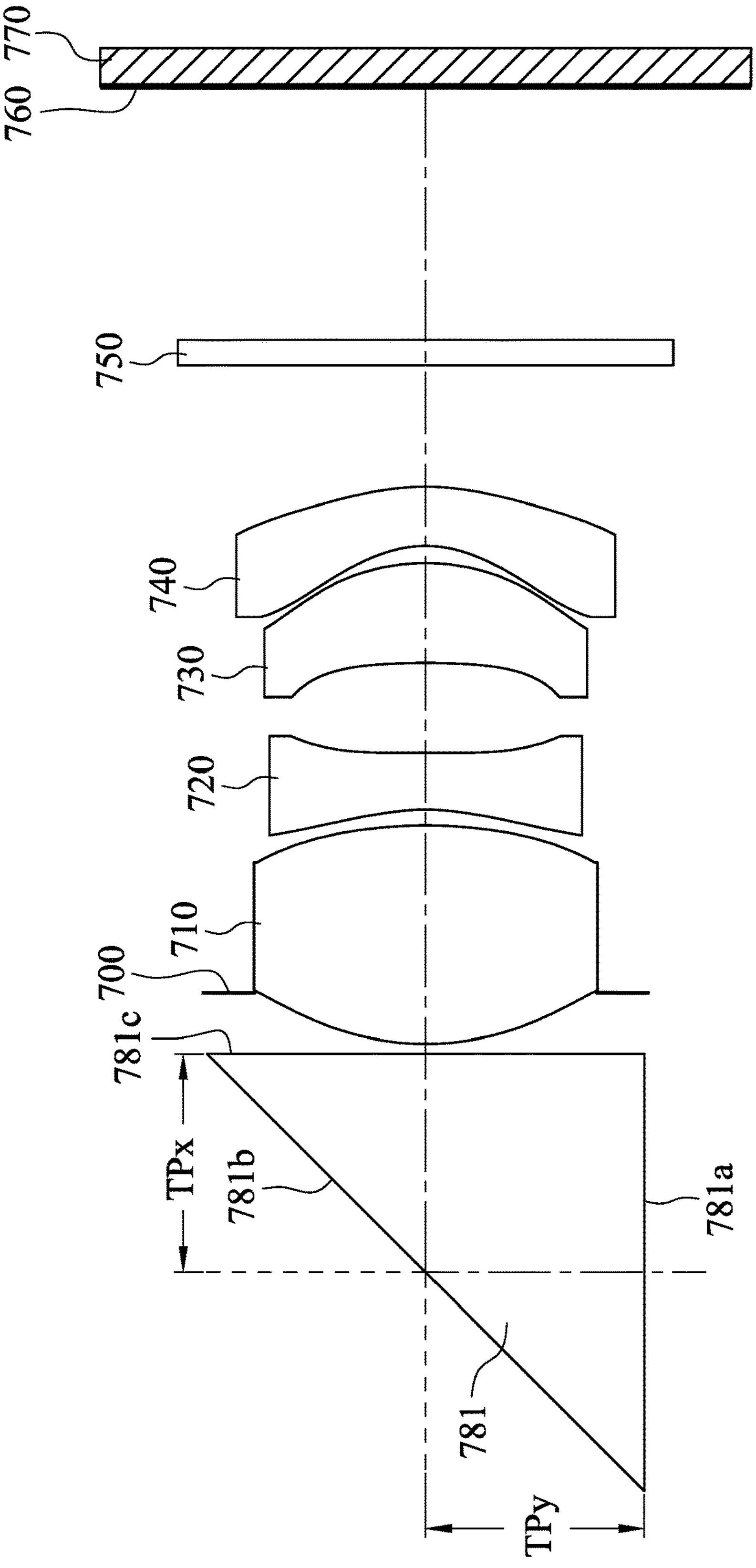
FIG. 22 is a schematic view showing a parameter of TP of the imaging apparatus according to the 7th embodiment in FIG. 13B.

FIG. 22 is a schematic view showing a parameter of TP of the imaging apparatus according to the 7th embodiment in FIG. 13B. In FIG. 22, when a first path length on the optical axis of the reflecting element 781 (the prism) is TPy (i.e., the length of the optical axis from the surface 781*a* to the surface 781*b*), a second path length on the optical axis of the reflecting element 781 (the prism) is TPx (i.e., the length of the optical axis from the surface 781*b* to the surface 781*c*), and a sum of path lengths on the optical axis of the prism is TP, the following condition is satisfied: TP=TPx+TPy.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 7.63 | TD/ΣAT | 4.53 |
| Fno | 2.71 | TD/TP | 1.27 |
| HFOV (deg.) | 19.3 | R3/\|R4\| | −0.10 |
| V2 | 28.2 | R3/f | −0.24 |
| V3 | 26.0 | \|R6/R7\| | 1.84 |
| V2 + V3 + V4 | 84.4 | \|R8\|/f | 0.27 |
| BL/TL | 0.42 | f1/\|f2\| | 0.81 |
| CT1/(CT2 + T23 + CT3) | 0.89 | f1/f3 | 0.76 |
| CT3/T34 | 5.84 | EPD/ImgH | 1.04 |
| SL/TL | 0.95 | EPD/Y42 | 1.81 |
| (T23 + T34)/CT3 | 1.07 | Y11/Y42 | 0.91 |
| TD (mm) | 4.58 | | |

8th Embodiment

Figure 15A:
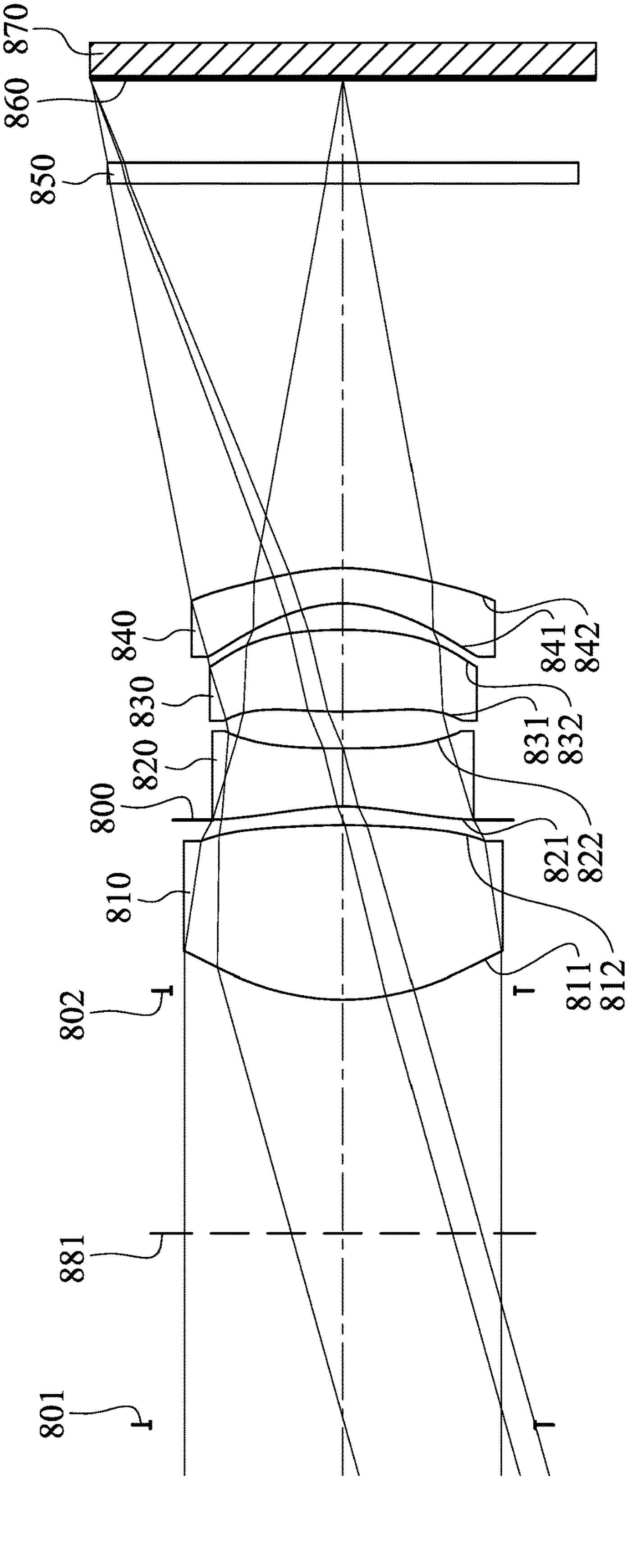
FIG. 15A is a schematic view of an imaging apparatus according to the 8th embodiment of the present disclosure.
Figure 16:
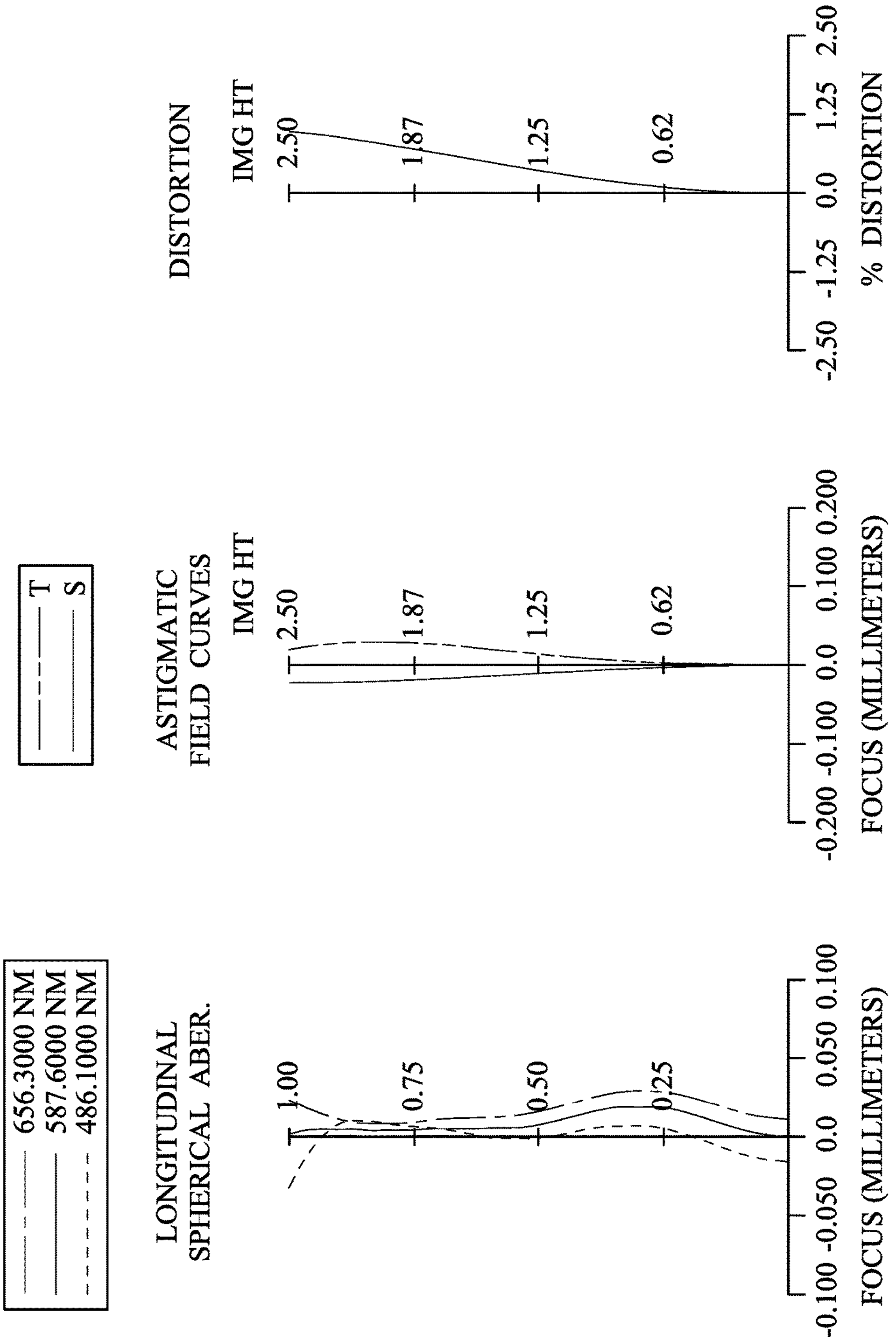
FIG. 16 shows spherical aberration curves, astigmatic field curves and a distortion curve of the imaging apparatus according to the 8th embodiment.

FIG. 15A is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15A, the imaging apparatus includes an optical image capturing assembly (its reference numeral is omitted) and an image sensor 870. The optical image capturing assembly includes, in order from an object side to an image side, a stop 801, a reflecting element 881, a stop 802, a first lens element 810, an aperture stop 800, a second lens element 820, a third lens element 830, a fourth lens element 840, an IR-cut filter 850 and an image surface 860. The image sensor 870 is disposed on the image surface 860 of the optical image capturing assembly. The optical image capturing assembly includes four lens elements (810, 820, 830 and 840) without additional one or more lens elements inserted between the first lens element 810 and the fourth lens element 840, and there is an air space between the first lens element 810 and the second lens element 820.

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes at least one inflection point.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The IR-cut filter 850 is made of a glass material and located between the fourth lens element 840 and the image surface 860, and will not affect the focal length of the optical image capturing assembly.

The reflecting element 881 is a mirror. The reflecting element 881 is located at an object-side of the first lens element 810. That is, the reflecting element 881 is located between an imaged object (not shown) and the first lens element 810 and is located on the light path of the optical image capturing assembly.

The detailed optical data of the 8th embodiment are shown in TABLE 15 and the aspheric surface data are shown in TABLE 16 below.

TABLE 15

8th Embodiment
f = 8.86 mm, Fno = 2.83, HFOV = 15.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 1.900 | | | | |
| 2 | Reflecting element (mirror) | Plano | | 2.400 | | | | |
| 3 | Stop | Plano | | −0.090 | | | | |
| 4 | Lens 1 | 2.483 | ASP | 1.727 | Plastic | 1.545 | 56.0 | 3.62 |
| 5 | | −7.182 | ASP | 0.050 | | | | |
| 6 | Ape. Stop | Plano | | 0.136 | | | | |
| 7 | Lens 2 | −2.297 | ASP | 0.576 | Plastic | 1.614 | 26.0 | −3.22 |
| 8 | | 15.616 | ASP | 0.358 | | | | |
| 9 | Lens 3 | 6.044 | ASP | 0.812 | Plastic | 1.639 | 23.5 | 4.17 |
| 10 | | −4.521 | ASP | 0.261 | | | | |
| 11 | Lens 4 | −1.289 | ASP | 0.351 | Plastic | 1.614 | 26.0 | −6.05 |
| 12 | | −2.179 | ASP | 3.800 | | | | |
| 13 | IR-cut filter | Plano | | 0.210 | Glass | 1.517 | 64.2 | — |
| 14 | | Plano | | 0.831 | | | | |
| 15 | Image | Plano | | — | | | | |

Reference wavelength is 587.6 nm (d-line).
The effective radius of the surface 1 is 1.900 mm.
The effective radius of the surface 3 is 1.700 mm.
The effective radius of the surface 12 is 1.500 mm.

TABLE 16

| Aspheric Coefficients | | | | |
|---|---|---|---|---|
| Surface # | 4 | 5 | 7 | 8 |
| k = | −4.2827E−01 | 1.7769E+01 | −1.1983E+00 | −5.6857E+01 |
| A4 = | −8.1855E−04 | 5.0208E−02 | 2.0001E−01 | 1.1332E−01 |
| A6 = | 7.6709E−04 | −2.8636E−02 | −1.6276E−01 | −7.9052E−02 |
| A8 = | −2.2094E−03 | −9.7261E−03 | 1.0328E−01 | 2.2530E−02 |
| A10 = | 8.1352E−04 | 1.2392E−02 | −4.6509E−02 | 4.0573E−02 |
| A12 = | −2.2251E−04 | −3.8958E−03 | 1.3348E−02 | −4.0054E−02 |
| A14 = | | 4.6079E−04 | −1.6912E−03 | 1.2420E−02 |
| Surface # | 9 | 10 | 11 | 12 |
| k = | −9.4644E+00 | 2.9321E+00 | −5.5254E−01 | 1.6007E−01 |
| A4 = | −7.5275E−02 | −6.5708E−02 | 9.8558E−02 | 9.2825E−02 |
| A6 = | 7.0534E−03 | 3.4154E−02 | 4.0108E−02 | 7.4553E−03 |
| A8 = | −7.1498E−02 | −7.2035E−02 | −1.1310E−01 | −4.0970E−02 |
| A10 = | 8.2798E−02 | 6.8008E−02 | 1.0803E−01 | 3.2192E−02 |
| A12 = | −5.3872E−02 | −3.2882E−02 | −5.8706E−02 | −1.4755E−02 |
| A14 = | 1.5338E−02 | 7.2817E−03 | 1.8158E−02 | 3.8475E−03 |
| A16 = | | | −2.1764E−03 | −4.2328E−04 |

Figure 15B:
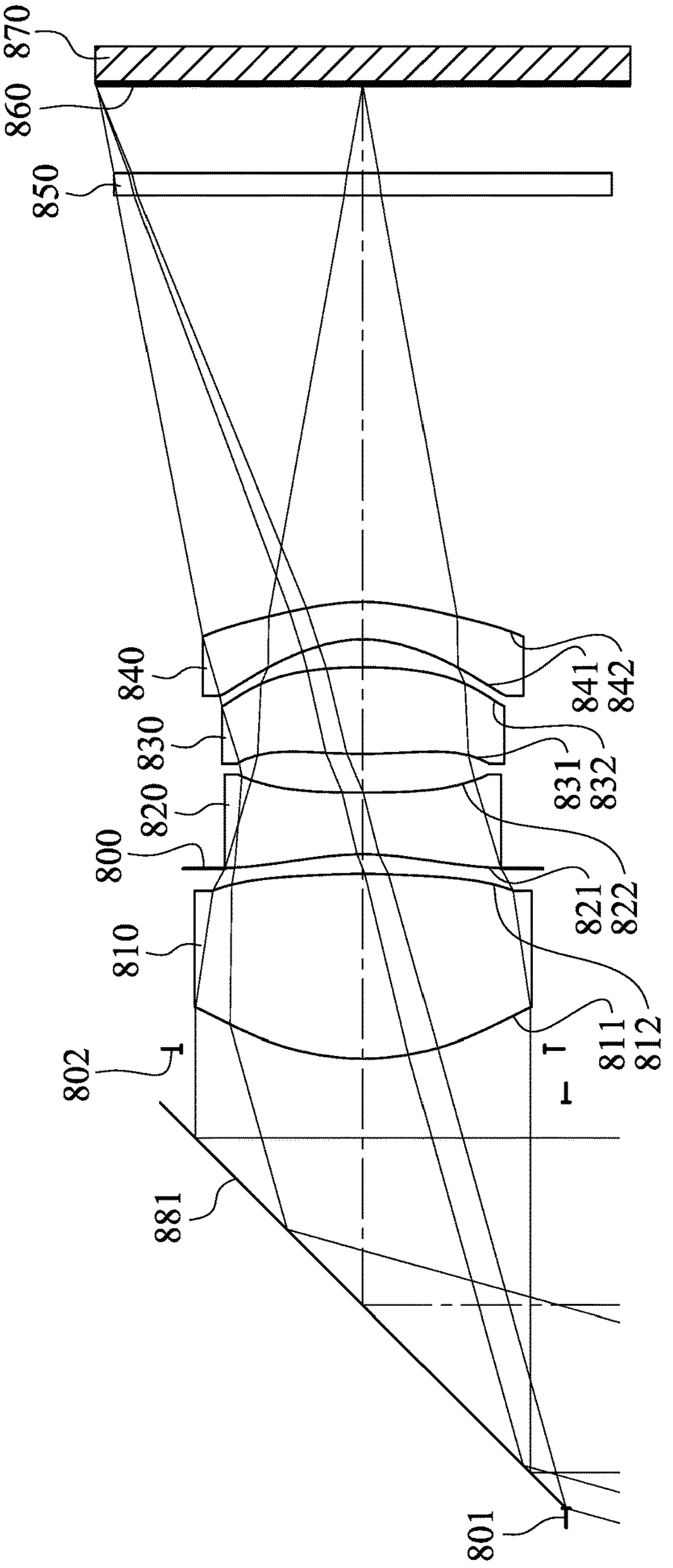
FIG. 15B is another schematic view of the imaging apparatus according to the 8th embodiment in FIG. 15A.

FIG. 15B is another schematic view of the imaging apparatus according to the 8th embodiment in FIG. 15A. In FIG. 15B, the optical axis is folded by the reflecting element 881. The detailed optical data of the reflecting element 881 are shown in TABLE 15. As shown in FIG. 15B, the directions of lights passing through the optical image capturing assembly can be changed by the reflecting element 881. Accordingly, it is favorable to apply the optical image capturing assembly to different imaging apparatus and electronic devices. Moreover, the reflecting element 881 can be adjusted according to practical demands, so that the spatial arrangement is more flexible.

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 8.86 | TD (mm) | 4.27 |
| Fno | 2.83 | TD/ΣAT | 5.31 |
| HFOV (deg.) | 15.6 | R3/\|R4\| | −0.15 |
| V2 | 26.0 | R3/f | −0.26 |
| V3 | 23.5 | \|R6/R7\| | 3.51 |
| V2 + V3 + V4 | 75.4 | \|R8\|/f | 0.25 |
| BL/TL | 0.53 | f1/\|f2\| | 1.12 |
| CT1/(CT2 + T23 + CT3) | 0.99 | f1/f3 | 0.87 |
| CT3/T34 | 3.11 | EPD/ImgH | 1.25 |
| SL/TL | 0.80 | EPD/Y42 | 2.09 |
| (T23 + T34)/CT3 | 0.76 | Y11/Y42 | 1.07 |

9th Embodiment

Figure 17A:
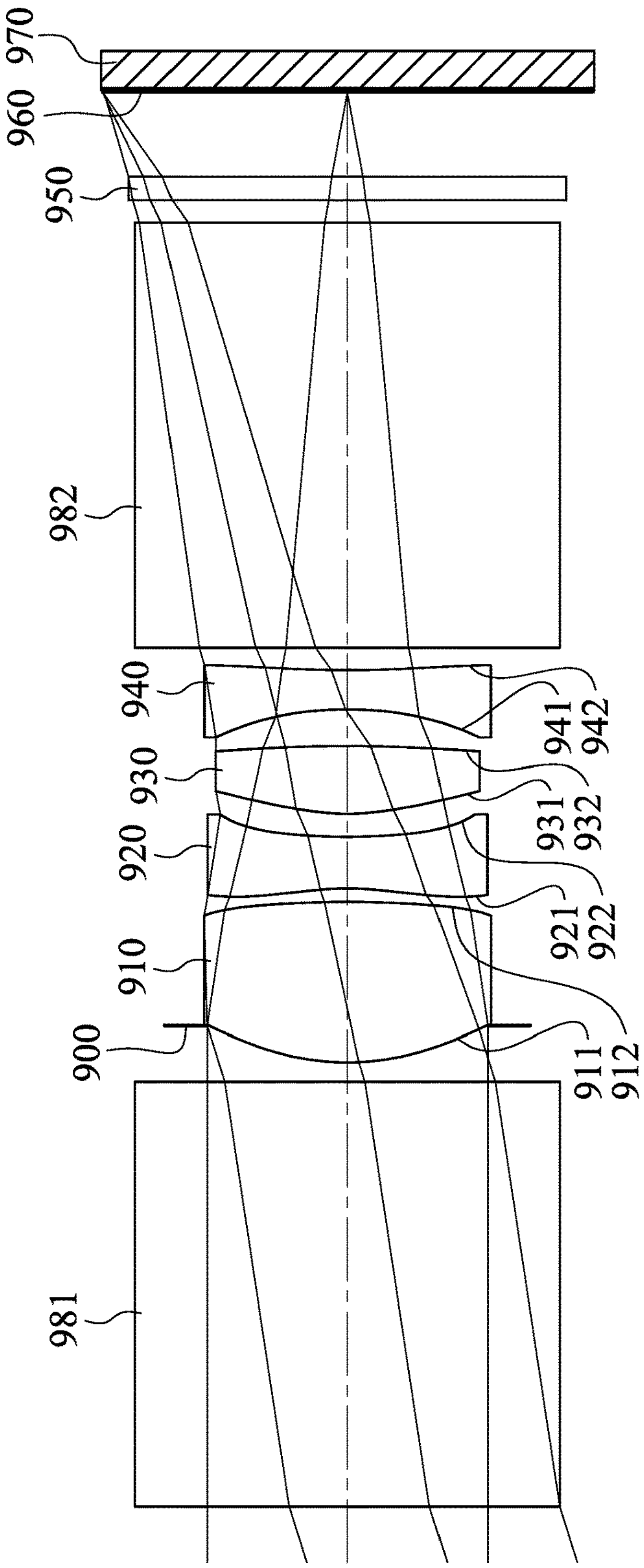
FIG. 17A is a schematic view of an imaging apparatus according to the 9th embodiment of the present disclosure.
Figure 18:
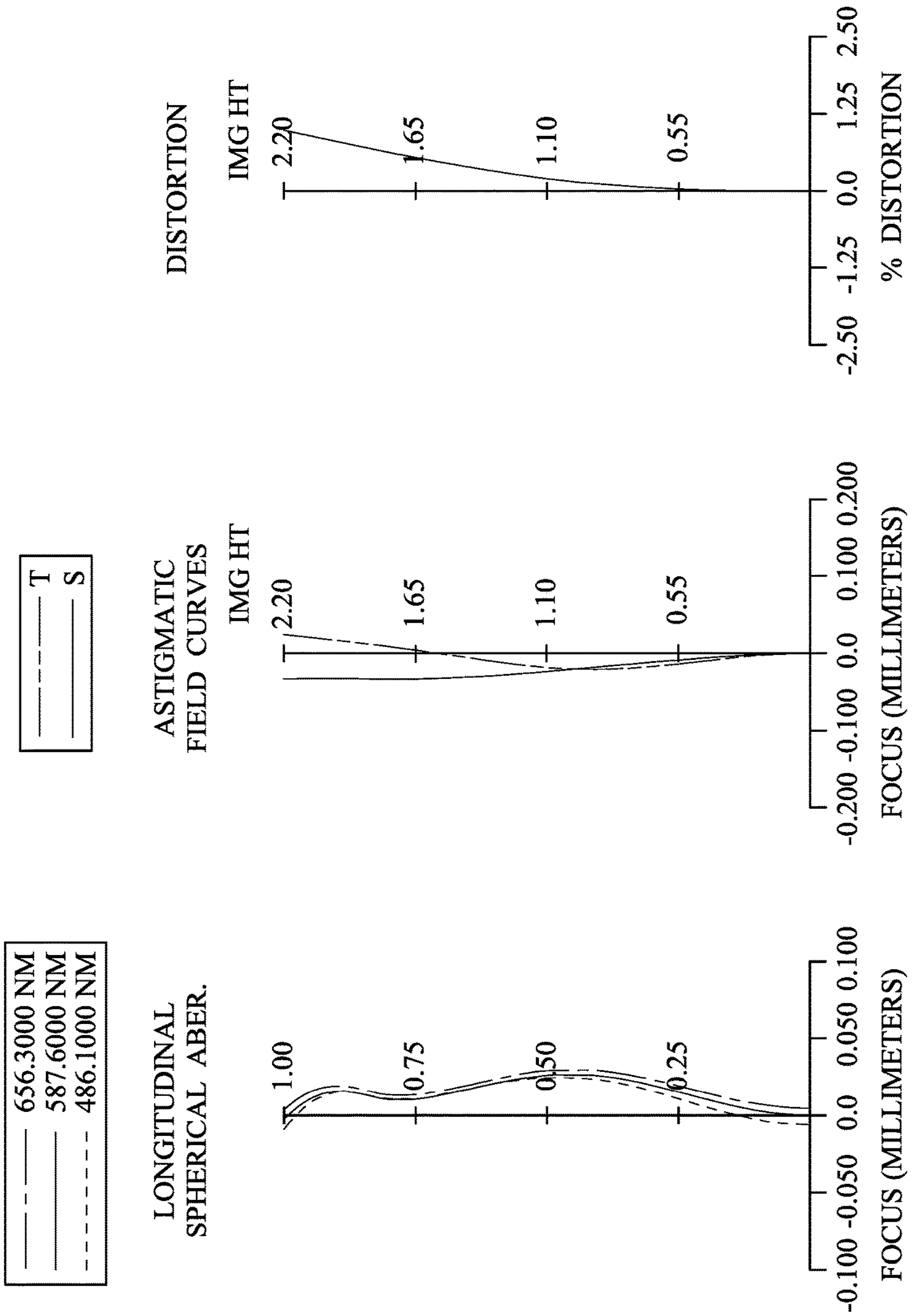
FIG. 18 shows spherical aberration curves, astigmatic field curves and a distortion curve of the imaging apparatus according to the 9th embodiment.

FIG. 17A is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17A, the imaging apparatus includes an optical image capturing assembly (its reference numeral is omitted) and an image sensor 970. The optical image capturing assembly includes, in order from an object side to an image side, a reflecting element 981, an aperture stop 900, a first lens element 910, a second lens element 920, a third lens element 930, a fourth lens element 940, a reflecting element 982, an IR-cut filter 950 and an image surface 960. The image sensor 970 is disposed on the image surface 960 of the optical image capturing assembly. The optical image capturing assembly includes four lens elements (910, 920, 930 and 940) without additional one or more lens elements inserted between the first lens element 910 and the fourth lens element 940, and there is an air space between the first lens element 910 and the second lens element 920.

The first lens element 910 with positive refractive power has an object-side surface 911 being convex in a paraxial region thereof and an image-side surface 912 being convex in a paraxial region thereof. The first lens element 910 is made of a plastic material, and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of a plastic material, and has the object-side surface 921 and the image-side surface 922 being both aspheric. Furthermore, the object-side surface 921 of the second lens element 920 includes at least one inflection point.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of a plastic material, and has the object-side surface 941 and the image-side surface 942 being both aspheric.

The IR-cut filter 950 is made of a glass material and located between the reflecting element 982 and the image surface 960, and will not affect the focal length of the optical image capturing assembly.

The reflecting element 981 is a prism and is made of a glass material. The reflecting element 981 is located at an object-side of the first lens element 910. That is, the reflecting element 981 is located between an imaged object (not shown) and the first lens element 910 and is located on the light path of the optical image capturing assembly.

The reflecting element 982 is a prism and is made of a glass material. The reflecting element 982 is located at an image-side of the fourth lens element 940. That is, the reflecting element 982 is located between the fourth lens element 940 and the IR-cut filter 950 and is located on the light path of the optical image capturing assembly.

The detailed optical data of the 9th embodiment are shown in TABLE 17 and the aspheric surface data are shown in TABLE 18 below.

TABLE 17

9th Embodiment
f = 6.88 mm, Fno = 2.74, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflecting element (prism) | Plano | | 3.800 | Glass | 2.001 | 29.1 | — |
| 2 | | Plano | | 0.500 | | | | |
| 3 | Ape. Stop | Plano | | −0.328 | | | | |
| 4 | Lens 1 | 2.283 | ASP | 1.436 | Plastic | 1.545 | 56.0 | 3.34 |
| 5 | | −7.011 | ASP | 0.118 | | | | |
| 6 | Lens 2 | −2.747 | ASP | 0.462 | Plastic | 1.682 | 30.2 | −3.02 |
| 7 | | 6.178 | ASP | 0.208 | | | | |
| 8 | Lens 3 | 2.231 | ASP | 0.601 | Plastic | 1.614 | 26.0 | 3.10 |
| 9 | | −11.674 | ASP | 0.329 | | | | |
| 10 | Lens 4 | −3.146 | ASP | 0.350 | Plastic | 1.661 | 20.3 | −3.52 |
| 11 | | 9.283 | ASP | 0.200 | | | | |
| 12 | Reflecting element (prism) | Plano | | 3.800 | Glass | 2.001 | 29.1 | — |
| 13 | | Plano | | 0.200 | | | | |
| 14 | IR-cut filter | Plano | | 0.210 | Glass | 1.517 | 64.2 | — |
| 15 | | Plano | | 0.774 | | | | |
| 16 | Image | Plano | | — | | | | |

Reference wavelength is 587.6 nm (d-line).
The effective radius of the surface 1 is 1.900 mm.

TABLE 18

Aspheric Coefficients

| Surface # | 4 | 5 | 6 | 7 |
|---|---|---|---|---|
| k = | −5.0593E−01 | 9.6040E+00 | −1.5343E+00 | −4.9375E+01 |
| A4 = | −3.3095E−03 | 4.5925E−02 | 1.5113E−01 | 2.3518E−02 |
| A6 = | 7.7550E−04 | −2.4858E−02 | −7.2459E−02 | 2.6060E−02 |
| A8 = | −3.7537E−03 | −4.5607E−03 | 3.4338E−02 | −9.6702E−03 |
| A10 = | 7.9070E−04 | 2.6390E−03 | −9.6217E−03 | 1.6871E−02 |
| A12 = | −3.9160E−04 | −3.4393E−04 | 7.4562E−04 | −3.5160E−03 |

| Surface # | 8 | 9 | 10 | 11 |
|---|---|---|---|---|
| k = | −6.6445E−01 | −9.0000E+01 | 1.1262E+00 | −4.7710E+01 |
| A4 = | −1.0965E−01 | 4.0934E−03 | 7.6297E−03 | −1.7538E−03 |
| A6 = | 5.6739E−02 | 2.6935E−03 | −3.1350E−02 | −1.1882E−02 |
| A8 = | −2.4877E−02 | −1.8655E−02 | 4.4272E−02 | 5.8655E−04 |
| A10 = | 5.5418E−03 | 2.6457E−02 | −5.5495E−02 | 6.9326E−03 |
| A12 = | 2.1267E−03 | −1.9127E−02 | 4.0678E−02 | −6.0213E−03 |
| A14 = | −9.1860E−04 | 5.9130E−03 | −1.6631E−02 | 2.1706E−03 |
| A16 = | | | 3.9017E−03 | −2.1190E−04 |

Figure 17B:
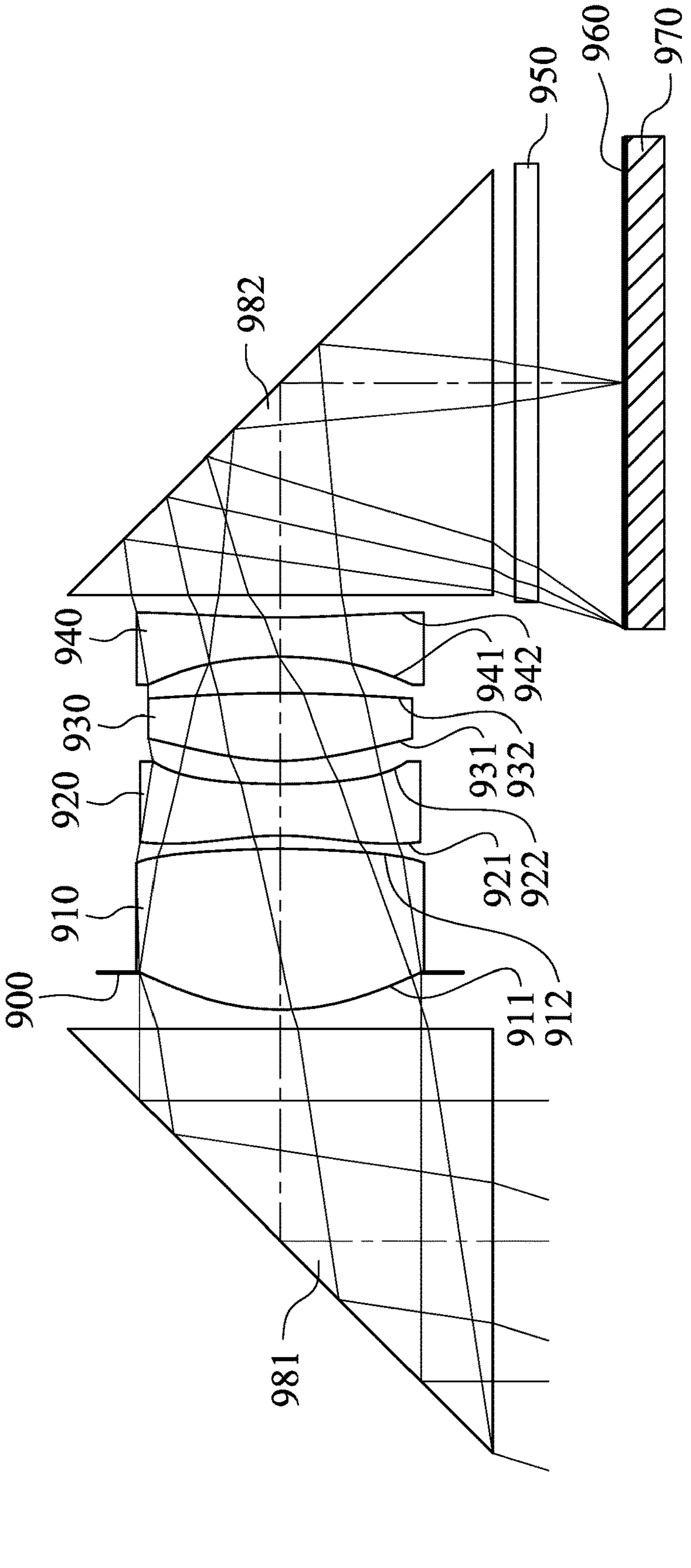
FIG. 17B is another schematic view of the imaging apparatus according to the 9th embodiment in FIG. 17A.
Figure 17C:
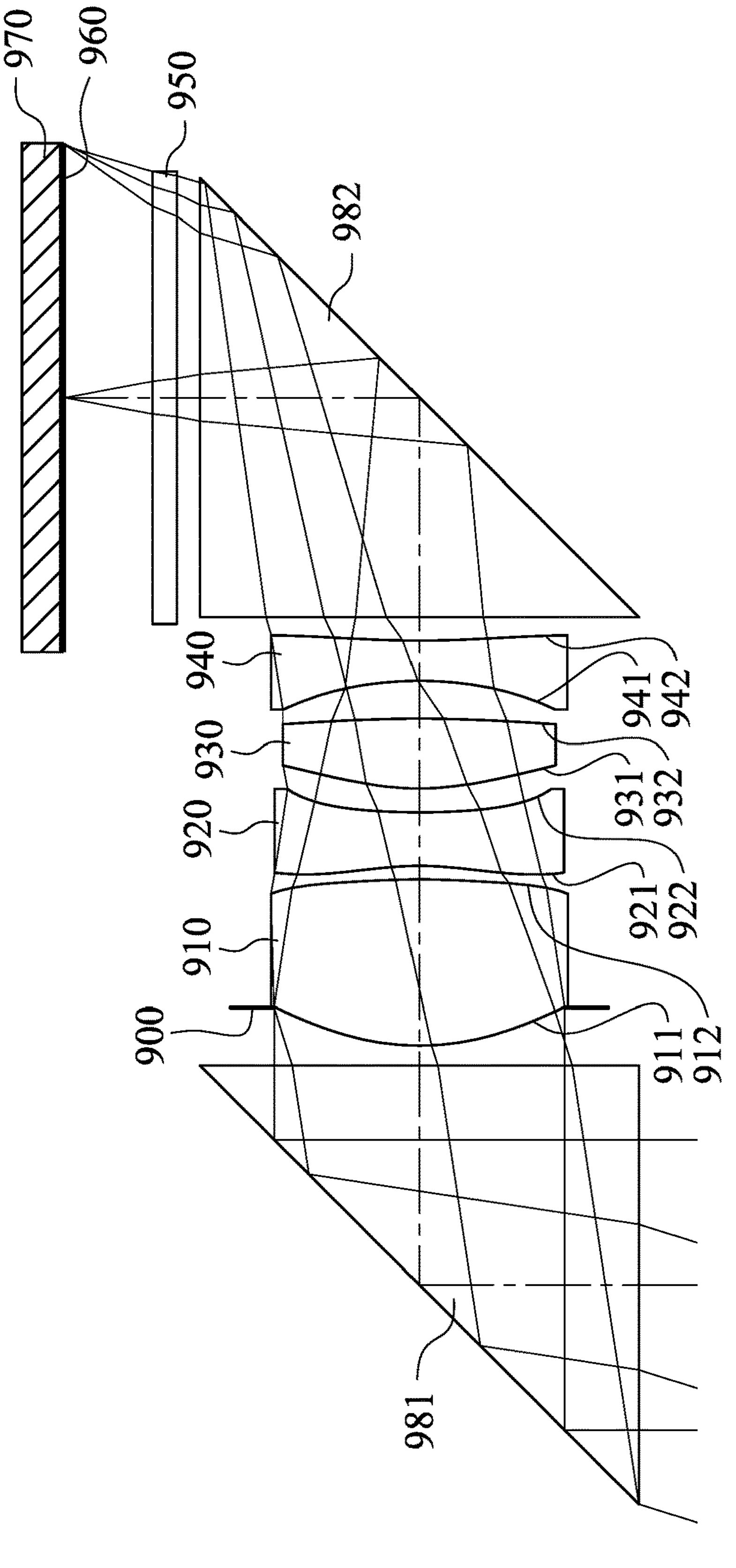
FIG. 17C is yet another schematic view of the imaging apparatus according to the 9th embodiment in FIG. 17A.

FIG. 17B is another schematic view of the imaging apparatus according to the 9th embodiment in FIG. 17A. FIG. 17C is yet another schematic view of the imaging apparatus according to the 9th embodiment in FIG. 17A. In FIG. 17B and FIG. 17C, the optical axis is folded by the reflecting element 981 and the reflecting element 982. The detailed optical data of the reflecting element 981 and the reflecting element 982 are shown in TABLE 17. As shown in FIG. 17B and FIG. 17C, the directions of lights passing through the optical image capturing assembly can be changed by the reflecting element 981 and the reflecting element 982. Accordingly, it is favorable to apply the optical image capturing assembly to different imaging apparatus and electronic devices. Moreover, the reflecting element 981 and the reflecting element 982 can be adjusted according to practical demands, so that the spatial arrangement is more flexible.

In the 9th embodiment, the equation of the aspheric surface profiles of the aforementioned lens elements is the same as the equation of the 1st embodiment. Also, the definitions of these parameters shown in the following table are the same as those stated in the 1st embodiment and the 7th embodiment with corresponding values for the 9th embodiment, so an explanation in this regard will not be provided again. In the 9th embodiment, the optical image capturing assembly includes two reflecting elements, the reflecting element 981 and the reflecting element 982. The values of TD/TP, from left to right, are the value corresponding to the reflecting element 981 and the value corresponding to the reflecting element 982.

Moreover, these parameters can be calculated from TABLE 17 and TABLE 18 as the following values and satisfy the following conditions:

| 9th Embodiment | | | |
|---|---|---|---|
| f (mm) | 6.88 | TD/ΣAT | 5.35 |
| Fno | 2.74 | TD/TP | 0.92/0.92 |
| HFOV (deg.) | 17.5 | R3/\|R4\| | −0.53 |
| V2 | 30.2 | R3/f | −0.40 |
| V3 | 26.0 | \|R6/R7\| | 3.68 |
| V2 + V3 + V4 | 76.6 | \|R8\|/f | 1.35 |
| BL/TL | 0.60 | f1/\|f2\| | 1.11 |
| CT1/(CT2 + T23 + CT3) | 1.13 | f1/f3 | 1.08 |
| CT3/T34 | 1.83 | EPD/ImgH | 1.14 |
| SL/TL | 0.96 | EPD/Y42 | 1.96 |
| (T23 + T34)/CT3 | 0.89 | Y11/Y42 | 0.98 |
| TD (mm) | 3.50 | | |

10th Embodiment

Figure 19A:
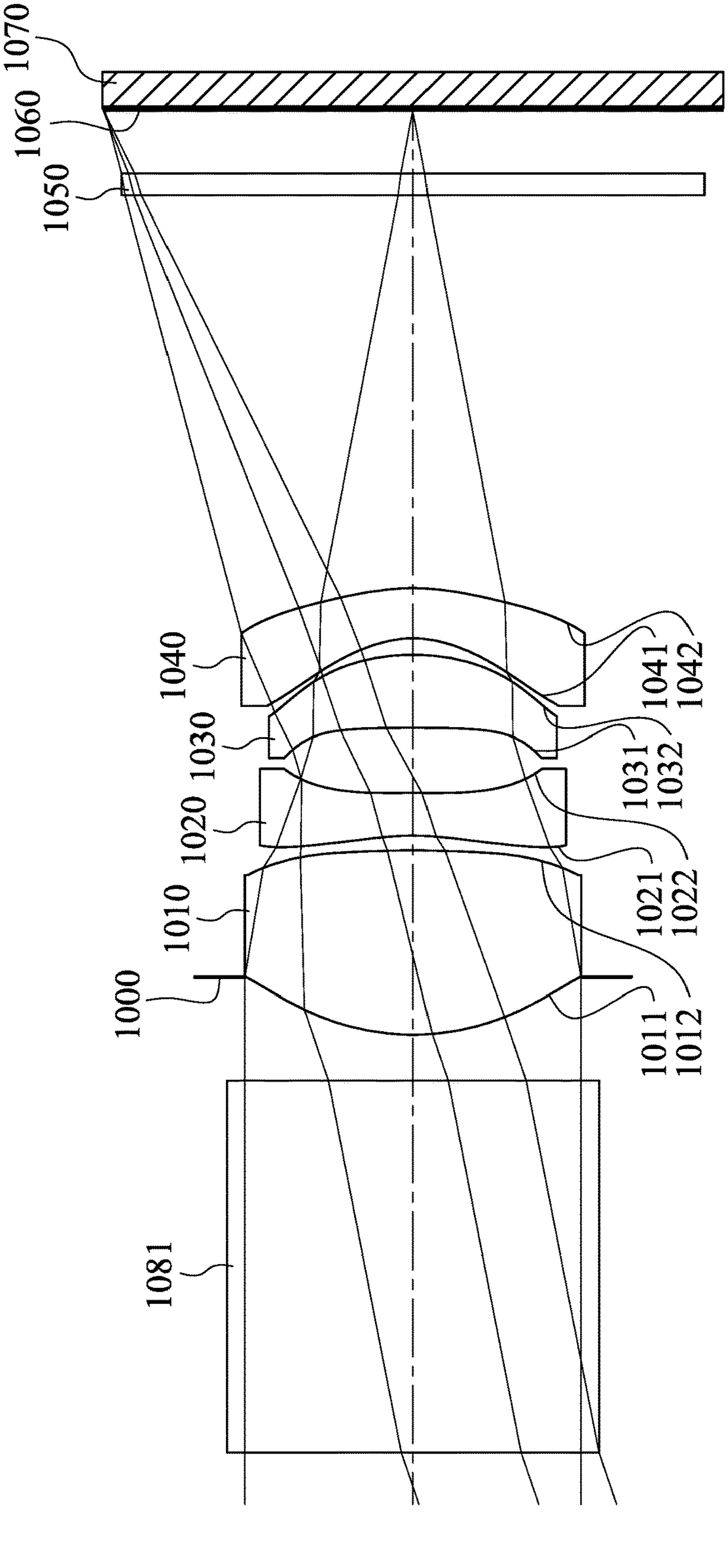
FIG. 19A is a schematic view of an imaging apparatus according to the 10th embodiment of the present disclosure.
Figure 20:
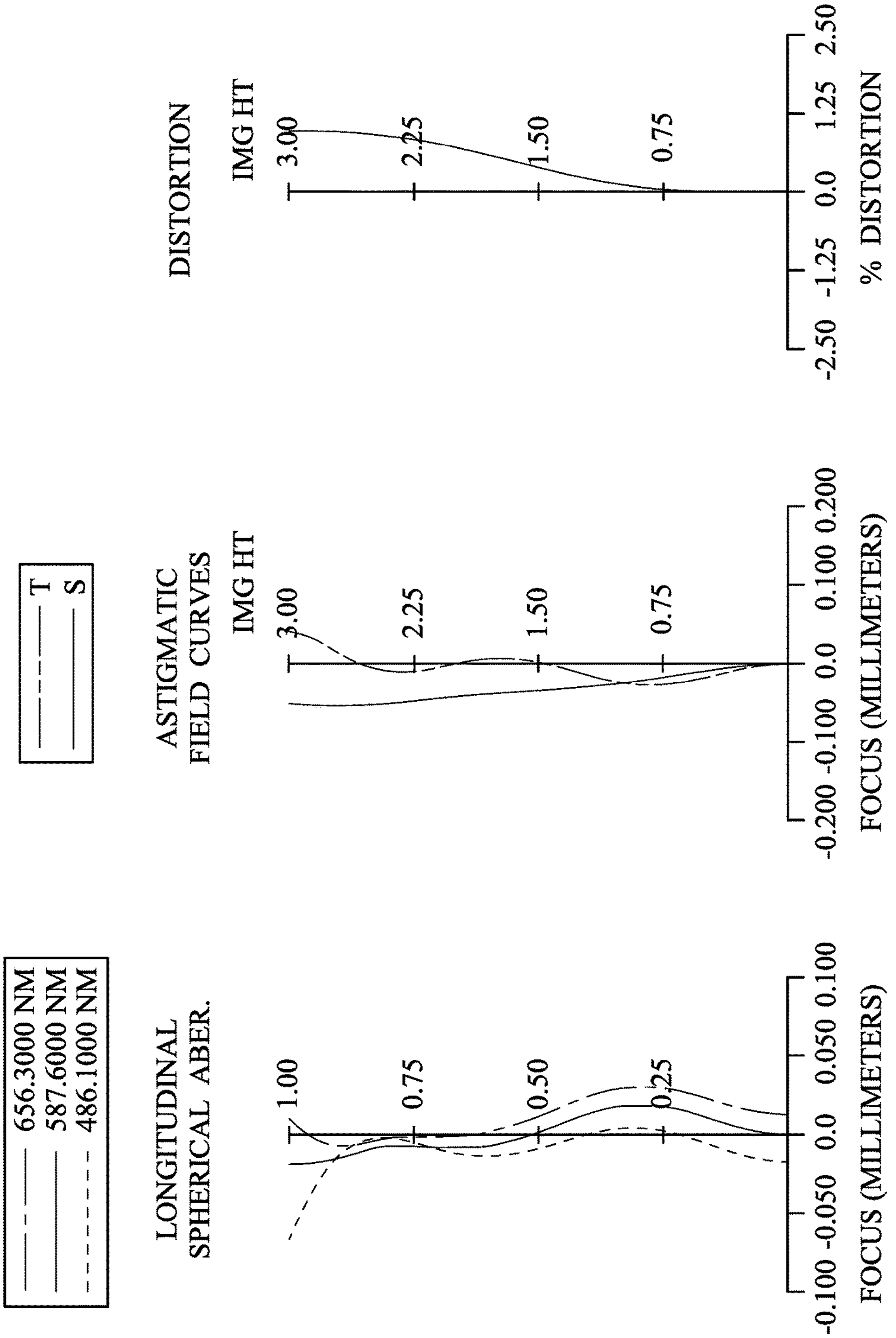
FIG. 20 shows spherical aberration curves, astigmatic field curves and a distortion curve of the imaging apparatus according to the 10th embodiment.

FIG. 19A is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19A, the imaging apparatus includes an optical image capturing assembly (its reference numeral is omitted) and an image sensor 1070. The optical image capturing assembly includes, in order from an object side to an image side, a reflecting element 1081, an aperture stop 1000, a first lens element 1010, a second lens element 1020, a third lens element 1030, a fourth lens element 1040, an IR-cut filter 1050 and an image surface 1060. The image sensor 1070 is disposed on the image surface 1060 of the optical image capturing assembly. The optical image capturing assembly includes four lens elements (1010, 1020, 1030 and 1040) without additional one or more lens elements inserted between the first lens element 1010 and the fourth lens element 1040, and there is an air space between the first lens element 1010 and the second lens element 1020.

The first lens element 1010 with positive refractive power has an object-side surface 1011 being convex in a paraxial region thereof and an image-side surface 1012 being convex in a paraxial region thereof. The first lens element 1010 is made of a plastic material, and has the object-side surface 1011 and the image-side surface 1012 being both aspheric.

The second lens element 1020 with negative refractive power has an object-side surface 1021 being concave in a paraxial region thereof and an image-side surface 1022 being convex in a paraxial region thereof. The second lens element 1020 is made of a plastic material, and has the object-side surface 1021 and the image-side surface 1022 being both aspheric. Furthermore, the object-side surface 1021 of the second lens element 1020 includes at least one inflection point.

The third lens element 1030 with positive refractive power has an object-side surface 1031 being concave in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric.

The IR-cut filter 1050 is made of a glass material and located between the fourth lens element 1040 and the image surface 1060, and will not affect the focal length of the optical image capturing assembly.

The reflecting element 1081 is a prism and is made of a plastic material. The reflecting element 1081 is located at an object-side of the first lens element 1010. That is, the reflecting element 1081 is located between an imaged object (not shown) and the first lens element 1010 and is located on the light path of the optical image capturing assembly.

The detailed optical data of the 10th embodiment are shown in TABLE 19 and the aspheric surface data are shown in TABLE 20 below.

TABLE 19

| 10th Embodiment f = 8.74 mm, Fno = 2.69, HFOV = 18.8 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Reflecting element (prism) | Plano | | 3.600 | Plastic | 1.671 | 19.3 | — |
| 2 | | Plano | | 1.000 | | | | |
| 3 | Ape. Stop | Plano | | −0.554 | | | | |
| 4 | Lens 1 | 2.352 | ASP | 1.781 | Plastic | 1.545 | 56.0 | 3.69 |
| 5 | | −10.054 | ASP | 0.143 | | | | |
| 6 | Lens 2 | −2.516 | ASP | 0.413 | Plastic | 1.614 | 26.0 | −4.30 |
| 7 | | −57.137 | ASP | 0.627 | | | | |
| 8 | Lens 3 | −29.165 | ASP | 0.708 | Plastic | 1.614 | 26.0 | 3.70 |
| 9 | | −2.126 | ASP | 0.159 | | | | |
| 10 | Lens 4 | −1.097 | ASP | 0.486 | Plastic | 1.584 | 28.2 | −4.20 |
| 11 | | −2.308 | ASP | 3.800 | | | | |
| 12 | IR-cut filter | Plano | | 0.210 | Glass | 1.517 | 64.2 | — |
| 13 | | Plano | | 0.621 | | | | |
| 14 | Image | Plano | | — | | | | |

Reference wavelength is 587.6 nm (d-line).
The effective radius of the surface 1 is 1.800 mm.
The effective radius of the surface 11 is 1.660 mm.

TABLE 20

| Aspheric Coefficients | | | | |
|---|---|---|---|---|
| Surface # | 4 | 5 | 6 | 7 |
| k = | −3.9316E−01 | −3.2086E+00 | −1.0296E+00 | −1.5562E+01 |
| A4 = | −1.1424E−04 | 2.5652E−02 | 1.9914E−01 | 1.6764E−01 |
| A6 = | 1.3064E−03 | −2.7173E−02 | −1.6334E−01 | −9.8702E−02 |
| A8 = | −2.3475E−03 | −8.3734E−03 | 1.0156E−01 | 3.0150E−02 |

TABLE 20-continued

| Aspheric Coefficients | | | | |
|---|---|---|---|---|
| A10 = | 9.9706E−04 | 1.1764E−02 | −4.6715E−02 | 3.7768E−02 |
| A12 = | −2.5634E−04 | −3.6468E−03 | 1.4236E−02 | −4.0687E−02 |
| A14 = | | 3.6854E−04 | −1.8741E−03 | 1.2412E−02 |
| Surface # | 8 | 9 | 10 | 11 |
| k = | −5.4527E+01 | 1.0532E+00 | −6.1421E−01 | 1.3385E−01 |
| A4 = | −5.0563E−02 | −3.3880E−02 | 1.1074E−01 | 7.9220E−02 |
| A6 = | −7.9576E−03 | 4.1948E−02 | 3.4923E−02 | 4.9329E−03 |
| A8 = | −6.0433E−02 | −7.0618E−02 | −1.0518E−01 | −4.0352E−02 |
| A10 = | 7.3603E−02 | 6.8255E−02 | 1.1345E−01 | 3.3454E−02 |
| A12 = | −5.4545E−02 | −3.1224E−02 | −6.1173E−02 | −1.4847E−02 |
| A14 = | 1.5557E−02 | 6.6829E−03 | 1.8628E−02 | 3.5135E−03 |
| A16 = | | | −2.5584E−03 | −3.4406E−04 |

Figure 19B:
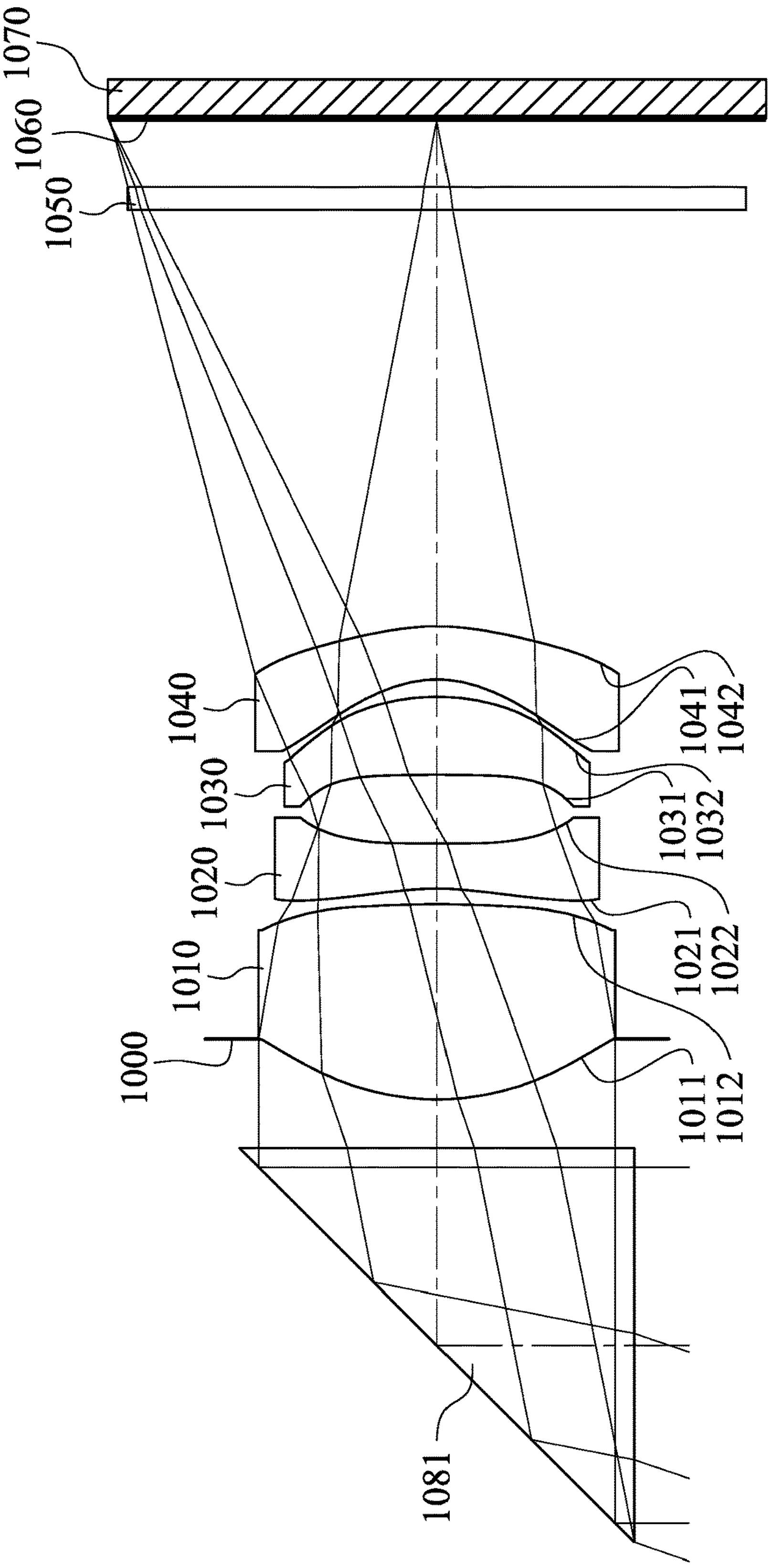
FIG. 19B is another schematic view of the imaging apparatus according to the 10th embodiment in FIG. 19A.

FIG. 19B is another schematic view of the imaging apparatus according to the 10th embodiment in FIG. 19A. In FIG. 19B, the optical axis is folded by the reflecting element 1081. The detailed optical data of the reflecting element 1081 are shown in TABLE 19. As shown in FIG. 19B, the directions of lights passing through the optical image capturing assembly can be changed by the reflecting element 1081. Accordingly, it is favorable to apply the optical image capturing assembly to different imaging apparatus and electronic devices. Moreover, the reflecting element 1081 can be adjusted according to practical demands, so that the spatial arrangement is more flexible.

In the 10th embodiment, the equation of the aspheric surface profiles of the aforementioned lens elements is the same as the equation of the 1st embodiment. Also, the definitions of these parameters shown in the following table are the same as those stated in the 1st embodiment and the 7th embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f (mm) | 8.74 | TD/ΣAT | 4.65 |
| Fno | 2.69 | TD/TP | 1.20 |
| HFOV (deg.) | 18.8 | R3/\|R4\| | −0.04 |
| V2 | 26.0 | R3/f | −0.29 |
| V3 | 26.0 | \|R6/R7\| | 1.94 |
| V2 + V3 + V4 | 80.1 | \|R8\|/f | 0.26 |
| BL/TL | 0.52 | f1/\|f2\| | 0.86 |
| CT1/(CT2 + T23 + CT3) | 1.02 | f1/f3 | 1.00 |
| CT3/T34 | 4.45 | EPD/ImgH | 1.08 |
| SL/TL | 0.94 | EPD/Y42 | 1.96 |
| (T23 + T34)/CT3 | 1.11 | Y11/Y42 | 0.98 |
| TD (mm) | 4.32 | | |

11th Embodiment

Figure 23A:
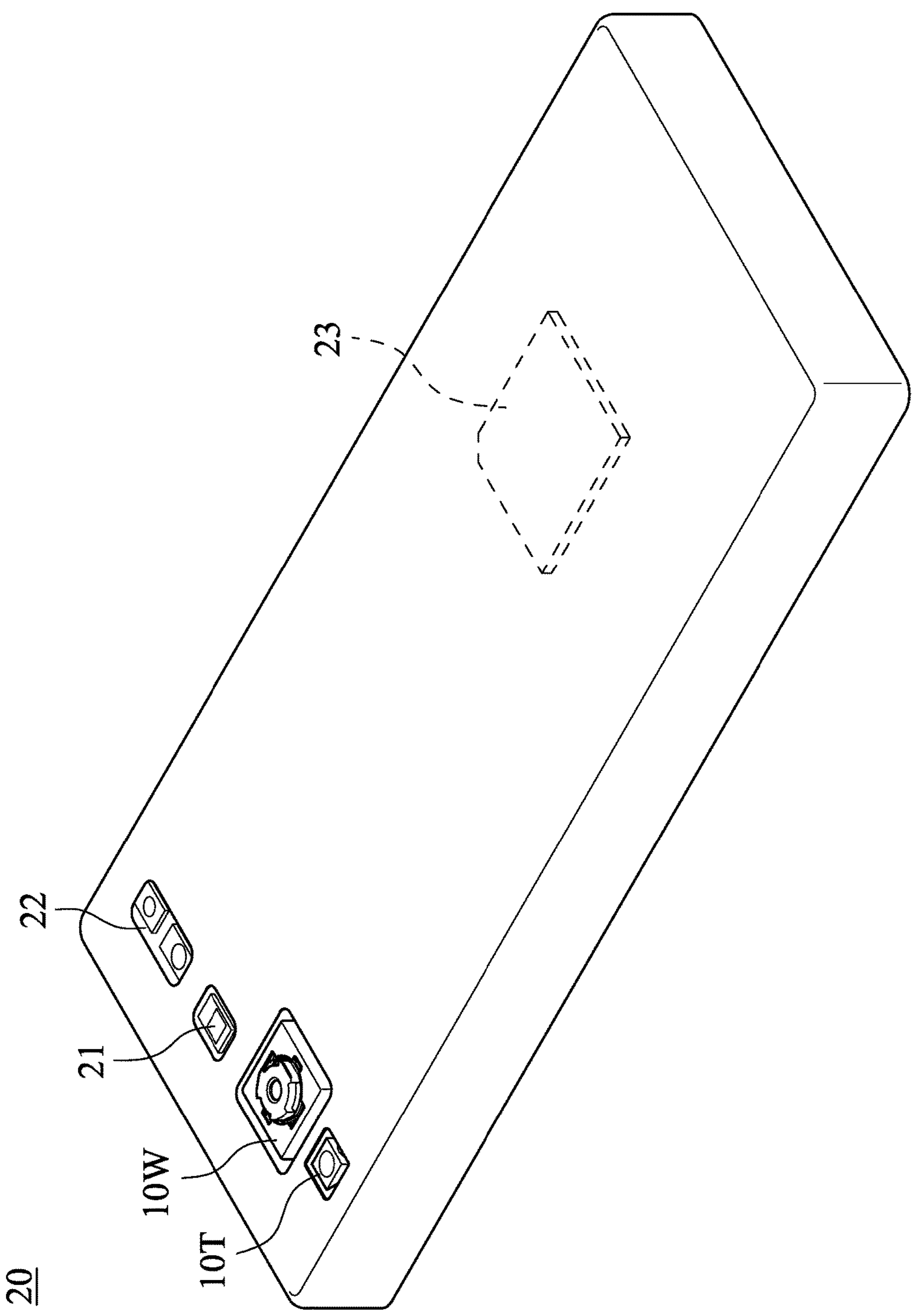
FIG. 23A is a schematic view showing a side of an electronic device according to the 11th embodiment of the present disclosure.
Figure 23B:
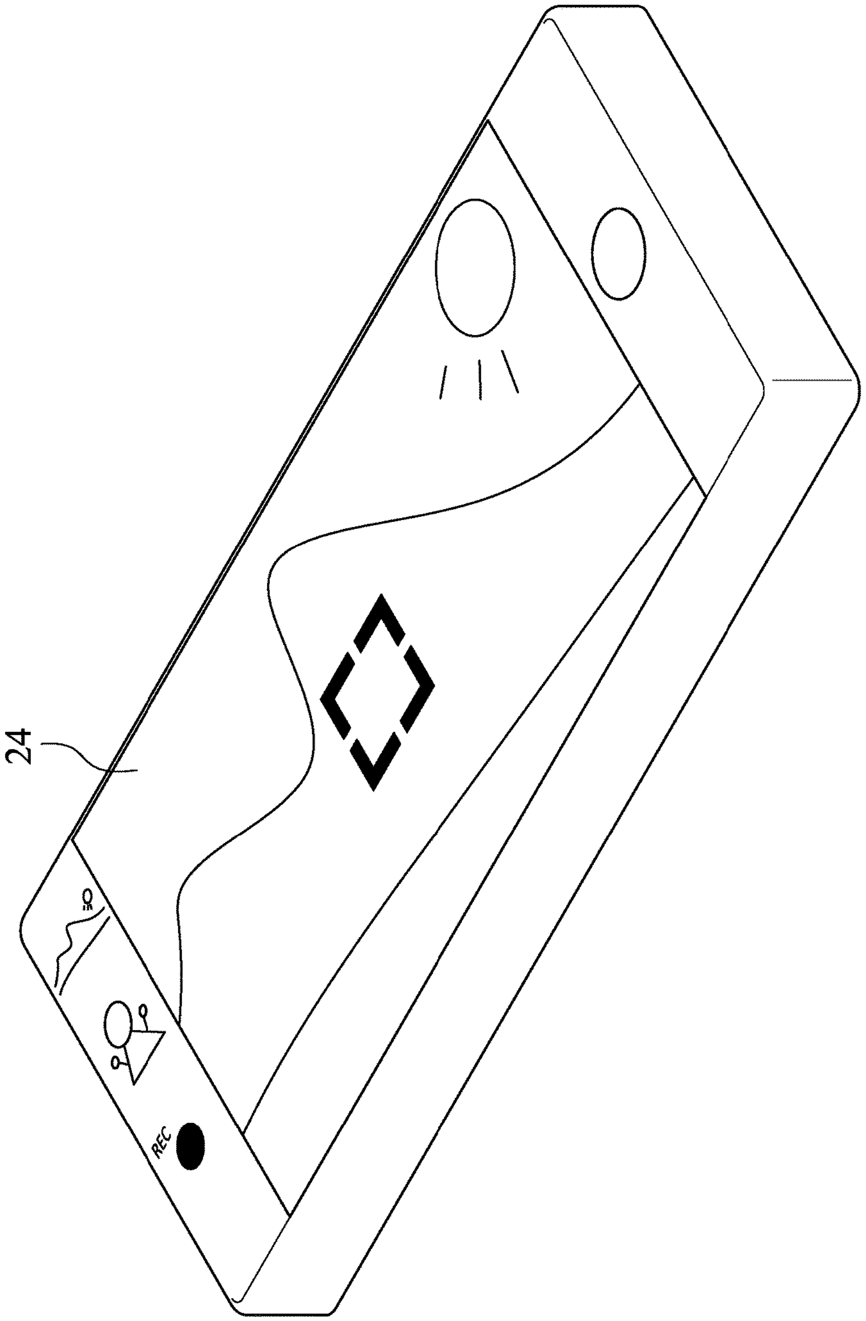
FIG. 23B is a schematic view showing another side of the electronic device in FIG. 23A.
Figure 23C:
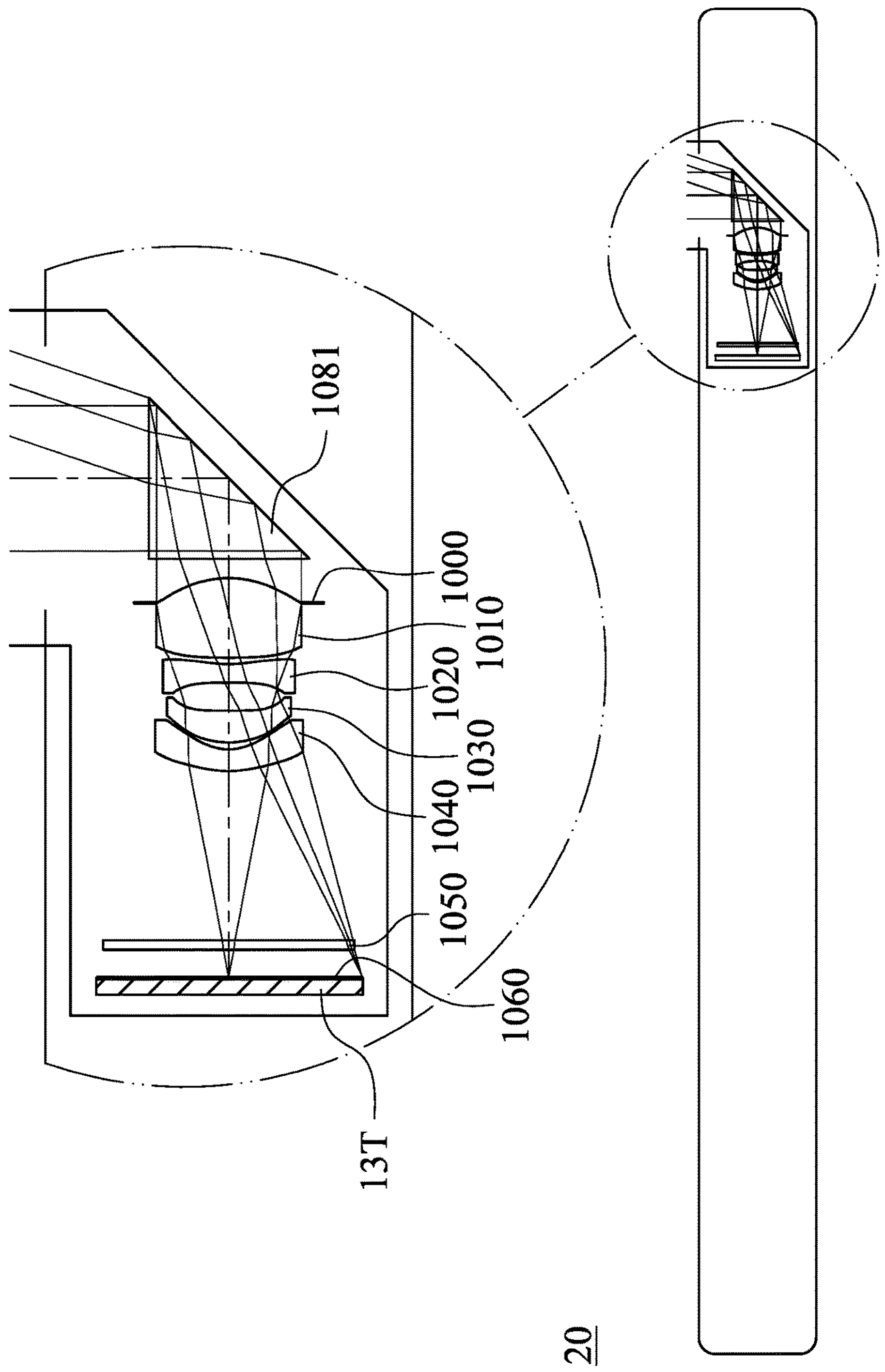
FIG. 23C is a cross-sectional view of the electronic device in FIG. 23A.
Figure 23D:
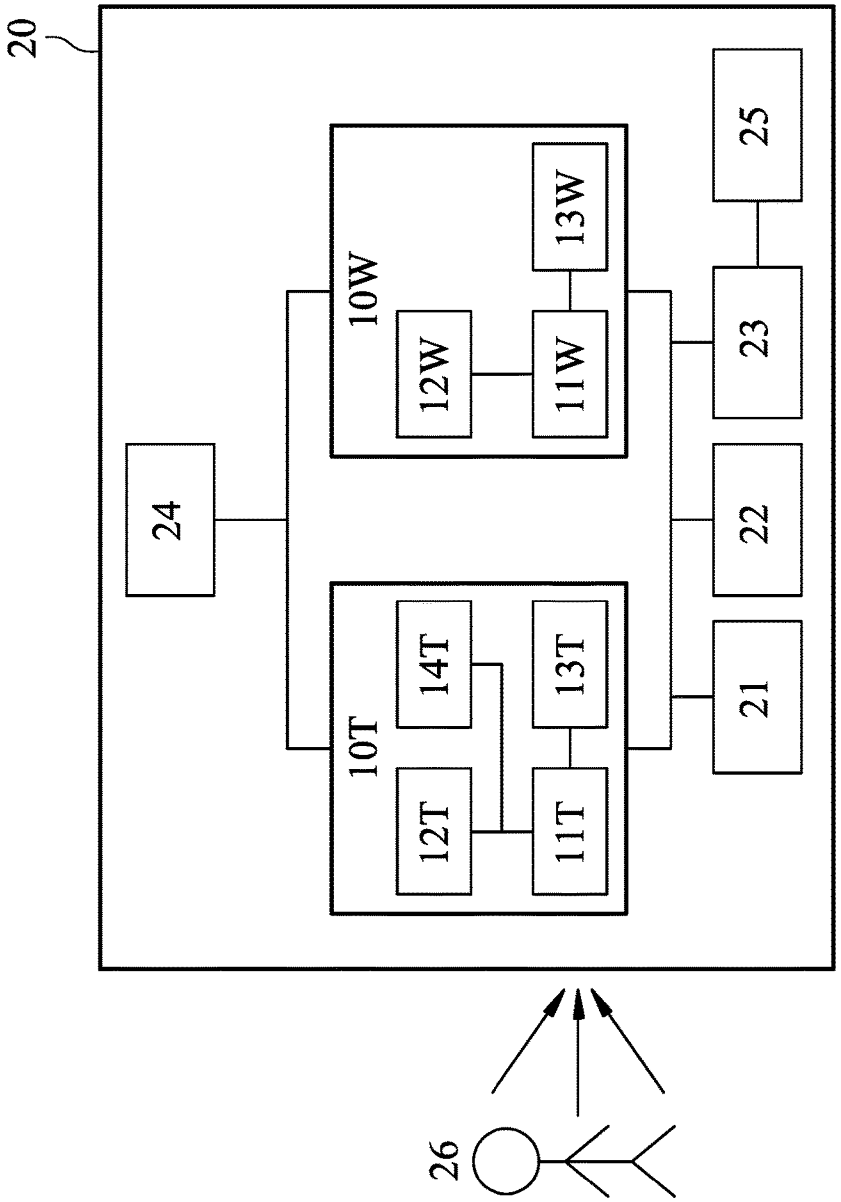
FIG. 23D is a block diagram of the electronic device in FIG. 23A.

FIG. 23A is a schematic view showing a side of an electronic device 20 according to the 11th embodiment of the present disclosure. FIG. 23B is a schematic view showing another side of the electronic device 20 in FIG. 23A. FIG. 23C is a cross-sectional schematic view of the electronic device 20 in FIG. 23A. FIG. 23D is a block diagram of the electronic device 20 in FIG. 23A. In FIG. 23A, FIG. 23B, FIG. 23C and FIG. 23D, the electronic device 20 of the 11th embodiment is a smartphone. The electronic device 20 includes a flash module 21, an auxiliary focusing module 22, an image signal processor 23, a user interface 24, an image software processor 25 (shown in 23D), an imaging apparatus 10T and an imaging apparatus 10W. The imaging apparatus 10T is featured with small field of view and telephoto property (its FOV is in the range of 20 degrees to 40 degrees), and the imaging apparatus 10W is featured with wide-angel property (its FOV is in the range of 70 degrees to 100 degrees). With the imaging apparatus 10T and the imaging apparatus 10W providing different field of views, the electronic device 20 can satisfy the demands of multi-function photography, such as long shot and close shot. As shown in FIG. 23C, the height of the optical image capturing assembly can be reduced by the reflecting element 1081, so that the special arrangement is more flexible. Details of the imaging apparatus 10T and the imaging apparatus 10W are recited in the descriptions relating to FIG. 23E and FIG. 23F, respectively.

When a user triggers a shooting via the user interface 24, lights of the imaged object 26 are focused by at least one of the imaging apparatus 10T and the imaging apparatus 10W for generating at least one image. Meanwhile, a light compensation function is provided by the flash module 21, the object distance of the imaged objected 26 is provided by the auxiliary focusing module 22 for quick focusing, and an optimizing image processing is provided by the image signal processor 23 and the image software processor 25, so that the image quality of the electronic device 20 can be further enhanced. The auxiliary focusing module 22 can adopt an infrared auxiliary focusing system or a laser auxiliary focusing system for quick focusing. The user interface 24 can adopt a touch screen or a physical shooting button, and an image software processor 25 can be coordinated with the user interface 24 for providing a variety of shooting modes and a variety of image processes.

Figure 23E:
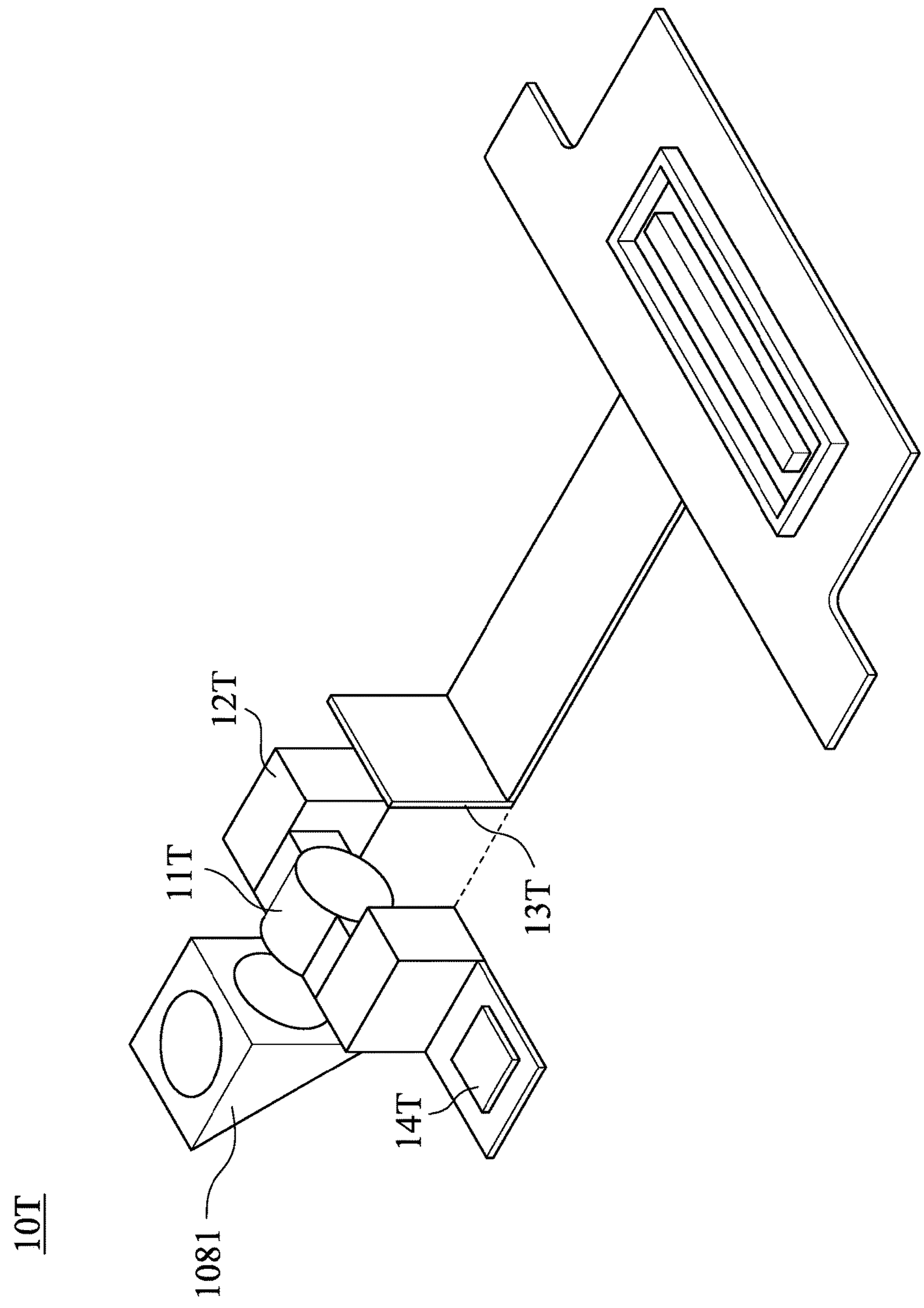
FIG. 23E is a three-dimensional view of an imaging apparatus of the electronic device according to the 11th embodiment.

FIG. 23E is a three-dimensional view of the imaging apparatus 10T of the electronic device 20 according to the 11th embodiment. In FIG. 23E, the imaging apparatus 10T is a camera module. The imaging apparatus 10T includes an imaging lens module 11T, a driving assembly 12T, an image sensor 13T, an image stabilizing module 14T and the reflecting element 1081. In the 11th embodiment, the imaging lens module 11T can include a barrel (its reference numeral is omitted) and all the elements of the optical image capturing assembly according to the 10th embodiment except the reflecting element 1081. However, it is only exemplary and the imaging lens module 11T is not limited thereto. Details of the optical image capturing assembly according to the 10th embodiment are mentioned above, and are not repeated herein. An image of an imaged object 26 can be captured by the imaging apparatus 10T via the imaging lens module 11T, the driving assembly 12T is to used to bring the image into focus so that the image can be clearly formed on the image sensor 13T, and then the data of the image is outputted.

The driving assembly 12T can have an auto-focus functionality, and a driving method thereof can use a voice coil motor (VCM), a micro electro-mechanical system (MEMS), a piezoelectric system or a shape memory alloy system. The driving assembly 12T enables the imaging lens module 11T to obtain a preferable imaging position, so that the imaged object 26 in different object distances can be imaged clearly.

The image sensor 13T of the imaging apparatus 10T can have the properties of high light sensitivity and low noise (such as CMOS and CCD) and is disposed on the image surface of the optical image capturing assembly, so that the excellent image quality of the optical image capturing assembly can be truly presented.

The image stabilizing module 14T can exemplarily be an accelerator, a gyro or a Hall effect sensor. In the 11th embodiment, the image stabilizing module 14T is a gyro. However, it is only exemplary and the image stabilizing module 14T is not limited thereto. The driving assembly 12T can be coordinated with the image stabilizing module 14T to form an optical image stabilization (OIS) structure. By adjusting the changes in different axial directions of the imaging lens module 11T, the blurry image resulting in the shaking of the shooting moment can be compensated. Alternatively, the blurry image resulting in the shaking of the shooting moment can be compensated by the image compensating technique of the image software, so that an electronic image stabilization (EIS) function can be provided. Accordingly, the image quality of dynamic scenes or low-light scenes can be enhanced.

Figure 23F:
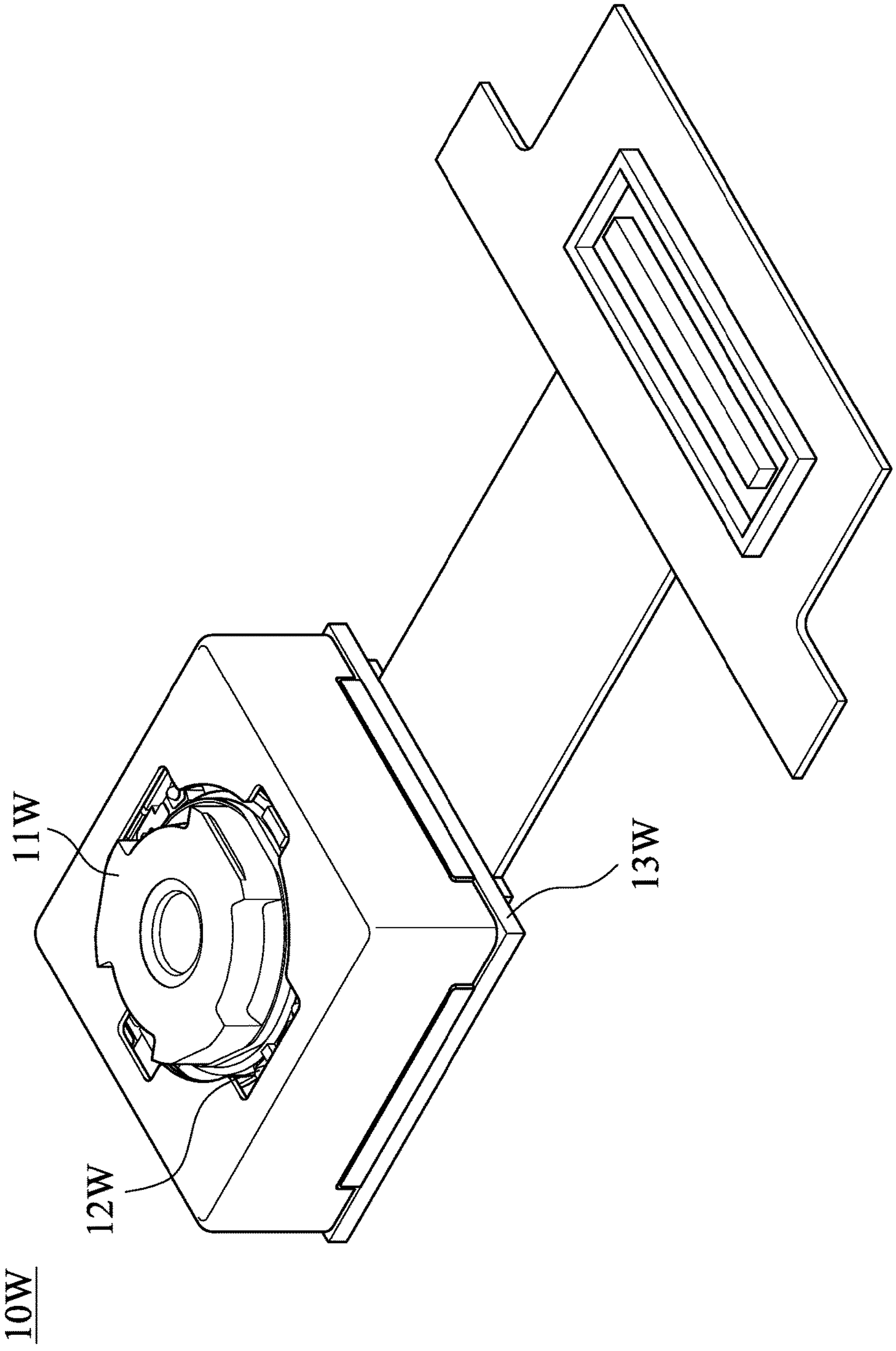
FIG. 23F is a three-dimensional view of another imaging apparatus of the electronic device according to the 11th embodiment.

FIG. 23F is a three-dimensional view of another imaging apparatus 10W of the electronic device 20 according to the 11th embodiment. In FIG. 23F, the imaging apparatus 10W is a camera module. The imaging apparatus 10W includes an imaging lens module 11W, a driving assembly 12W and an image sensor 13W. The imaging lens module 11W can include a barrel (its reference numeral is omitted) and a wide-angle optical lens assembly (its FOV is in the range of 70 degrees to 100 degrees). The function of other elements (the driving assembly 12W and the image sensor 13W) of the imaging apparatus 10W can be the same as that of the imaging apparatus 10T, and are not repeated herein.

Figure 23G:
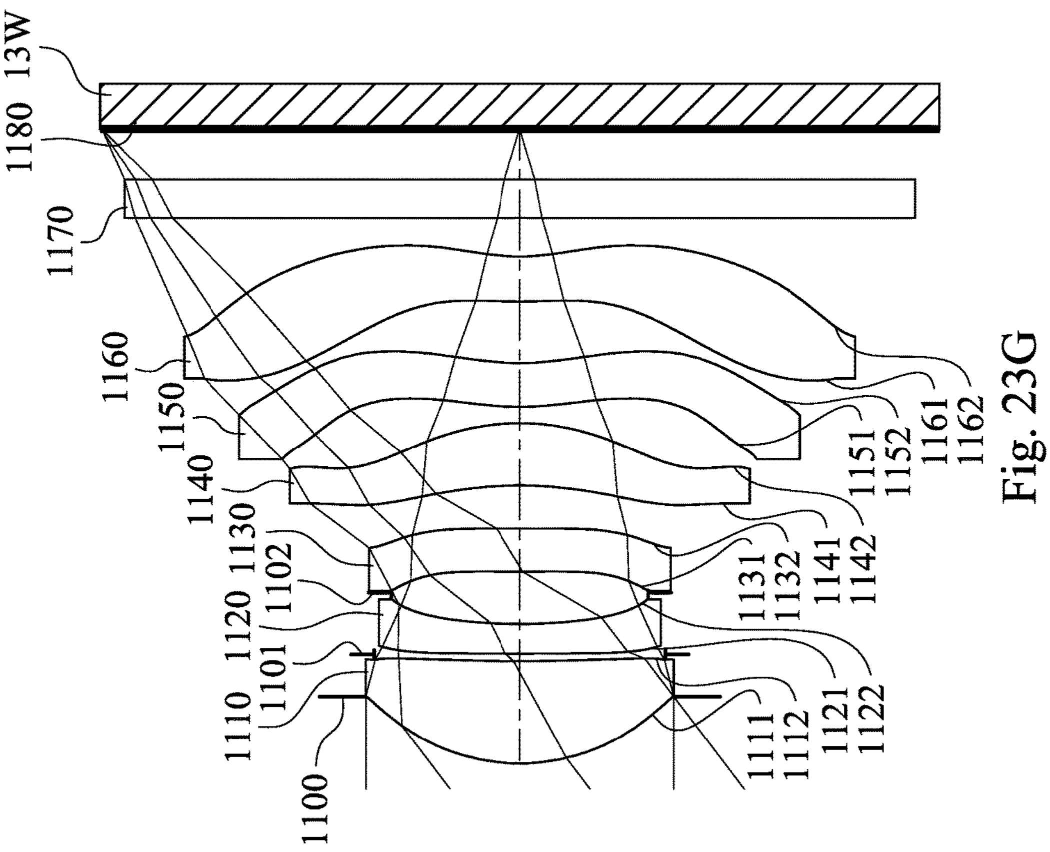
FIG. 23G is a schematic view of a wide-angle optical lens assembly and an image sensor of the imaging apparatus in FIG. 23F.

FIG. 23G is a schematic view of the wide-angle optical lens assembly and the image sensor 13W of the imaging apparatus 10W in FIG. 23F. In FIG. 23G, the optical properties of the imaging apparatus 10W are emphasized, so that only the wide-angle optical lens assembly and the image sensor 13W are shown, and the other elements of the imaging apparatus 10W are omitted. The wide-angle optical lens assembly includes, in order from an object side to an image side, an aperture stop 1100, a first lens element 1110, a stop 1101, a second lens element 1120, a stop 1102, a third lens element 1130, a fourth lens element 1140, a fifth lens element 1150, a sixth lens element 1160, an IR-cut filter 1170 and an image surface 1180. The image sensor 13W is disposed on the image surface 1180 of the wide-angle optical lens assembly. The wide-angle optical lens assembly includes six lens elements (1110, 1120, 1130, 1140, 1150 and 1160) without additional one or more lens elements inserted between the first lens element 1110 and the sixth lens element 1160.

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric.

The fourth lens element 1140 with positive refractive power has an object-side surface 1141 being concave in a paraxial region thereof and an image-side surface 1142 being convex in a paraxial region thereof. The fourth lens element 1140 is made of a plastic material, and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric.

The sixth lens element 1160 with negative refractive power has an object-side surface 1161 being convex in a paraxial region thereof and an image-side surface 1162 being concave in a paraxial region thereof. The sixth lens element 1160 is made of a plastic material, and has the object-side surface 1161 and the image-side surface 1162 being both aspheric.

The IR-cut filter 1170 is made of a glass material and located between the sixth lens element 1160 and the image surface 1180, and will not affect the focal length of the wide-angle optical lens assembly.

The detailed optical data of the wide-angle optical lens assembly are shown in TABLE 21 and the aspheric surface data are shown in TABLE 22 below.

TABLE 21

11th Embodiment (wide-angle optical lens assembly)
f = 4.22 mm, Fno = 1.75, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.523 | | | | |
| 2 | Lens 1 | 1.582 | ASP | 0.798 | Plastic | 1.545 | 56.1 | 3.38 |
| 3 | | 9.227 | ASP | 0.053 | | | | |
| 4 | Stop | Plano | | 0.006 | | | | |
| 5 | Lens 2 | 15.096 | ASP | 0.230 | Plastic | 1.661 | 20.3 | −7.84 |
| 6 | | 3.832 | ASP | 0.246 | | | | |
| 7 | Stop | Plano | | 0.161 | | | | |
| 8 | Lens 3 | 17.220 | ASP | 0.335 | Plastic | 1.661 | 20.3 | 50.97 |
| 9 | | 34.981 | ASP | 0.336 | | | | |
| 10 | Lens 4 | −2.948 | ASP | 0.487 | Plastic | 1.544 | 56.0 | 8.53 |

TABLE 21-continued

| 11th Embodiment (wide-angle optical lens assembly) f = 4.22 mm, Fno = 1.75, HFOV = 37.2 deg. | | | | | | | | | |
|---|---|---|---|---|---|---|---|---|---|
| Surface # | | Curvature Radius | | Thickness | Material | Index | Abbe # | Focal Length |
| 11 | | −1.908 | ASP | 0.128 | | | | |
| 12 | Lens 5 | 2.344 | ASP | 0.340 | Plastic | 1.639 | 23.3 | −81.92 |
| 13 | | 2.117 | ASP | 0.478 | | | | |
| 14 | Lens 6 | 4.151 | ASP | 0.350 | Plastic | 1.511 | 56.8 | −5.13 |
| 15 | | 1.560 | ASP | 0.300 | | | | |
| 16 | IR-cut filter | Plano | | 0.300 | Glass | 1.517 | 64.2 | — |
| 17 | | Plano | | 0.401 | | | | |
| 18 | Image | Plano | | — | | | | |

Reference wavelength is 587.6 nm (d-line).
The effective radius of the surface 4 is 1.135 mm.
The effective radius of the surface 7 is 1.000 mm.
The effective radius of the surface 11 is 1.790 mm.

featured with small field of view and telephoto property (its FOV is in the range of 20 degrees to 40 degrees), the imaging apparatus 10M1 is featured with medium-angle property (its FOV is in the range of 45 degrees to 60 degrees) and the imaging apparatus 10W is featured with wide-angel property (its FOV is in the range of 70 degrees to 100 degrees). With the imaging apparatus 10T, the imaging apparatus 10M1, and the imaging apparatus 10W providing different field of views, the electronic device 30 can satisfy the demands of multi-function photography, such as long shot and close shot. Details of the imaging apparatus 10T and the imaging apparatus 10W can refer to the 11th embodiment, and details of the imaging apparatus 10M1 are recited hereinafter.

Figure 24A:
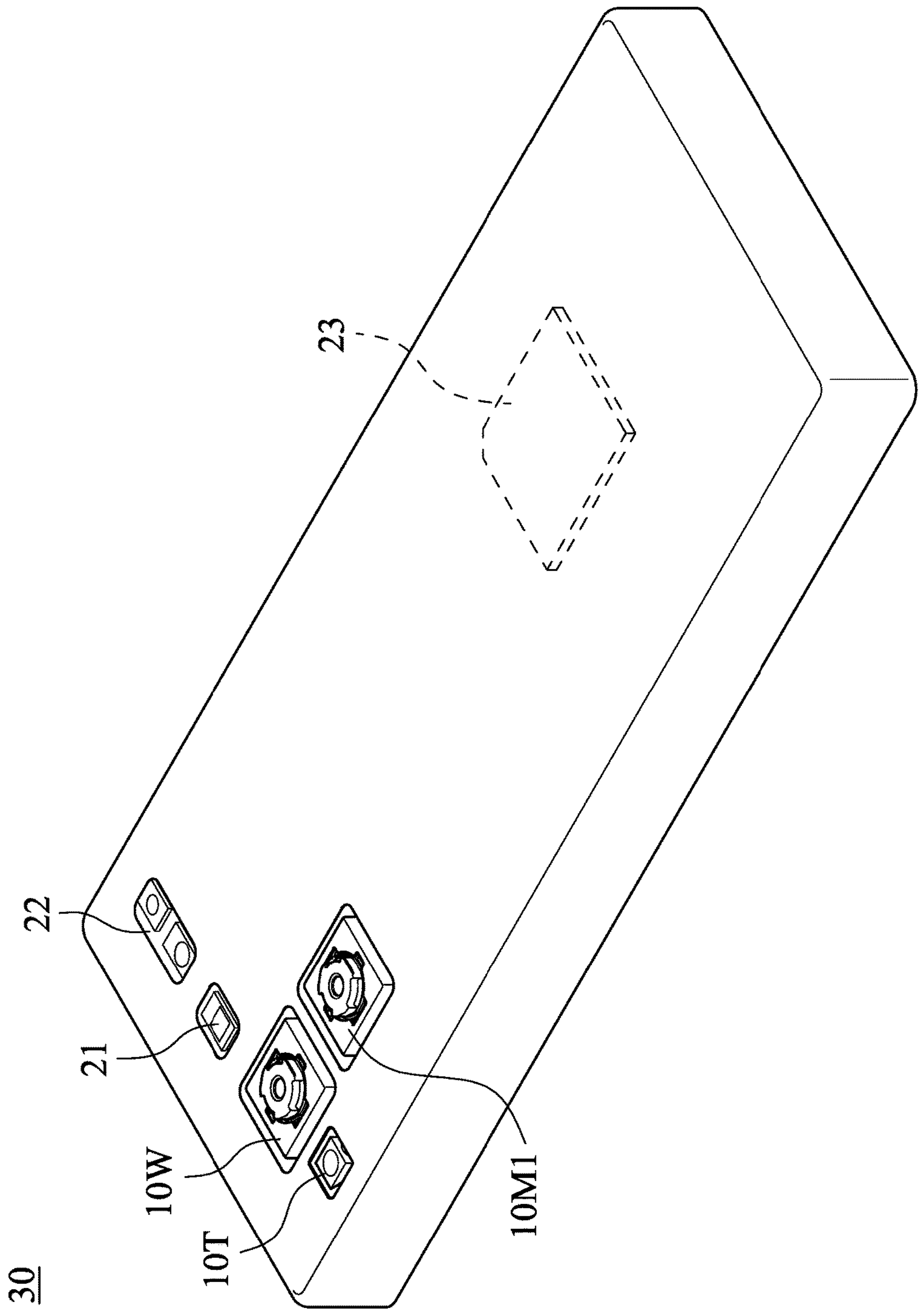
FIG. 24A is a schematic view showing a side of an electronic device according to the 12th embodiment of the present disclosure.
Figure 24B:
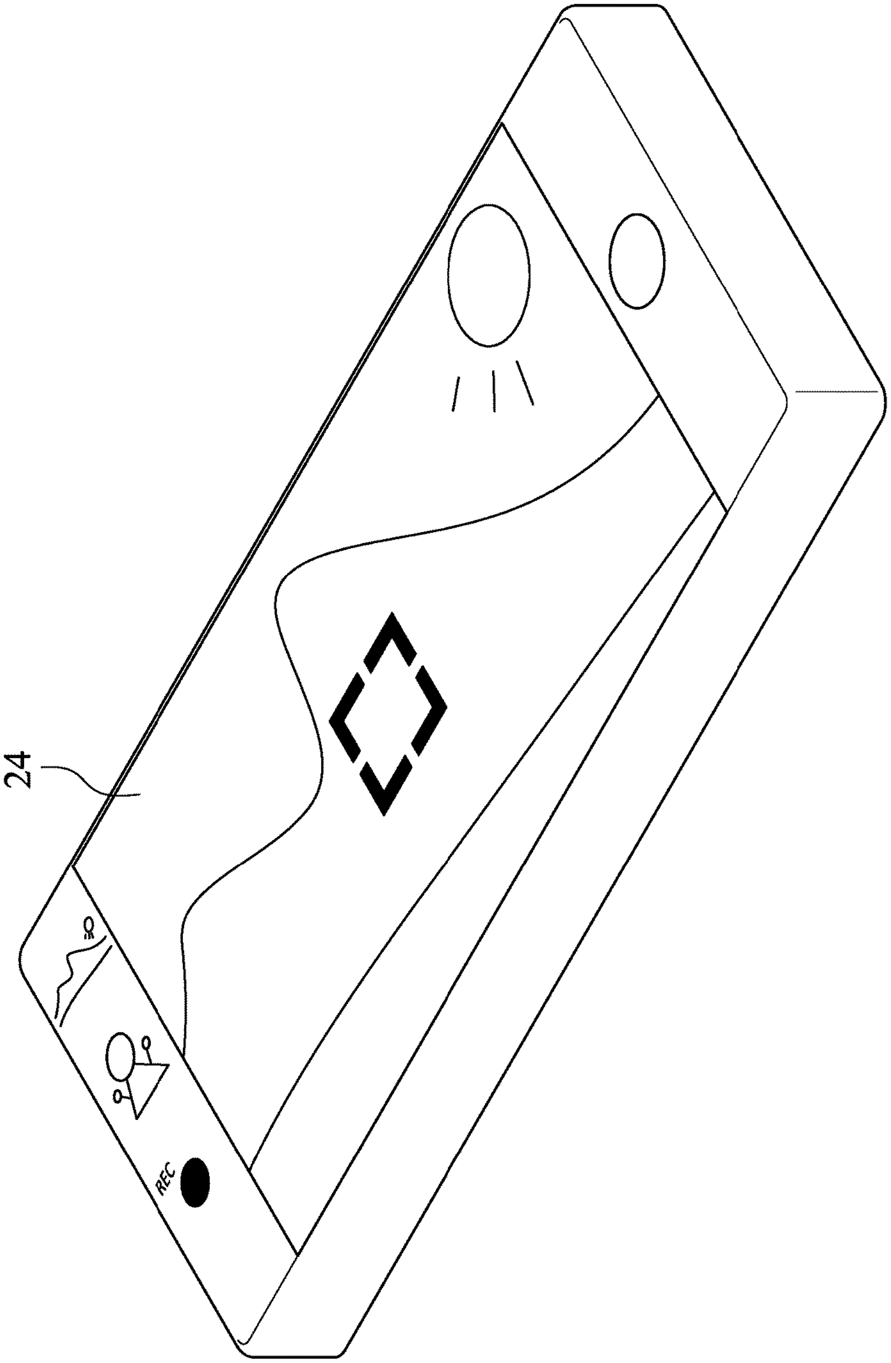
FIG. 24B is a schematic view showing another side of the electronic device in FIG. 24A.
Figure 24C:
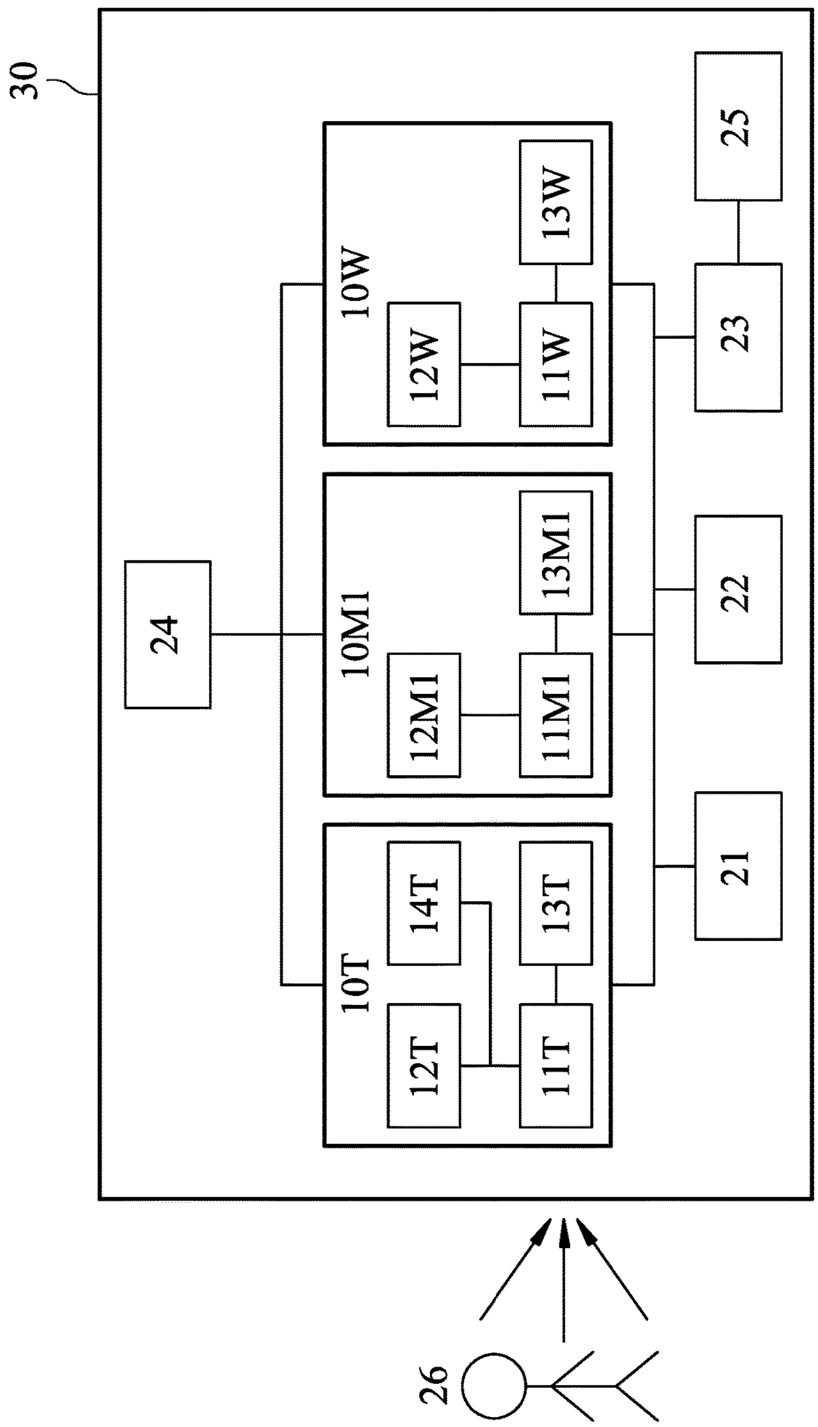
FIG. 24C is a block diagram of the electronic device in FIG. 24A.
Figure 24D:
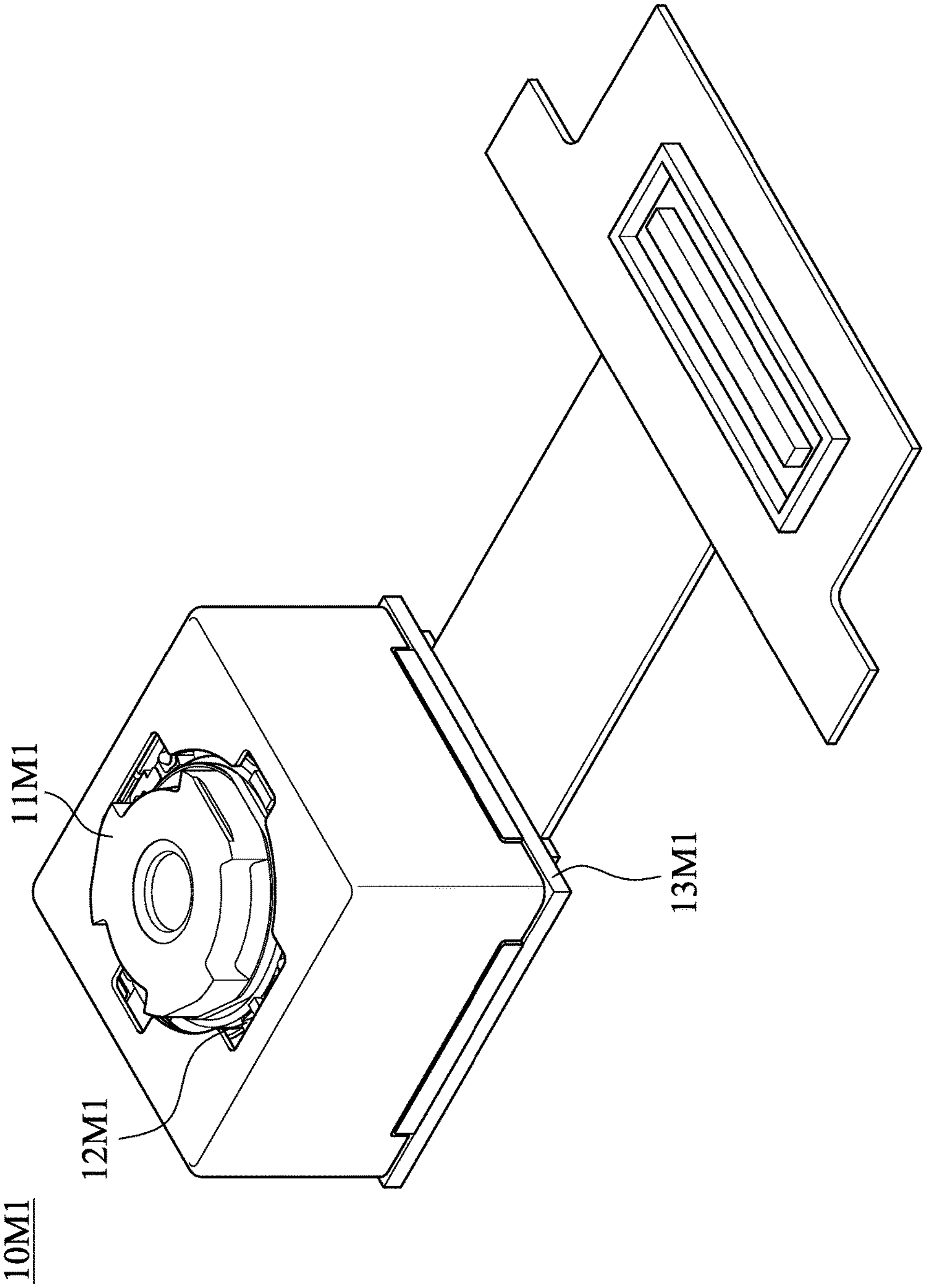
FIG. 24D is a three-dimensional view of an imaging apparatus of the electronic device according to the 12th embodiment.

FIG. 24D is a three-dimensional view of the imaging apparatus 10M1 of the electronic device 30 according to the 12th embodiment. In FIG. 24D, the imaging apparatus 10M1 is a camera module. The imaging apparatus 10M1 includes an imaging lens module 11M1, a driving assembly 12M1 and an image sensor 13M1. The imaging lens module 11M1 can include a barrel (its reference numeral is omitted) and a medium-angle optical lens assembly (its FOV is in the range of 45 degrees to 60 degrees). The function of other elements (the driving assembly 12M1 and the image sensor 13M1) of the imaging apparatus 10M1 can be the same as that of the imaging apparatus 10T, and are not repeated herein.

TABLE 22

| Aspheric Coefficients | | | | | | |
|---|---|---|---|---|---|---|
| Surface # | 2 | 3 | 5 | 6 | 8 | 9 |
| k = | −1.8796E−02 | 1.2488E+00 | −8.5586E+01 | −9.2151E+00 | 3.6299E+01 | −6.6841E+01 |
| A4 = | −2.0421E−03 | −1.1337E−01 | −1.5574E−01 | −5.4175E−02 | −1.7071E−01 | −1.1152E−01 |
| A6 = | 2.4462E−02 | 1.9299E−01 | 3.7697E−01 | 2.7656E−01 | 7.2249E−02 | −2.8707E−02 |
| A8 = | −7.7755E−02 | −1.7038E−01 | −4.0896E−01 | −4.6220E−01 | −4.3086E−01 | 9.9809E−03 |
| A10 = | 1.4468E−01 | 9.2874E−02 | 2.9386E−01 | 6.6240E−01 | 9.9374E−01 | 1.0965E−02 |
| A12 = | −1.5495E−01 | −4.3019E−02 | 1.2925E−01 | −5.8083E−01 | −1.3247E+00 | −3.9736E−03 |
| A14 = | 8.8403E−02 | 8.9181E−03 | 2.8287E−02 | 2.3986E−01 | 9.3107E−01 | 5.9253E−03 |
| A16 = | −2.1904E−02 | | | | −2.4847E−01 | |
| Surface # | 10 | 11 | 12 | 13 | 14 | 15 |
| k = | −1.1262E+00 | −1.0331E+00 | 4.6278E−01 | −3.0750E+00 | −6.6828E+01 | −1.0431E+01 |
| A4 = | 7.0655E−02 | −4.1708E−02 | −2.3439E−01 | −1.8403E−01 | −3.6641E−01 | −2.0390E−01 |
| A6 = | −1.2618E−01 | 2.5925E−02 | 7.4353E−02 | 7.5213E−02 | 2.4774E−01 | 1.2942E−01 |
| A8 = | 1.5143E−01 | 3.3307E−02 | −3.6225E−03 | −8.0867E−03 | −9.6176E−02 | −5.2277E−02 |
| A10 = | −7.2342E−02 | −1.5142E−02 | −8.1570E−03 | −9.1690E−03 | 2.3776E−02 | 1.3328E−02 |
| A12 = | 1.4693E−02 | 2.1648E−04 | −2.2065E−03 | 4.2405E−03 | −3.5875E−03 | −2.0667E−03 |
| A14 = | −1.0309E−03 | 6.8248E−04 | 2.4476E−03 | −6.9456E−04 | 2.9805E−04 | 1.7509E−04 |
| A16 = | | −8.6200E−05 | −3.9108E−04 | 3.9891E−05 | −1.0396E−05 | −6.1179E−06 |

In Table 22, the equation of the aspheric surface profiles of the aforementioned lens elements is the same as the equation of the 1st embodiment. Moreover, the aforementioned wide-angle optical lens assembly is only exemplary and the imaging apparatus 10W is not limited thereto.

12th Embodiment

Figure 24E:
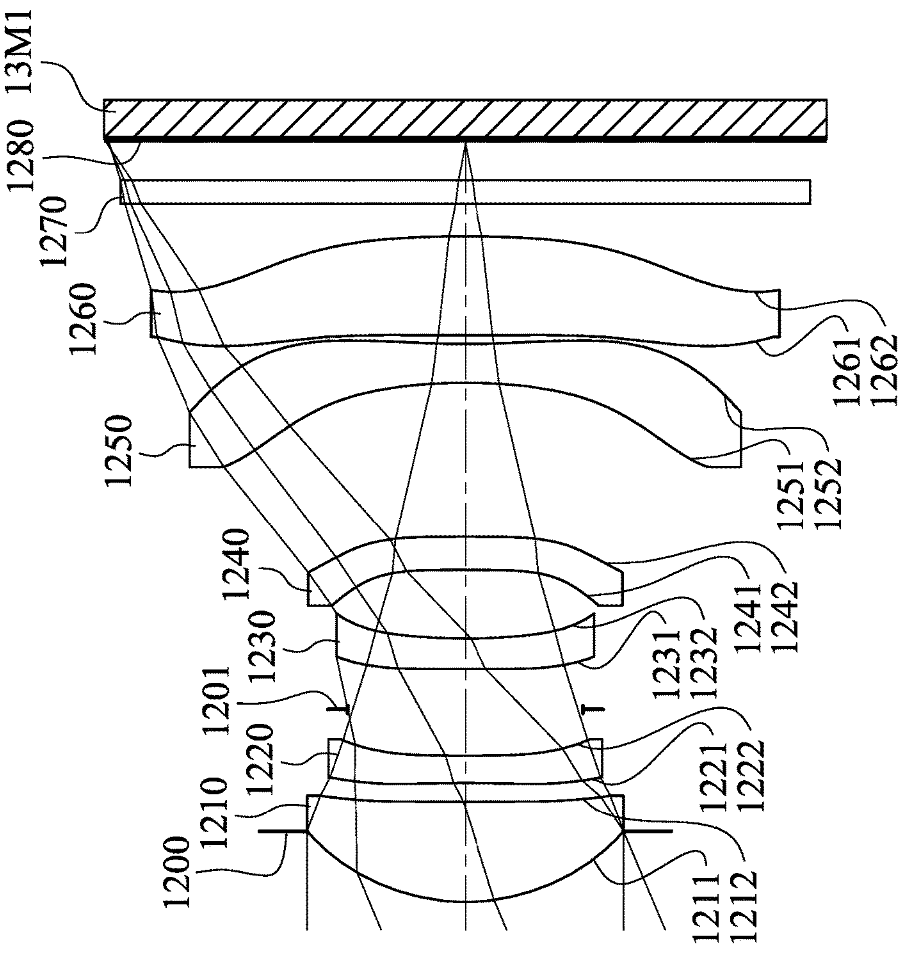
FIG. 24E is a schematic view of a medium-angle optical lens assembly and an image sensor of the imaging apparatus in FIG. 24D.

FIG. 24A is a schematic view showing a side of an electronic device 30 according to the 12th embodiment of the present disclosure. FIG. 24B is a schematic view showing another side of the electronic device 30 in FIG. 24A. FIG. 24C is a block diagram of the electronic device 30 in FIG. 24A. In FIG. 24A, FIG. 24B and FIG. 24C, the electronic device 30 of the 12th embodiment is a smartphone. The electronic device 30 includes a flash module 21, an auxiliary focusing module 22, an image signal processor 23, a user interface 24, an image software processor 25 (shown in 24C) and three imaging apparatus which are an imaging apparatus 10T, an imaging apparatus 10M1 and an imaging apparatus 10W. The imaging apparatus 10T is FIG. 24E is a schematic view of a medium-angle optical lens assembly and an image sensor 13M1 of the imaging apparatus 10M1 in FIG. 24D. In FIG. 24E, the optical properties of the imaging apparatus 10M1 are emphasized, so that only the medium-angle optical lens assembly and the image sensor 13M1 are shown, and the other elements of the imaging apparatus 10M1 are omitted. The medium-angle optical lens assembly includes, in order from an object side to an image side, an aperture stop 1200, a first lens element 1210, a second lens element 1220, a stop 1201, a third lens element 1230, a fourth lens element 1240, a fifth lens element 1250, a sixth lens element 1260, an IR-cut filter 1270 and an image surface 1280. The image sensor 13M1 is disposed on the image surface 1280 of the medium-angle optical lens assembly. The medium-angle optical lens assembly includes six lens elements (1210, 1220, 1230, 1240, 1250 and 1260) without additional one or more lens elements inserted between the first lens element 1210 and the sixth lens element 1260.

The first lens element 1210 with positive refractive power has an object-side surface 1211 being convex in a paraxial region thereof and an image-side surface 1212 being concave in a paraxial region thereof. The first lens element 1210 is made of a plastic material, and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of a plastic material, and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of a plastic material, and has the object-side surface 1231 and the image-side surface 1232 being both aspheric.

The fourth lens element 1240 with positive refractive power has an object-side surface 1241 being convex in a paraxial region thereof and an image-side surface 1242 being convex in a paraxial region thereof. The fourth lens element 1240 is made of a plastic material, and has the object-side surface 1241 and the image-side surface 1242 being both aspheric.

The fifth lens element 1250 with negative refractive power has an object-side surface 1251 being concave in a paraxial region thereof and an image-side surface 1252 being concave in a paraxial region thereof. The fifth lens element 1250 is made of a plastic material, and has the object-side surface 1251 and the image-side surface 1252 being both aspheric.

The sixth lens element 1260 with positive refractive power has an object-side surface 1261 being convex in a paraxial region thereof and an image-side surface 1262 being convex in a paraxial region thereof. The sixth lens element 1260 is made of a plastic material, and has the object-side surface 1261 and the image-side surface 1262 being both aspheric.

The IR-cut filter 1270 is made of a glass material and located between the sixth lens element 1260 and the image surface 1280, and will not affect the focal length of the medium-angle optical lens assembly.

The detailed optical data of the medium-angle optical lens assembly are shown in TABLE 23 and the aspheric surface data are shown in TABLE 24 below.

TABLE 23

| 12th Embodiment (medium-angle optical lens assembly) f = 7.56 mm, Fno = 2.65, HFOV = 22.9 deg. | | | | | | | | | |
|---|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.635 | | | | |
| 2 | Lens 1 | 1.928 | ASP | 0.906 | Plastic | 1.545 | 56.1 | 3.57 |
| 3 | | 213.628 | ASP | 0.168 | | | | |
| 4 | Lens 2 | −12.063 | ASP | 0.246 | Plastic | 1.661 | 20.3 | −10.51 |
| 5 | | 16.614 | ASP | 0.416 | | | | |
| 6 | Stop | Plano | | 0.364 | | | | |
| 7 | Lens 3 | 39.664 | ASP | 0.275 | Plastic | 1.584 | 28.2 | −10.32 |
| 8 | | 5.220 | ASP | 0.616 | | | | |
| 9 | Lens 4 | 224.141 | ASP | 0.300 | Plastic | 1.661 | 20.3 | 206.17 |
| 10 | | −346.868 | ASP | 1.389 | | | | |
| 11 | Lens 5 | −5.899 | ASP | 0.360 | Plastic | 1.544 | 56.0 | −6.27 |
| 12 | | 8.270 | ASP | 0.077 | | | | |
| 13 | Lens 6 | 52.864 | ASP | 0.890 | Plastic | 1.661 | 20.3 | 15.20 |
| 14 | | −12.308 | ASP | 0.300 | | | | |
| 15 | IR-cut filter | Plano | | 0.210 | Glass | 1.517 | 64.2 | — |
| 16 | | Plano | | 0.369 | | | | |
| 17 | Image | Plano | | — | | | | |

Reference wavelength is 587.6 nm (d-line).

The effective radius of the surface 6 is 1.060 mm.

TABLE 24

| Aspheric Coefficients | | | | | | |
|---|---|---|---|---|---|---|
| Surface # | 2 | 3 | 4 | 5 | 7 | 8 |
| K = | −4.6019E−02 | −9.0000E+01 | 7.0204E+01 | −1.3335E+01 | −7.7852E+01 | −4.3528E+01 |
| A4 = | −6.9850E−04 | 2.0423E−02 | 7.7446E−02 | 7.5445E−02 | 2.5105E−03 | 1.0645E−02 |
| A6 = | 2.1416E−03 | −2.0233E−02 | −5.2001E−02 | −3.9695E−02 | 5.6330E−02 | 5.3601E−02 |
| A8 = | −2.1973E−03 | 2.2709E−02 | 7.0308E−02 | 7.4275E−02 | −1.4551E−02 | −3.8008E−02 |
| A10 = | 8.4095E−04 | −6.9097E−03 | −3.6449E−02 | −4.2329E−02 | 1.2481E−02 | 5.0859E−02 |
| A12 = | 1.3087E−04 | −4.1535E−05 | 4.7826E−03 | 4.5589E−03 | −8.9030E−03 | −1.9838E−02 |
| Surface # | 9 | 10 | 11 | 12 | 13 | 14 |
| k = | 3.1315E+01 | 6.4202E+01 | −2.8694E+01 | −1.5957E+01 | −7.7183E+01 | 1.0186E−02 |
| A4 = | −1.3987E−01 | −1.0199E−01 | −6.2443E−02 | −3.2825E−02 | −6.5552E−03 | −1.7380E−02 |
| A6 = | −7.9017E−02 | −3.3342E−02 | 3.1143E−02 | 1.1499E−02 | −9.0349E−03 | −2.4220E−03 |
| A8 = | 1.7673E−01 | 6.9641E−02 | −1.7790E−02 | −6.8336E−03 | 4.6478E−03 | 1.5165E−03 |
| A10 = | −2.6363E−01 | −7.4210E−02 | 5.2839E−03 | 2.1296E−03 | −9.5018E−04 | −1.8594E−04 |
| A12 = | 1.8483E−01 | 4.2139E−02 | −6.9913E−04 | −3.6172E−04 | 1.0466E−04 | 9.5197E−06 |
| A14 = | −4.4380E−02 | −8.4376E−03 | 3.4949E−05 | 3.1344E−05 | −6.1296E−06 | −1.9837E−07 |
| A16 = | | | −1.2067E−07 | −1.0561E−06 | 1.4846E−07 | |

In Table 24, the equation of the aspheric surface profiles of the aforementioned lens elements is the same as the equation of the 1st embodiment. Moreover, the aforementioned medium-angle optical lens assembly is only exemplary and the imaging apparatus 10M1 is not limited thereto. Other details of the electronic device 30 of the 12th embodiment can be the same as that of the electronic device 20 of the 11th embodiment, and are not repeated herein.

13th Embodiment

Figure 25A:
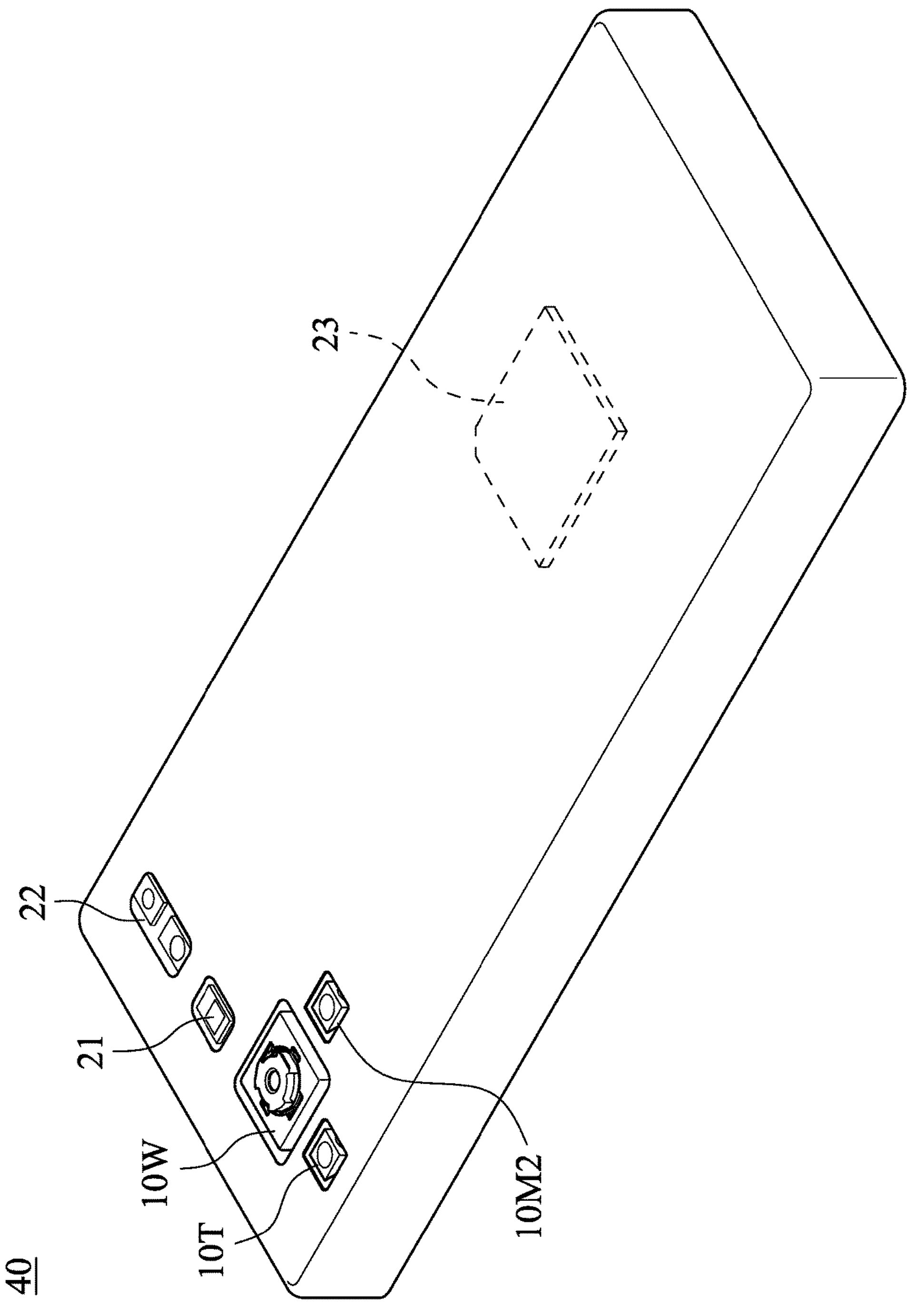
FIG. 25A is a schematic view showing a side of an electronic device according to the 13th embodiment of the present disclosure.
Figure 25B:
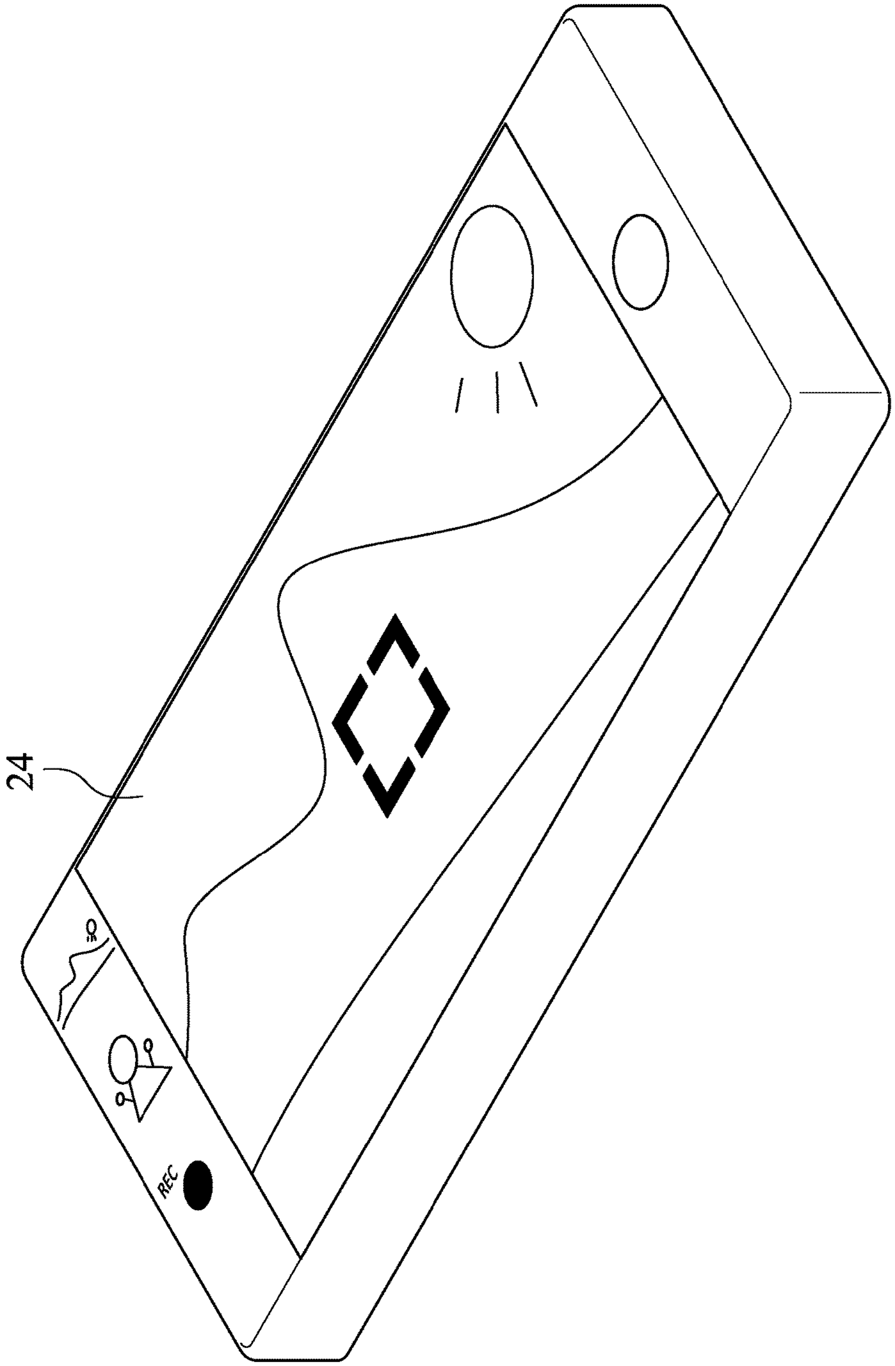
FIG. 25B is a schematic view showing another side of the electronic device in FIG. 25A.
Figure 25C:
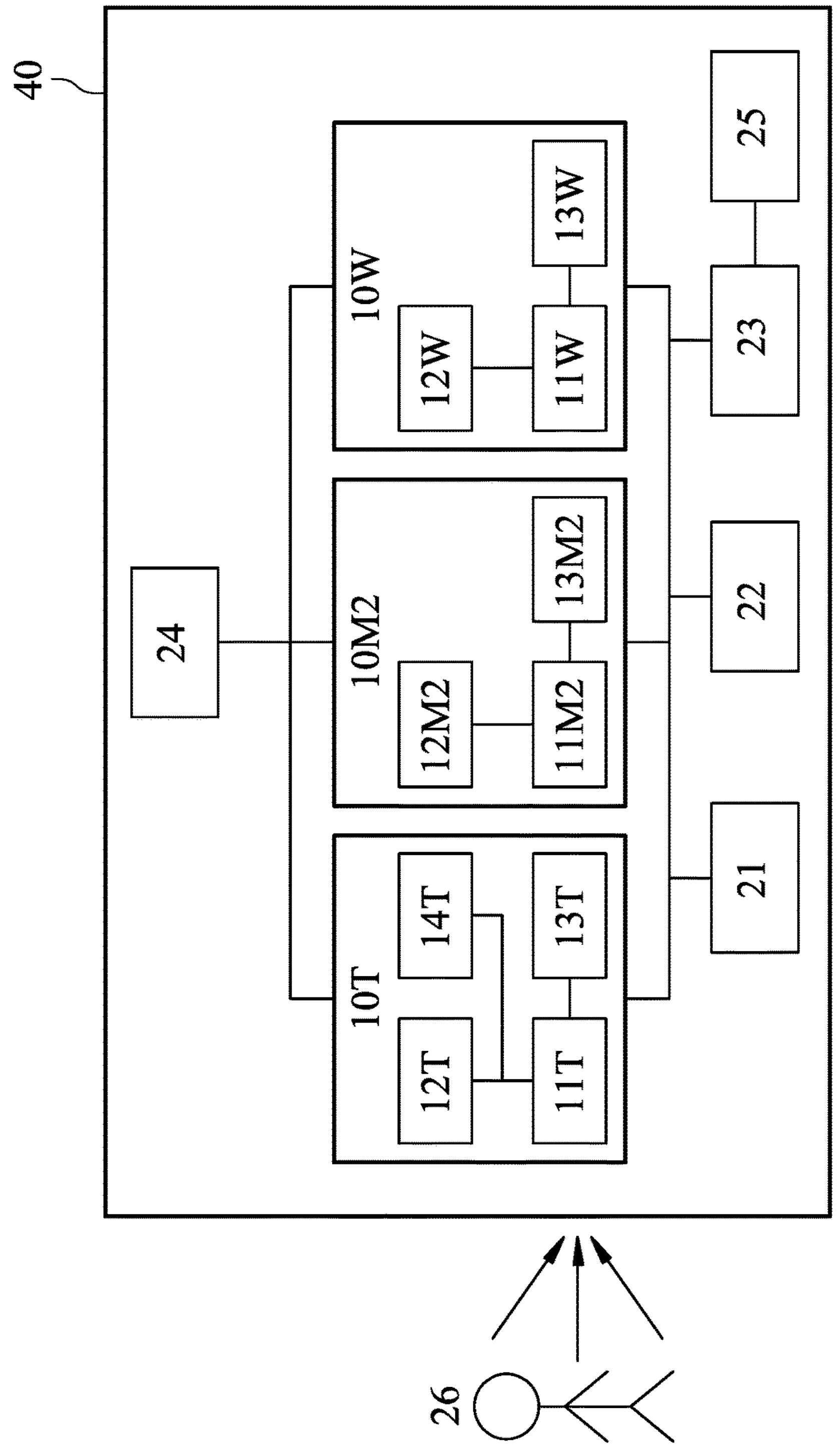
FIG. 25D is a three-dimensional view of an imaging apparatus of the electronic device according to the 13th embodiment.
FIG. 25E is a schematic view of a medium-angle optical lens assembly and an image sensor of the imaging apparatus in FIG. 25D.

FIG. 25A is a schematic view showing a side of an electronic device 40 according to the 13th embodiment of the present disclosure. FIG. 25B is a schematic view showing another side of the electronic device 40 in FIG. 25A. FIG. 25C is a block diagram of the electronic device 40 in FIG. 25A. In FIG. 25A, FIG. 25B and FIG. 25C, the electronic device 40 of the 13th embodiment is a smartphone. The electronic device 40 includes a flash module 21, an auxiliary focusing module 22, an image signal processor 23, a user interface 24, an image software processor 25 (shown in 25C) and three imaging apparatus which are an imaging apparatus 10T, an imaging apparatus 10M2 and an imaging apparatus 10W. The imaging apparatus 10T is featured with small field of view and telephoto property (its FOV is in the range of 20 degrees to 40 degrees), the imaging apparatus 10M2 is featured with medium-angle property (its FOV is in the range of 45 degrees to 60 degrees) and the imaging apparatus 10W is featured with wide-angel property (its FOV is in the range of 70 degrees to 100 degrees). With the imaging apparatus 10T, the imaging apparatus 10M2, and the imaging apparatus 10W providing different field of views, the electronic device 40 can satisfy the demands of multi-function photography, such as long shot and close shot. Details of the imaging apparatus 10T and the imaging apparatus 10W can refer to the 11th embodiment, and details of the imaging apparatus 10M2 are recited hereinafter.

Figure 25D:
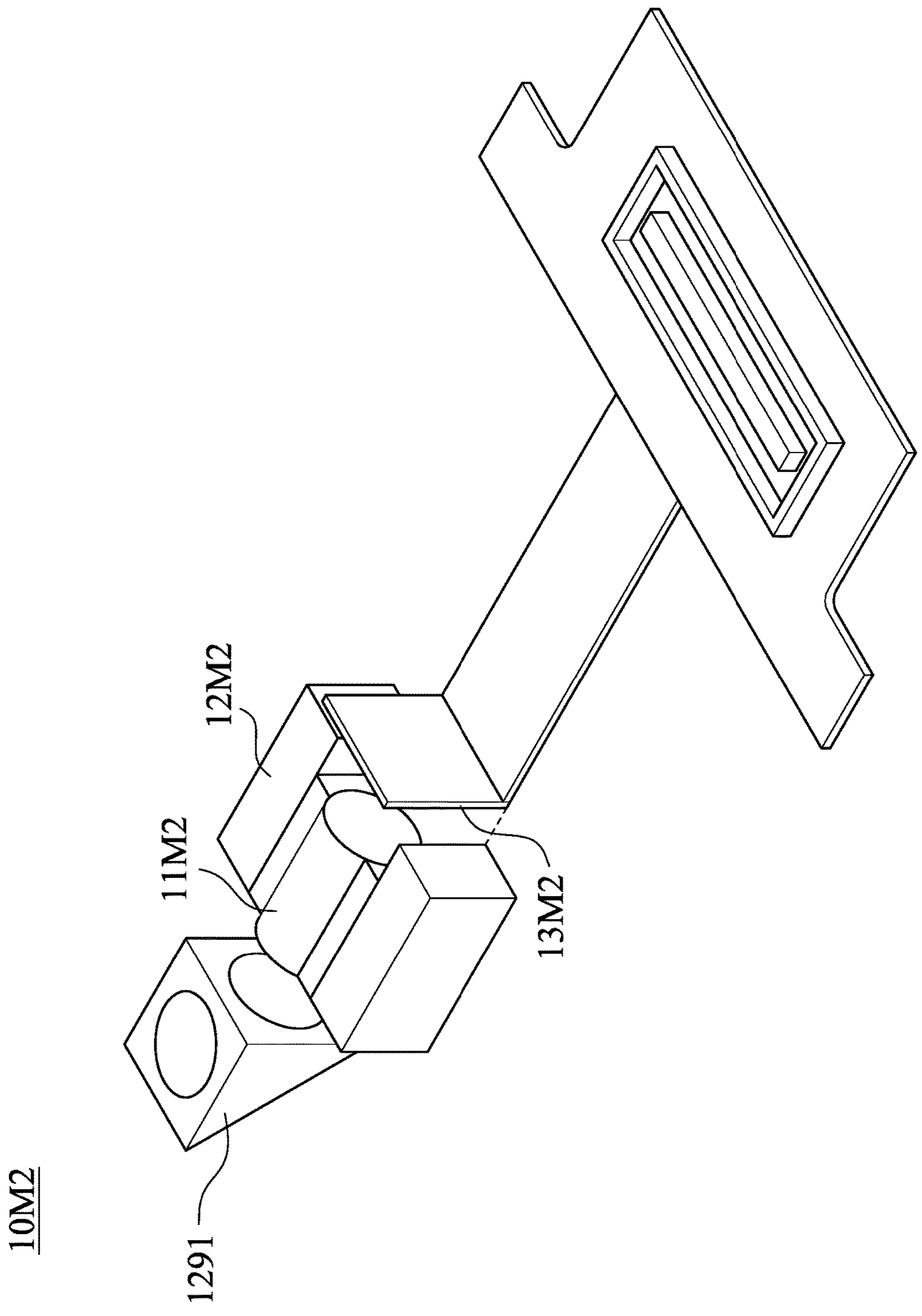

FIG. 25D is a three-dimensional view of the imaging apparatus 10M2 of the electronic device 40 according to the 13th embodiment. In FIG. 25D, the imaging apparatus 10M2 is a camera module. The imaging apparatus 10M2 includes an imaging lens module 11M2, a driving assembly 12M2, an image sensor 13M2 and a reflecting element 1291. The imaging lens module 11M2 can include a barrel (its reference numeral is omitted) and all elements of a medium-angle optical lens assembly (its FOV is in the range of 45 degrees to 60 degrees) except the reflecting element 1291. The function of other elements (the driving assembly 12M2 and the image sensor 13M2) of the imaging apparatus 10M2 can be the same as that of the imaging apparatus 10T, and are not repeated herein.

Figure 25E:
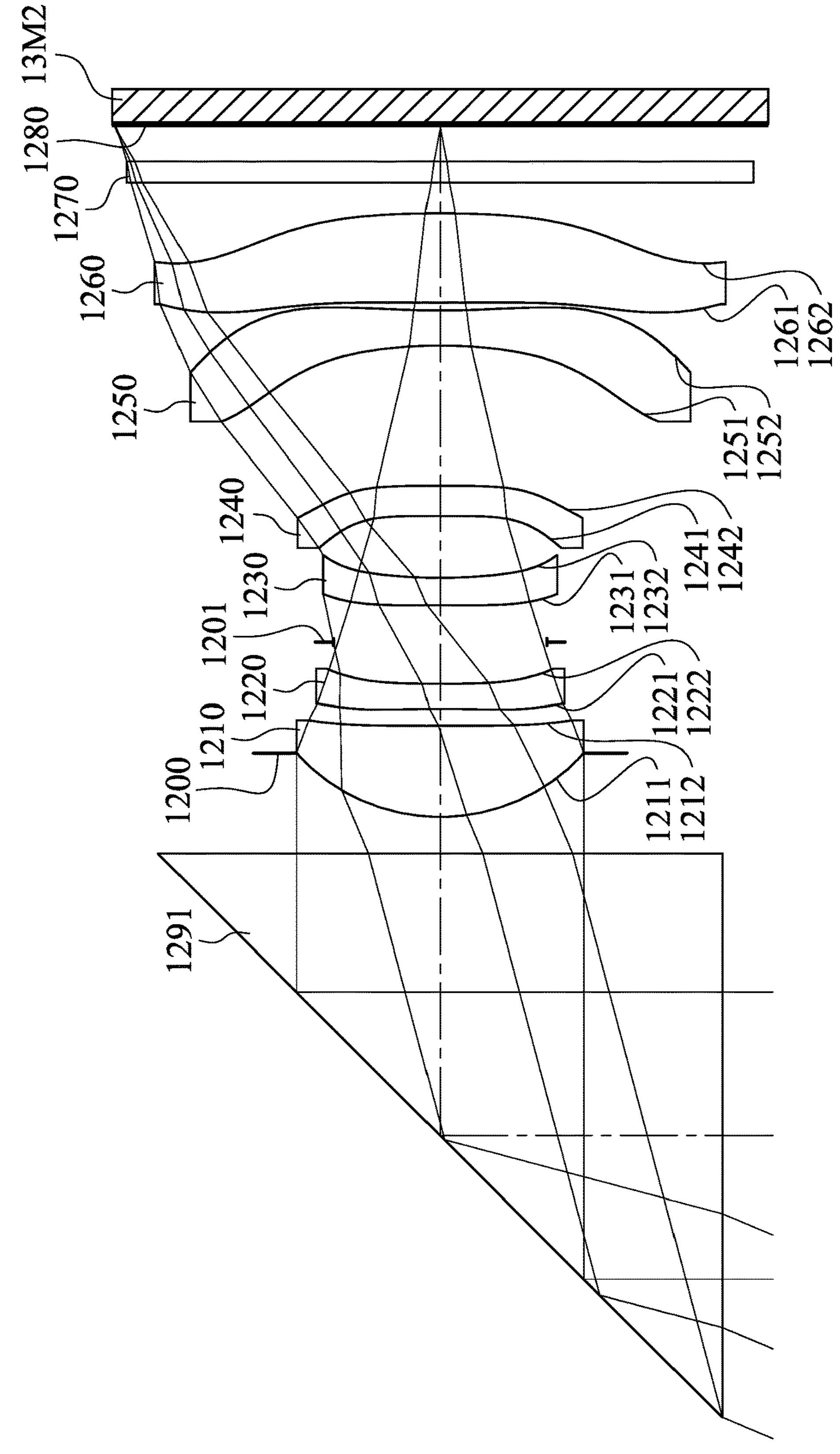

FIG. 25E is a schematic view of the medium-angle optical lens assembly and an image sensor 13M2 of the imaging apparatus 10M2 in FIG. 25D. In FIG. 25E, the optical properties of the imaging apparatus 10M2 are emphasized, so that only the medium-angle optical lens assembly and the image sensor 13M2 are shown, and the other elements of the imaging apparatus 10M2 are omitted. Except the reflecting element 1291, other elements in FIG. 25E are the same as that in FIG. 24E and are not repeated herein. Moreover, the aforementioned medium-angle optical lens assembly is only exemplary and the imaging apparatus 10M2 is not limited thereto. Other details of the electronic device 40 of the 13th embodiment can be the same as that of the electronic device 20 of the 11th embodiment, and are not repeated herein.

14th Embodiment

Figure 26:
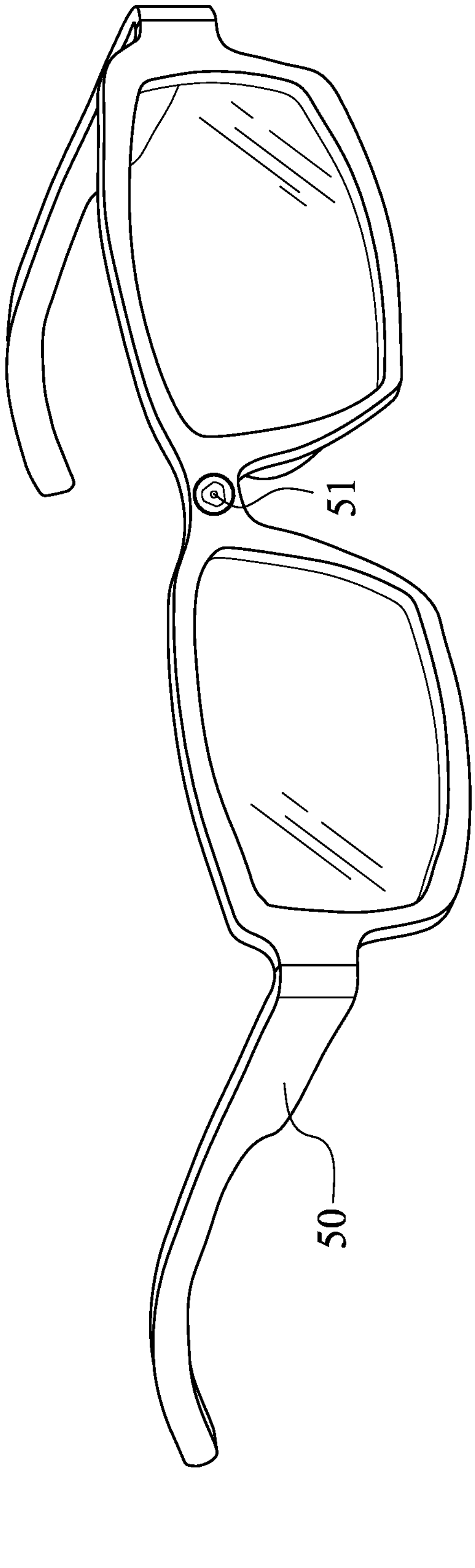
FIG. 26 is a schematic view of an electronic device according to the 14th embodiment of the present disclosure.

FIG. 26 is a schematic view of an electronic device 50 according to the 14th embodiment of the present disclosure. The electronic device 50 of the 14th embodiment is a wearable device. The electronic device 50 includes an imaging apparatus 51, wherein the imaging apparatus 51 includes the optical image capturing assembly according to the 1st embodiment. Details of the optical image capturing assembly according to the 1st embodiment are not repeated herein.

The foregoing description, for purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing assembly comprising four lens elements, in order from an object side to an image side, the four lens elements being:

a first lens element with positive refractive power having an object-side surface being convex in a paraxial region thereof;

a second lens element having negative refractive power;

a third lens element having positive refractive power; and a fourth lens element with negative refractive power having an object-side surface being concave in a paraxial region thereof and an image-side surface being convex in a paraxial region thereof;

wherein an Abbe number of the second lens element is V2, an Abbe number of the third lens element is V3, an axial distance between the second lens element and the third lens element is T23, an axial distance between the third lens element and the fourth lens element is T34, a central thickness of the third lens element is CT3, a focal length of the first lens element is f1, a focal length of the third lens element is f3, and the following conditions are satisfied:

$$10<V2<40;$$

$$10<V3<30;$$

$$0.10<(T23+T34)/CT3<1.30; \text{ and}$$

$$0.40<f1/f3.$$

2. The optical image capturing assembly of claim 1, wherein the axial distance between the second lens element and the third lens element is T23, the axial distance between the third lens element and the fourth lens element is T34, the central thickness of the third lens element is CT3, and the following condition is satisfied:

$$0.40<(T23+T34)/CT3<1.30.$$

3. The optical image capturing assembly of claim 1, wherein the focal length of the first lens element is f1, the focal length of the third lens element is f3, and the following condition is satisfied:

$$0.60<f1/f3<1.20.$$

4. The optical image capturing assembly of claim 1, wherein the central thickness of the third lens element is CT3, the axial distance between the third lens element and the fourth lens element is T34, and the following condition is satisfied:

$$0.90<CT3/T34<7.0.$$

5. The optical image capturing assembly of claim 1, wherein the Abbe number of the second lens element is V2, the Abbe number of the third lens element is V3, an Abbe number of the fourth lens element is V4, and the following condition is satisfied:

$$30<V2+V3+V4<100.$$

6. The optical image capturing assembly of claim 1, wherein an axial distance between the object-side surface of the first lens element and the image-side surface of the fourth lens element is TD, a sum of axial distances between every two lens elements of the first lens element, the second lens element, the third lens element and the fourth lens element adjacent to each other is ΣAT, and the following condition is satisfied:

$$3.5\leq TD/\Sigma AT.$$

7. The optical image capturing assembly of claim 1, wherein an axial distance between the image-side surface of the fourth lens element and an image surface is BL, an axial distance between the object-side surface of the first lens element and the image surface is TL, and the following condition is satisfied:

$$0.35<BL/TL<0.70.$$

8. The optical image capturing assembly of claim 1, wherein a curvature radius of an object-side surface of the second lens element is R3, a curvature radius of an image-side surface of the second lens element is R4, and the following condition is satisfied:

$$-1.0<R3/|R4|<0.$$

9. The optical image capturing assembly of claim 1, wherein a curvature radius of an object-side surface of the second lens element is R3, a focal length of the optical image capturing assembly is f, and the following condition is satisfied:

$$-0.47<R3/f<0.$$

10. The optical image capturing assembly of claim 1, wherein a curvature radius of an image-side surface of the third lens element is R6, a curvature radius of the object-side surface of the fourth lens element is R7, and the following condition is satisfied:

$$3.0<|R6/R7|.$$

11. The optical image capturing assembly of claim 1, wherein a curvature radius of the image-side surface of the fourth lens element is R8, a focal length of the optical image capturing assembly is f, and the following condition is satisfied:

$$|R8|/f\leq 0.42.$$

12. The optical image capturing assembly of claim 1, wherein an entrance pupil diameter of the optical image capturing assembly is EPD, a maximum image height of the optical image capturing assembly is ImgH, and the following condition is satisfied:

$$0.75<EPD/\mathrm{ImgH}.$$

13. The optical image capturing assembly of claim 12, wherein the entrance pupil diameter of the optical image capturing assembly is EPD, a vertical distance between a maximum effective diameter on the image-side surface of the fourth lens element and an optical axis is Y42, and the following condition is satisfied:

$$1.50\leq EPD/Y42.$$

14. The optical image capturing assembly of claim 1, further comprising:

an aperture stop disposed between an imaged object and the first lens element, wherein an axial distance between the aperture stop and an image surface is SL, an axial distance between the object-side surface of the first lens element and the image surface is TL, and the following condition is satisfied:

$$0.90<SL/TL<1.1.$$

15. The optical image capturing assembly of claim 1, further comprising:

at least one reflecting element disposed at an object side of the first lens element.

16. The optical image capturing assembly of claim 15, wherein the reflecting element is a prism, an axial distance between the object-side surface of the first lens element and the image-side surface of the fourth lens element is TD, a sum of path lengths on an optical axis of the prism is TP, and the following condition is satisfied:

$$0.20<TD/TP<1.30.$$

17. The optical image capturing assembly of claim 1, wherein an object-side surface and an image-side surface of the second lens element are aspheric, and the object-side surface of the second lens element comprises at least one inflection point.

18. An imaging apparatus, comprising:

the optical image capturing assembly of claim 1; and an image sensor, wherein the image sensor is disposed on an image surface of the optical image capturing assembly.

19. An electronic device, comprising:

the imaging apparatus of claim 18.

20. An optical image capturing assembly comprising four lens elements, in order from an object side to an image side, the four lens elements being:

a first lens element with positive refractive power having an object-side surface being convex in a paraxial region thereof;

a second lens element having negative refractive power;

a third lens element having positive refractive power; and a fourth lens element with negative refractive power having an object-side surface being concave in a paraxial region thereof;

wherein an Abbe number of the second lens element is V2, an Abbe number of the third lens element is V3, an Abbe number of the fourth lens element is V4, an axial distance between the second lens element and the third lens element is T23, an axial distance between the third lens element and the fourth lens element is T34, a central thickness of the third lens element is CT3, a focal length of the first lens element is f1, a focal length of the second lens element is f2, and the following conditions are satisfied:

$10<V3<30;$ $0.72<(T23+T34)/CT3<1.30;$ $0.80<f1/|f2|$; and $30<V2+V3+V4<100.$

21. The optical image capturing assembly of claim 20, wherein a curvature radius of an image-side surface of the fourth lens element is R8, a focal length of the optical image capturing assembly is f, and the following condition is satisfied:

$|R8|/f\leq 0.42.$

22. The optical image capturing assembly of claim 20, wherein an entrance pupil diameter of the optical image capturing assembly is EPD, a maximum image height of the optical image capturing assembly is ImgH, and the following condition is satisfied:

$0.75<EPD/\text{ImgH}.$

23. The optical image capturing assembly of claim 20, wherein a vertical distance between a maximum effective diameter on the object-side surface of the first lens element and an optical axis is Y11, a vertical distance between a maximum effective diameter on an image-side surface of the fourth lens element and the optical axis is Y42, and the following condition is satisfied:

$0.8<Y11/Y42<1.2.$

24. The optical image capturing assembly of claim 20, wherein an f-number of the optical image capturing assembly is Fno, a half of a maximum field of view of the optical image capturing assembly is HFOV, an axial distance between the object-side surface of the first lens element and an image-side surface of the fourth lens element is TD, and the following conditions are satisfied:

$1.60<Fno<3.20;$ 10 degrees<HFOV<20 degrees; and 2.2 mm<$TD$<5.2 mm.

25. An optical image capturing assembly comprising four lens elements, in order from an object side to an image side, the four lens elements being:

a first lens element with positive refractive power having an object-side surface being convex in a paraxial region thereof;

a second lens element having negative refractive power;

a third lens element having positive refractive power; and a fourth lens element with negative refractive power having an object-side surface being concave in a paraxial region thereof and an image-side surface being convex in a paraxial region thereof;

wherein an Abbe number of the third lens element is V3, a central thickness of the first lens element is CT1, a central thickness of the second lens element is CT2, a central thickness of the third lens element is CT3, an axial distance between the second lens element and the third lens element is T23, an axial distance between the third lens element and the fourth lens element is T34, a focal length of the first lens element is f1, a focal length of the third lens element is f3, and the following conditions are satisfied:

$10<V3<32;$ $0.60<CT1/(CT2+T23+CT3)<5.0;$ $0.60<CT3/T34<10$; and $0.40<f1/f3.$

26. The optical image capturing assembly of claim 25, wherein the central thickness of the first lens element is CT1, the central thickness of the second lens element is CT2, the central thickness of the third lens element is CT3, the axial distance between the second lens element and the third lens element is T23, and the following condition is satisfied:

$0.75<CT1/(CT2+T23+CT3)<4.0.$

27. The optical image capturing assembly of claim 25, wherein the central thickness of the third lens element is CT3, the axial distance between the third lens element and the fourth lens element is T34, and the following condition is satisfied:

$0.90<CT3/T34<2.9.$

28. The optical image capturing assembly of claim 25, wherein the axial distance between the second lens element and the third lens element is T23, the axial distance between the third lens element and the fourth lens element is T34, the central thickness of the third lens element is CT3, and the following condition is satisfied:

$0.40<(T23+T34)/CT3<1.3.$

29. The optical image capturing assembly of claim 25, wherein an Abbe number of the second lens element is V2, the Abbe number of the third lens element is V3, an Abbe number of the fourth lens element is V4, and the following condition is satisfied:

$30<V2+V3+V4<100.$

30. The optical image capturing assembly of claim 25, wherein an entrance pupil diameter of the optical image capturing assembly is EPD, a maximum image height of the optical image capturing assembly is ImgH, and the following condition is satisfied:

$0.75<EPD/\text{ImgH}.$

31. The optical image capturing assembly of claim 25, wherein a vertical distance between a maximum effective diameter on the object-side surface of the first lens element and an optical axis is Y11, a vertical distance between a maximum effective diameter on the image-side surface of the fourth lens element and the optical axis is Y42, and the following condition is satisfied:

$0.8<Y11/Y42<1.2.$

* * * * *